Figure 23:
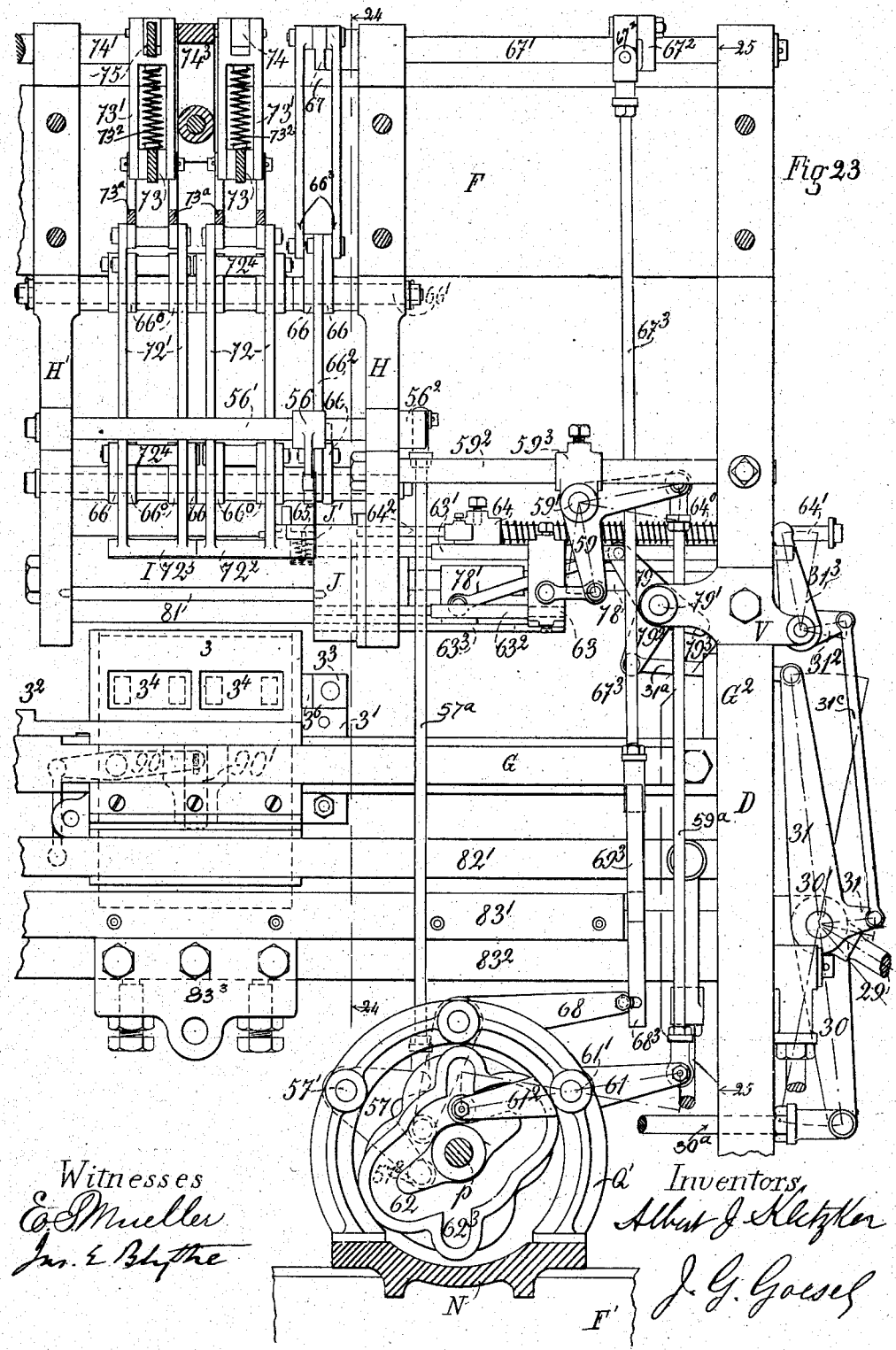

No. 840,346. PATENTED JAN. 1, 1907.
A. J. KLETZKER & J. G. GOESEL.
TYPE BAR MACHINE.
APPLICATION FILED JUNE 21, 1897.
22 SHEETS—SHEET 1.
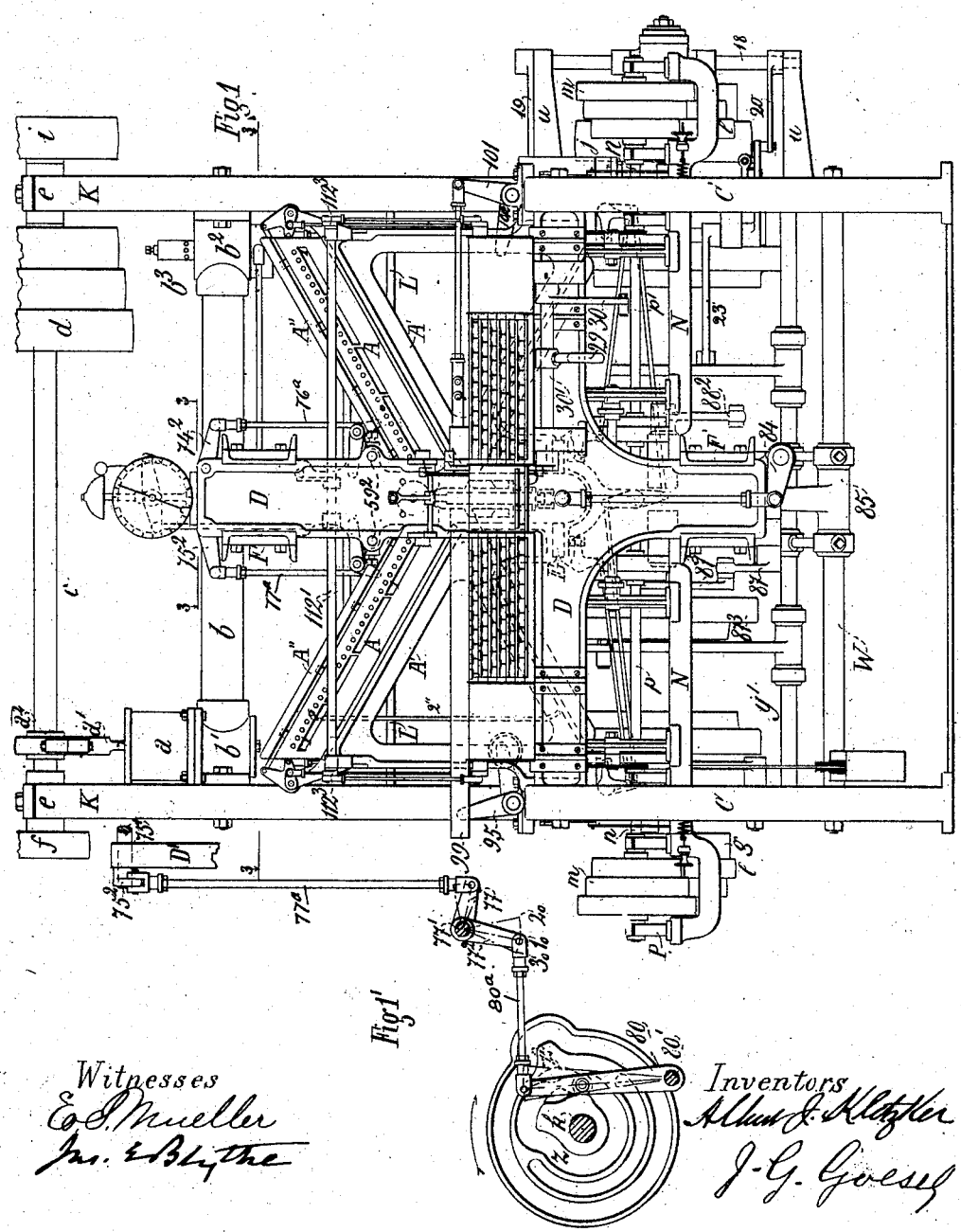
Witnesses
Inventors

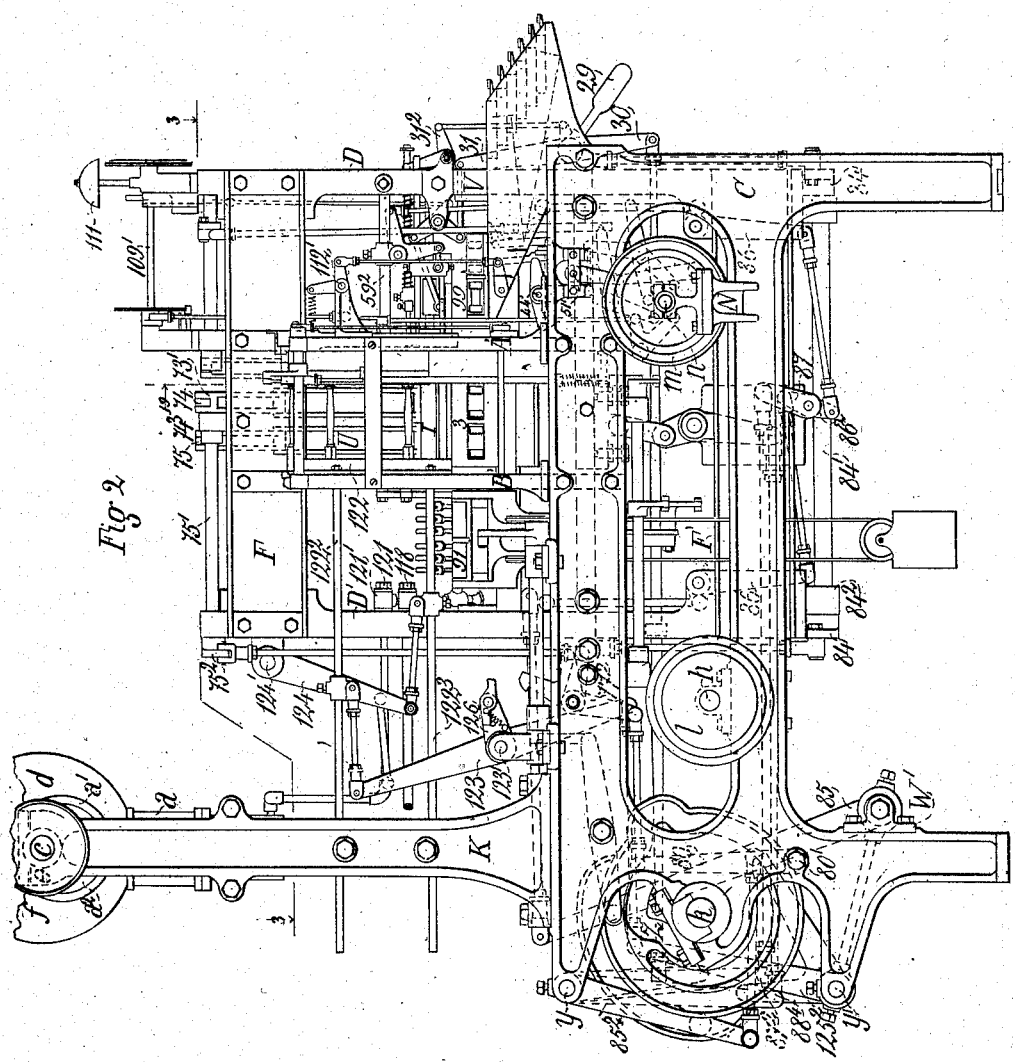

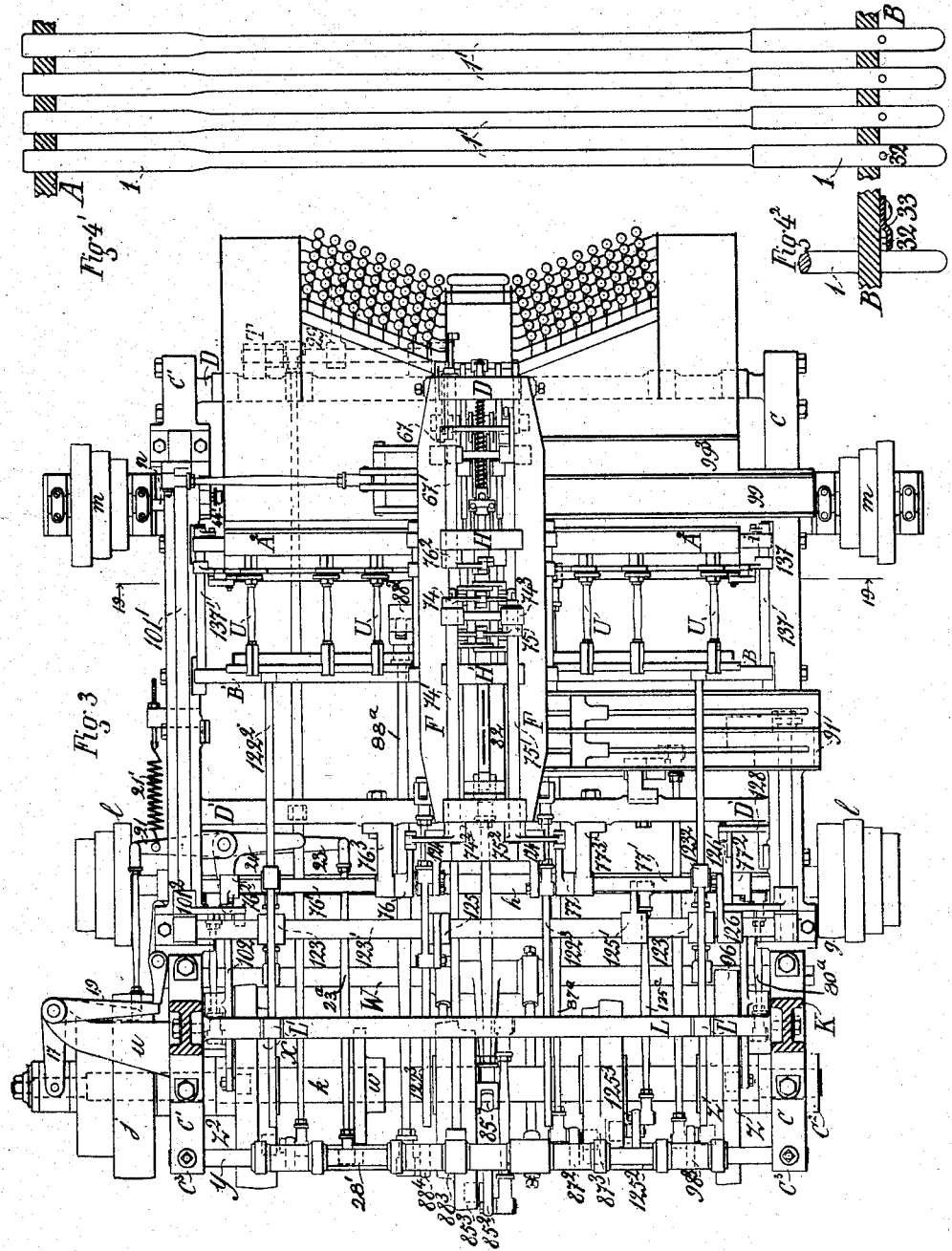

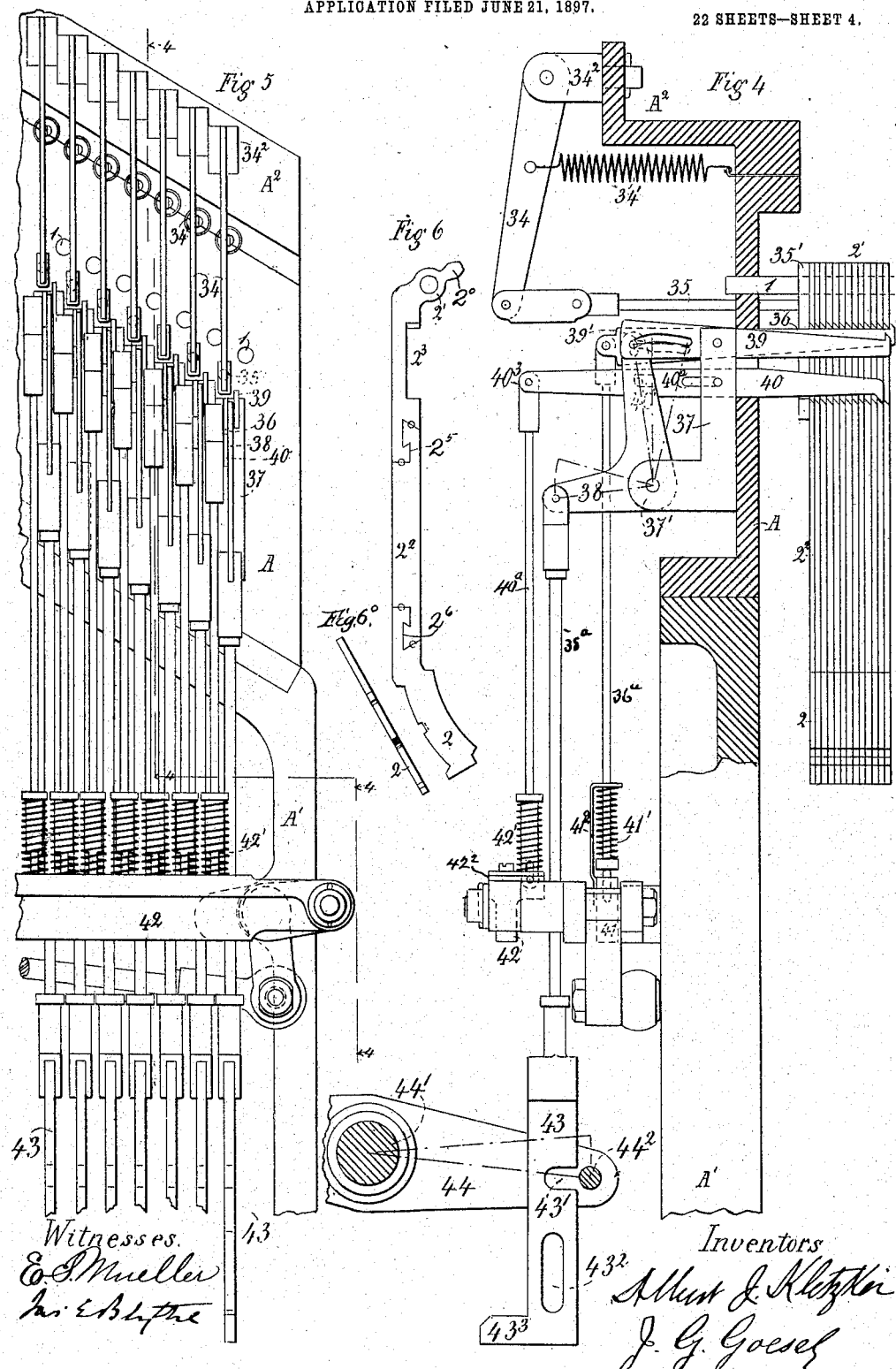

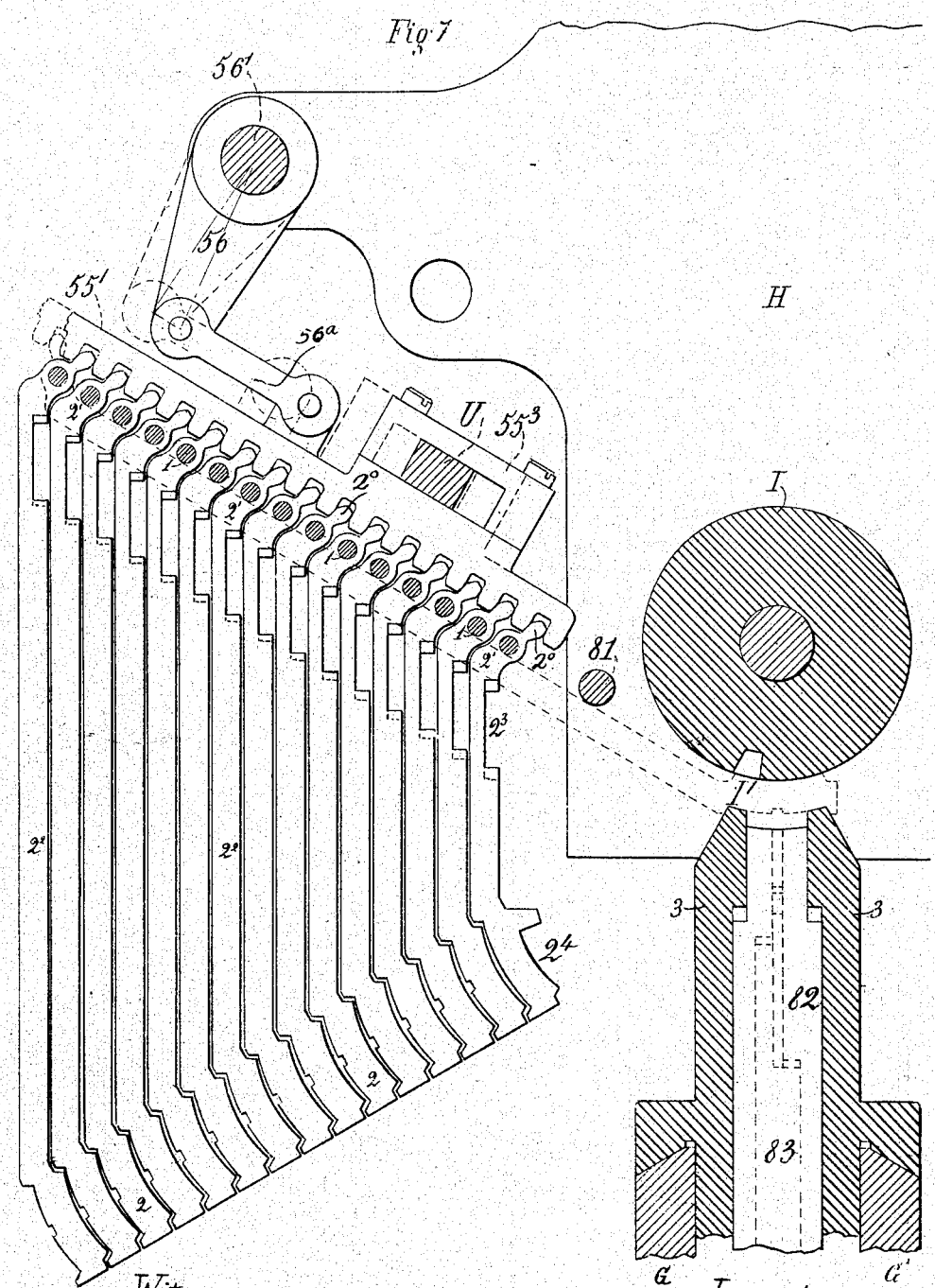

No. 840,346. PATENTED JAN. 1, 1907.
A. J. KLETZKER & J. G. GOESEL.
TYPE BAR MACHINE.
APPLICATION FILED JUNE 21, 1897.
22 SHEETS—SHEET 6.
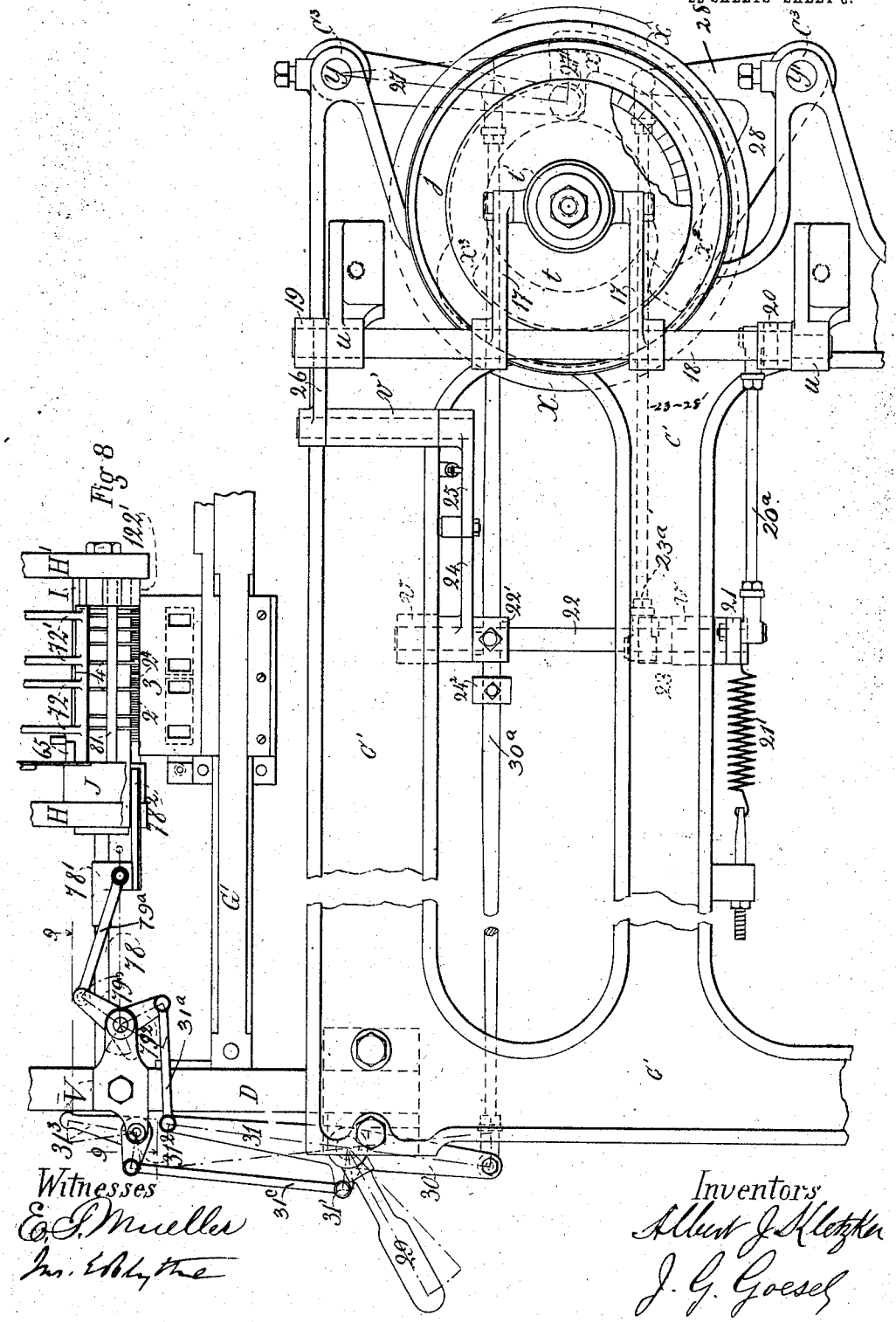
Witnesses
E. G. Mueller
Jno. E. Blythe
Inventors
Albert J. Kletzker
J. G. Goesel
THE NORRIS PETERS CO., WASHINGTON, D. C.

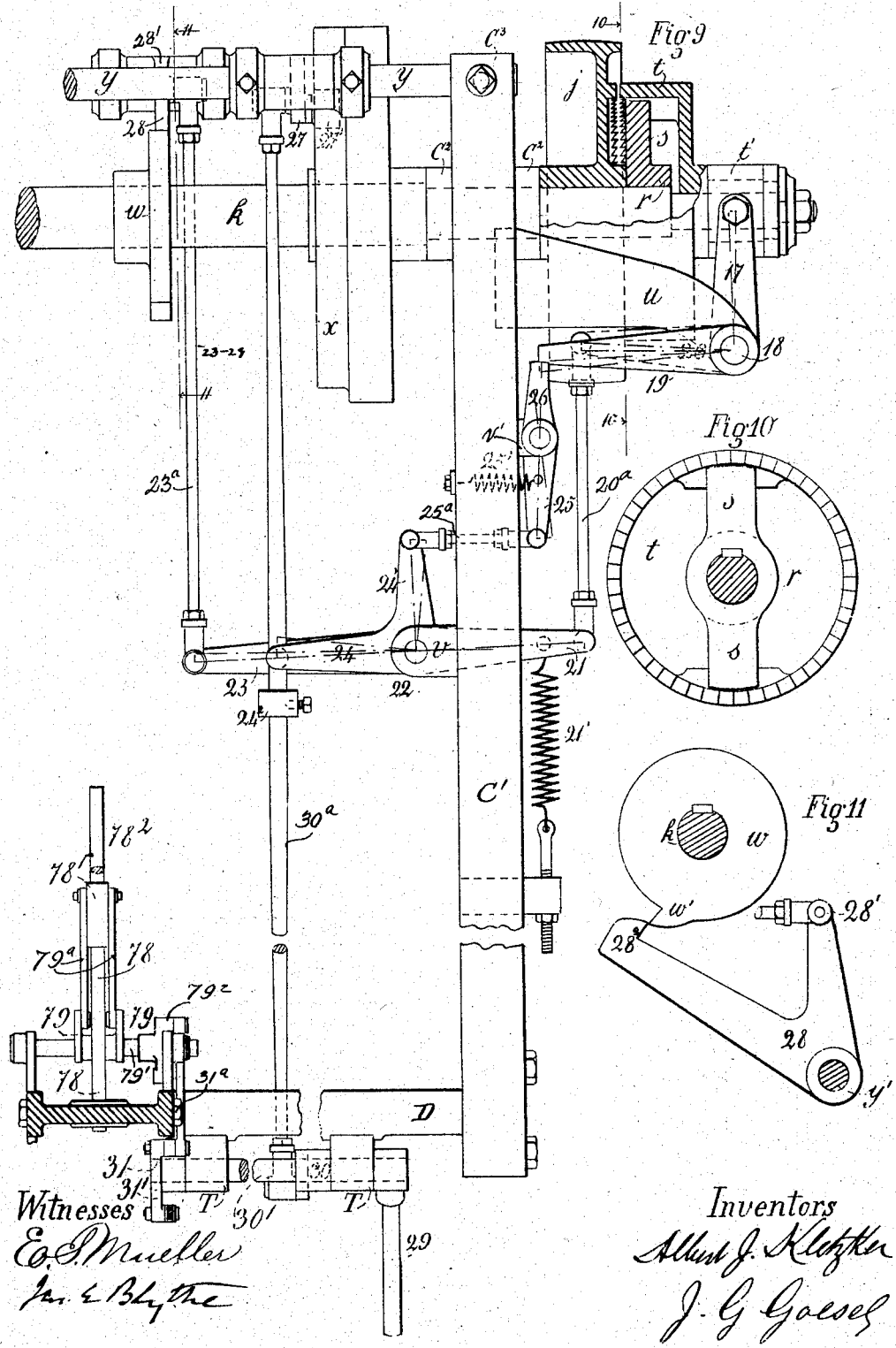

No. 840,346. PATENTED JAN. 1, 1907.
A. J. KLETZKER & J. G. GOESEL.
TYPE BAR MACHINE.
APPLICATION FILED JUNE 21, 1897.
22 SHEETS—SHEET 8.
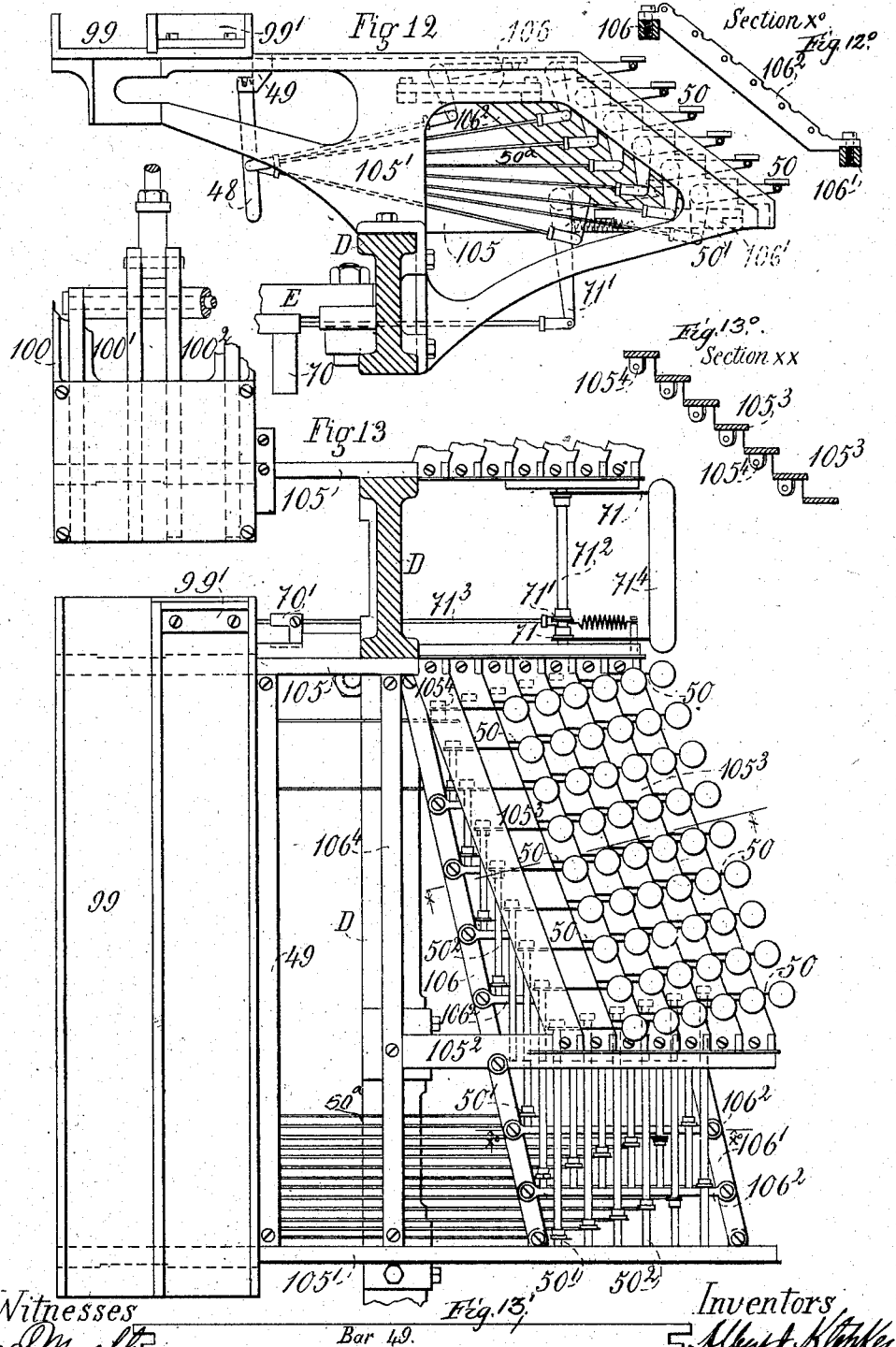
Witnesses Inventors

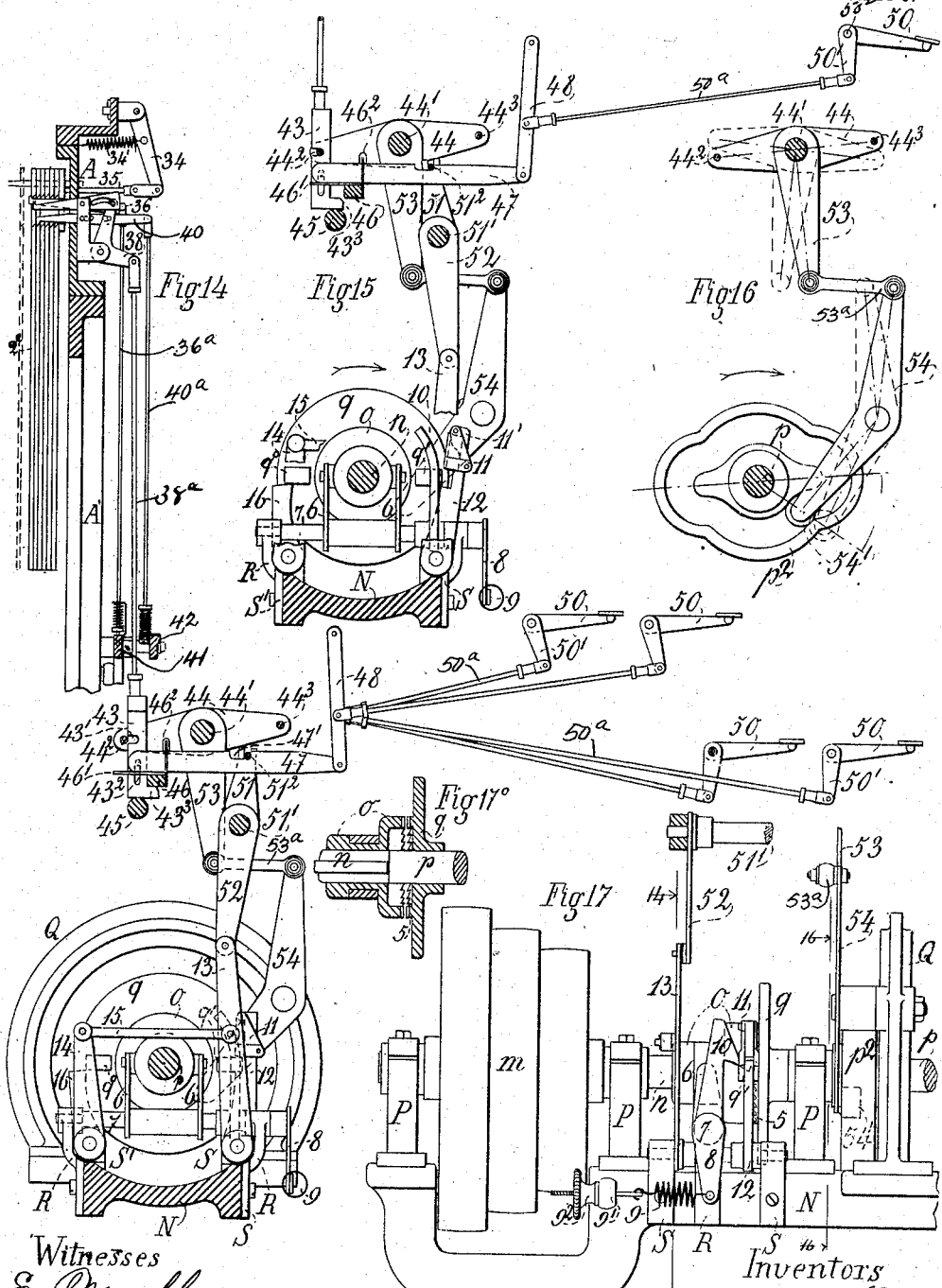

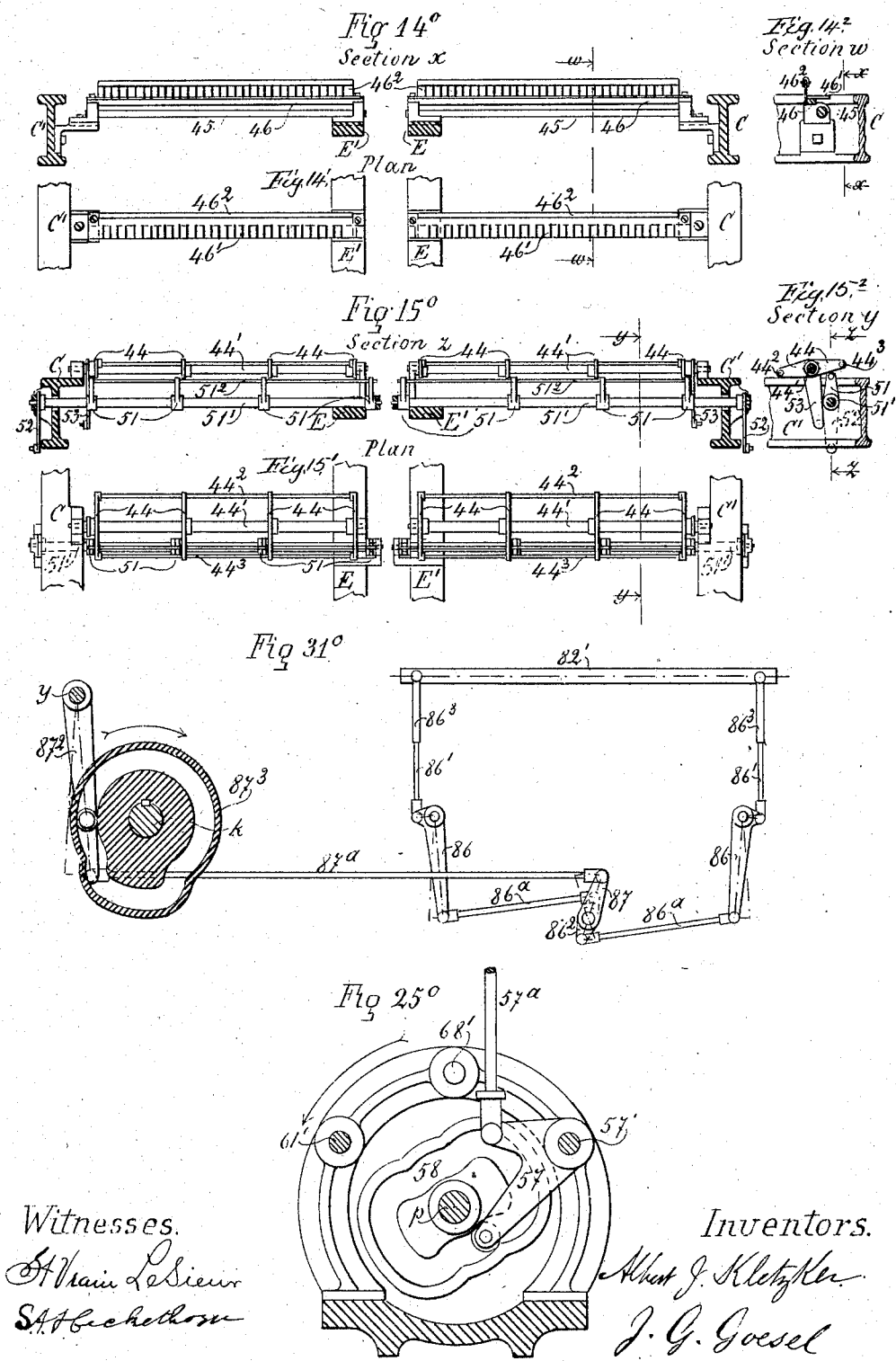

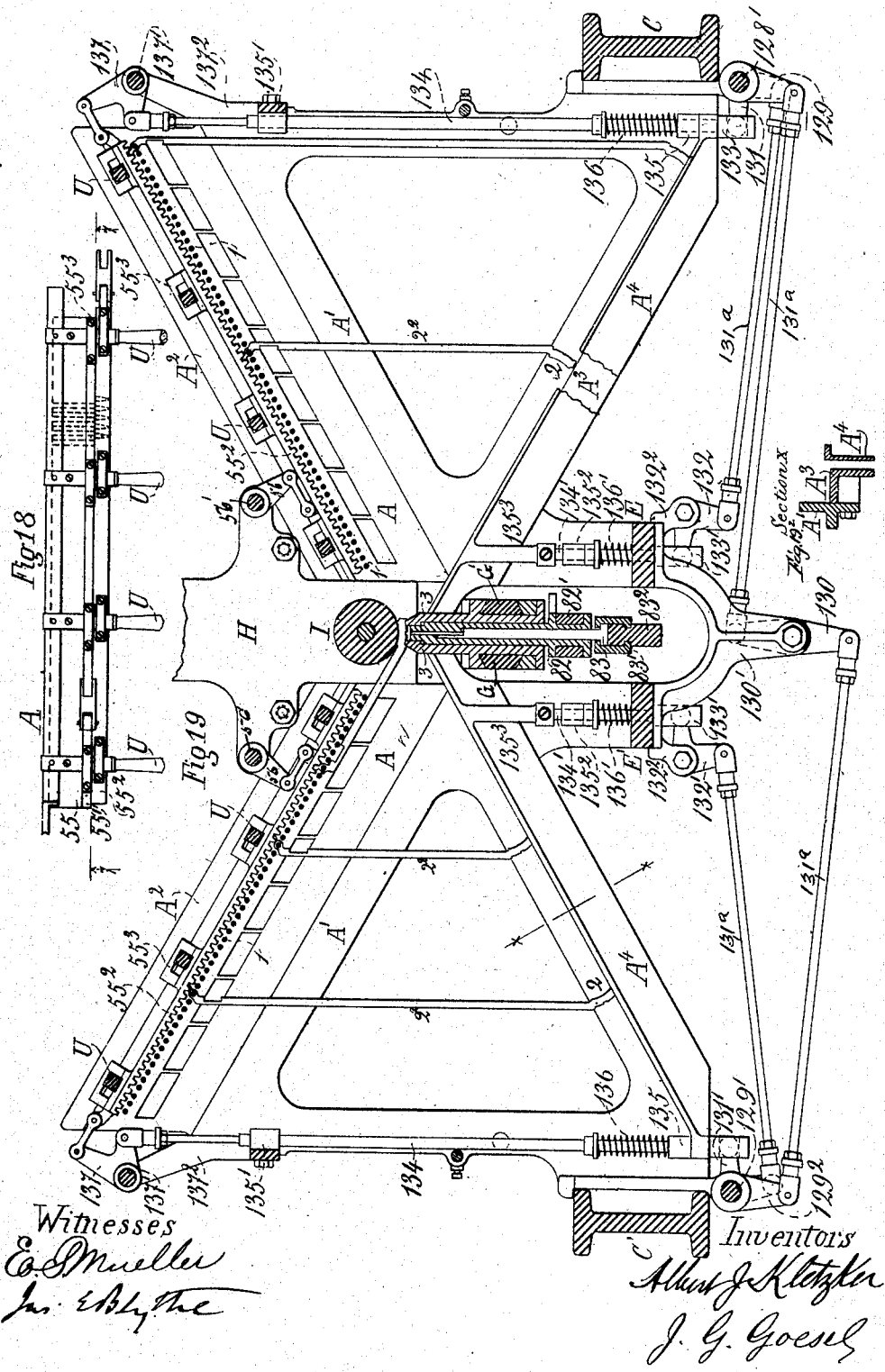

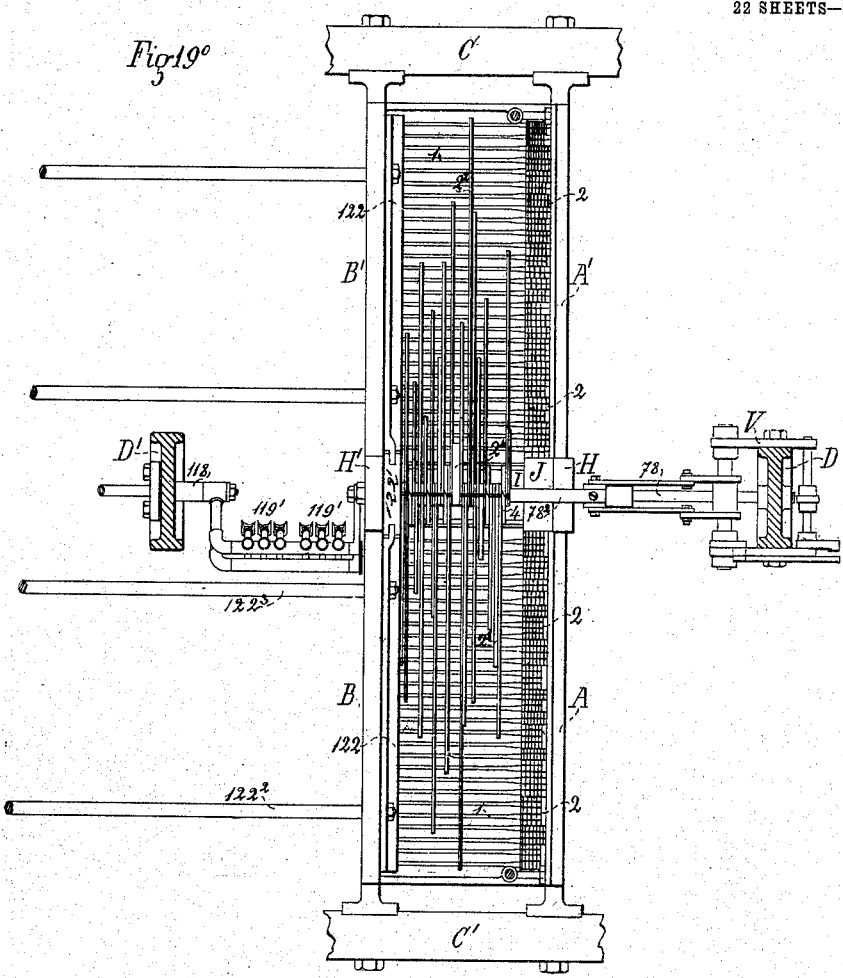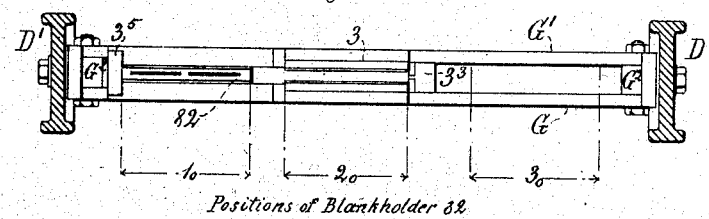
Positions of Blankholder 32
1. Feeding & Heating. 2. Stamping
3. Discharging

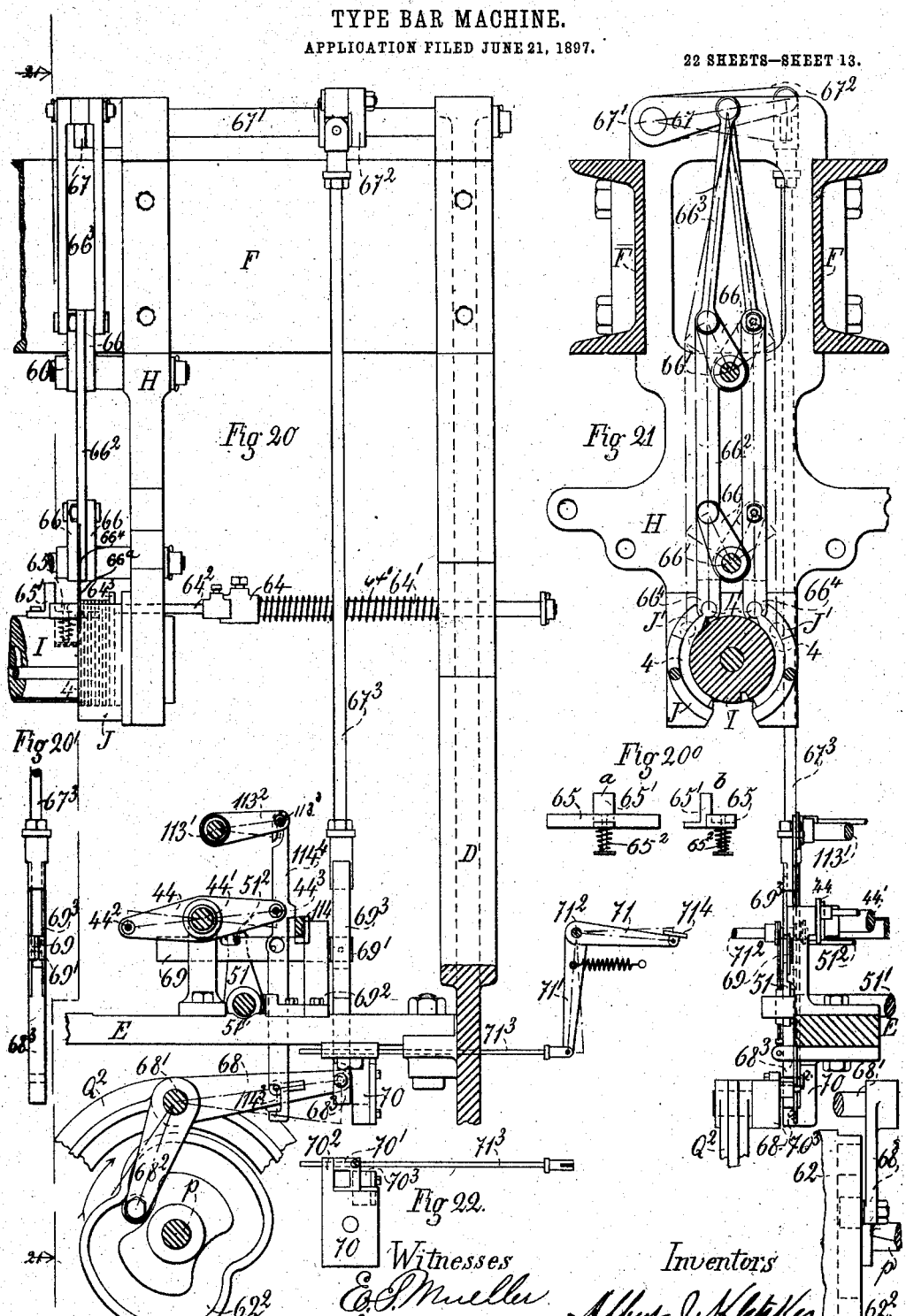

No. 840,346. PATENTED JAN. 1, 1907.
A. J. KLETZKER & J. G. GOESEL.
TYPE BAR MACHINE.
APPLICATION FILED JUNE 21, 1897.

22 SHEETS—SHEET 14.

Witnesses
E. Mueller
Jno. E. Blythe

Inventors
Albert J. Kletzker
J. G. Goesel

No. 840,346. PATENTED JAN. 1, 1907.
A. J. KLETZKER & J. G. GOESEL.
TYPE BAR MACHINE.
APPLICATION FILED JUNE 21, 1897.
22 SHEETS—SHEET 15.
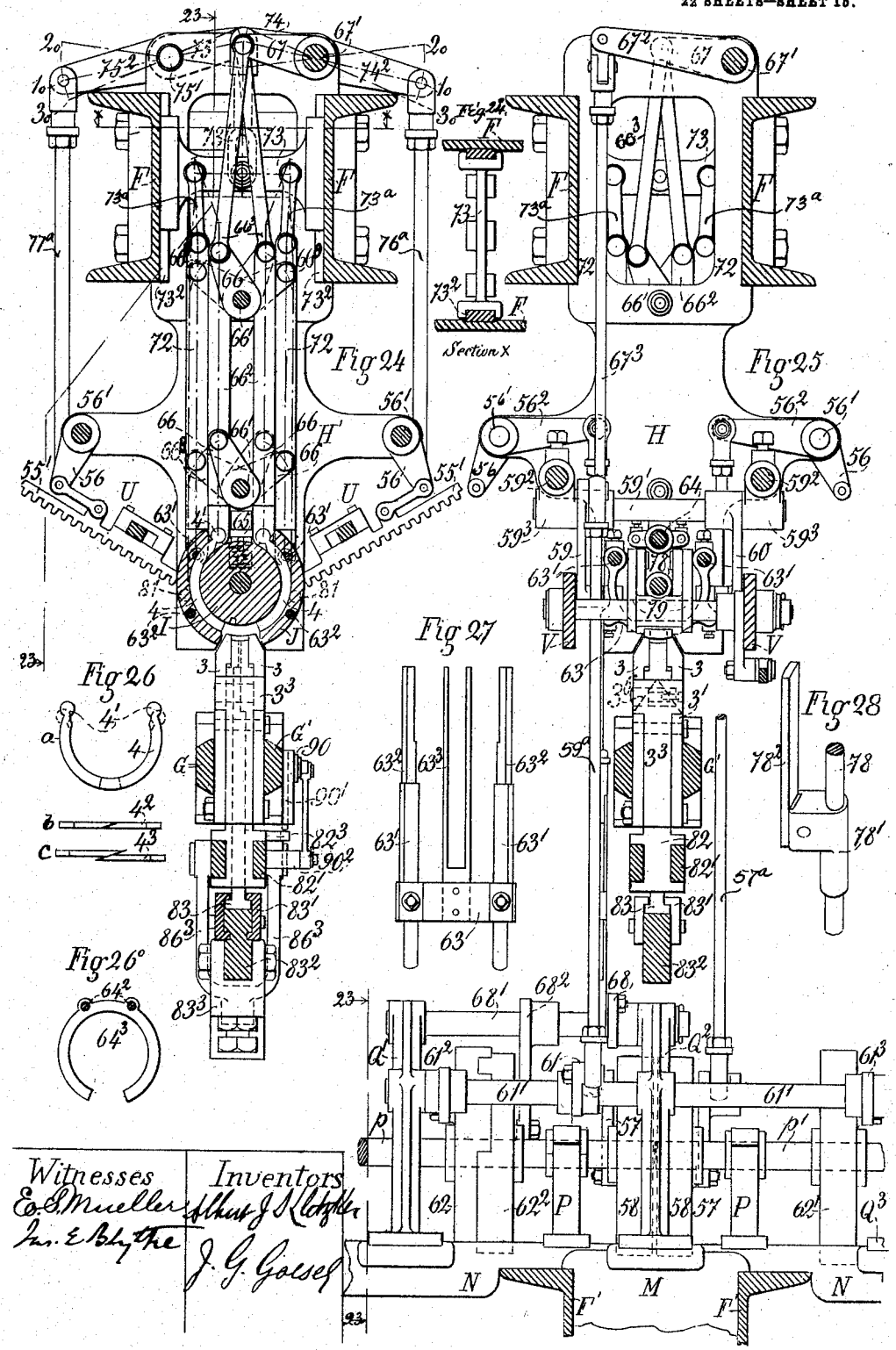

No. 840,346. PATENTED JAN. 1, 1907.
A. J. KLETZKER & J. G. GOESEL.
TYPE BAR MACHINE.
APPLICATION FILED JUNE 21, 1897.
22 SHEETS—SHEET 16.
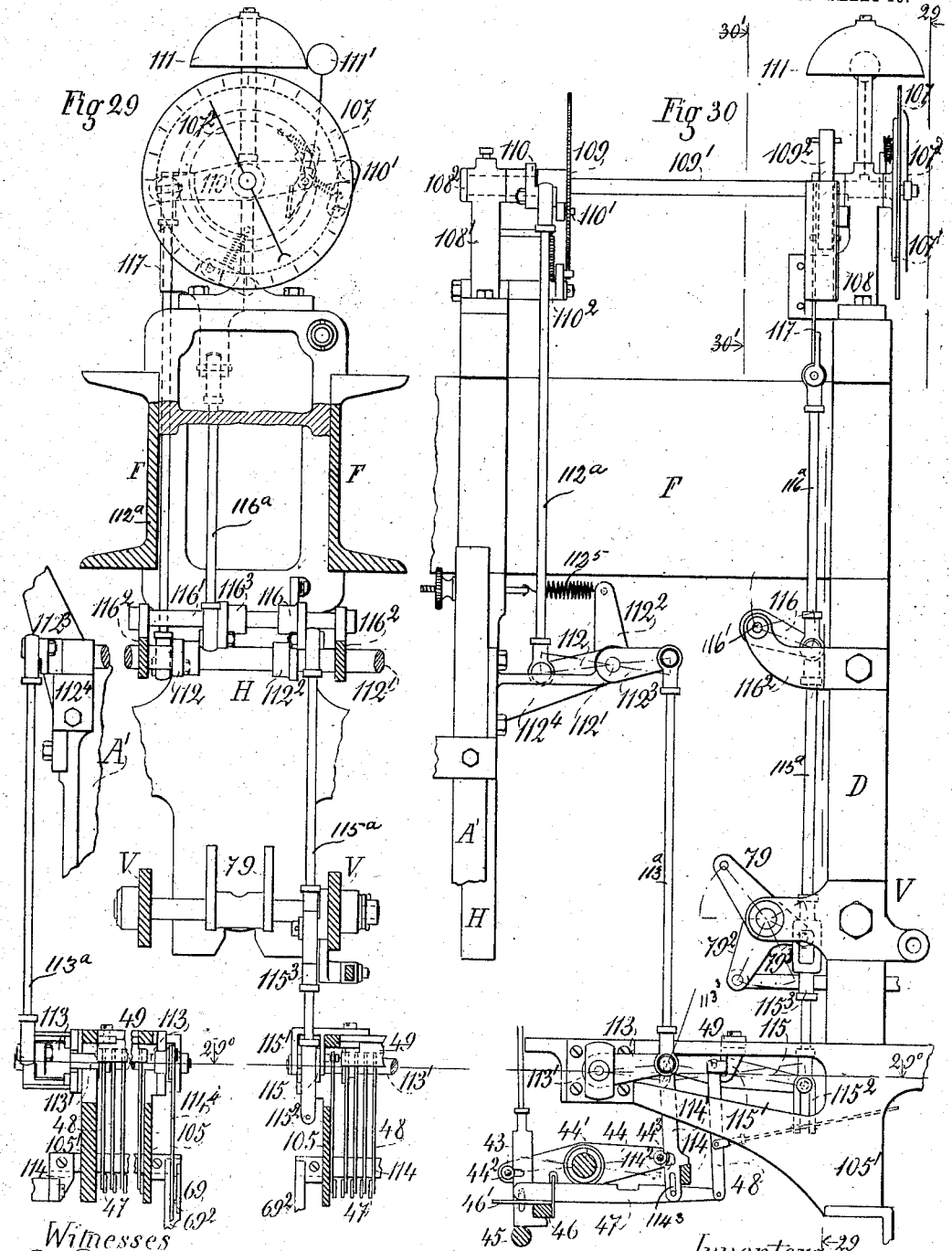

No. 840,346. PATENTED JAN. 1, 1907.
A. J. KLETZKER & J. G. GOESEL.
TYPE BAR MACHINE.
APPLICATION FILED JUNE 21, 1897.
22 SHEETS—SHEET 17.
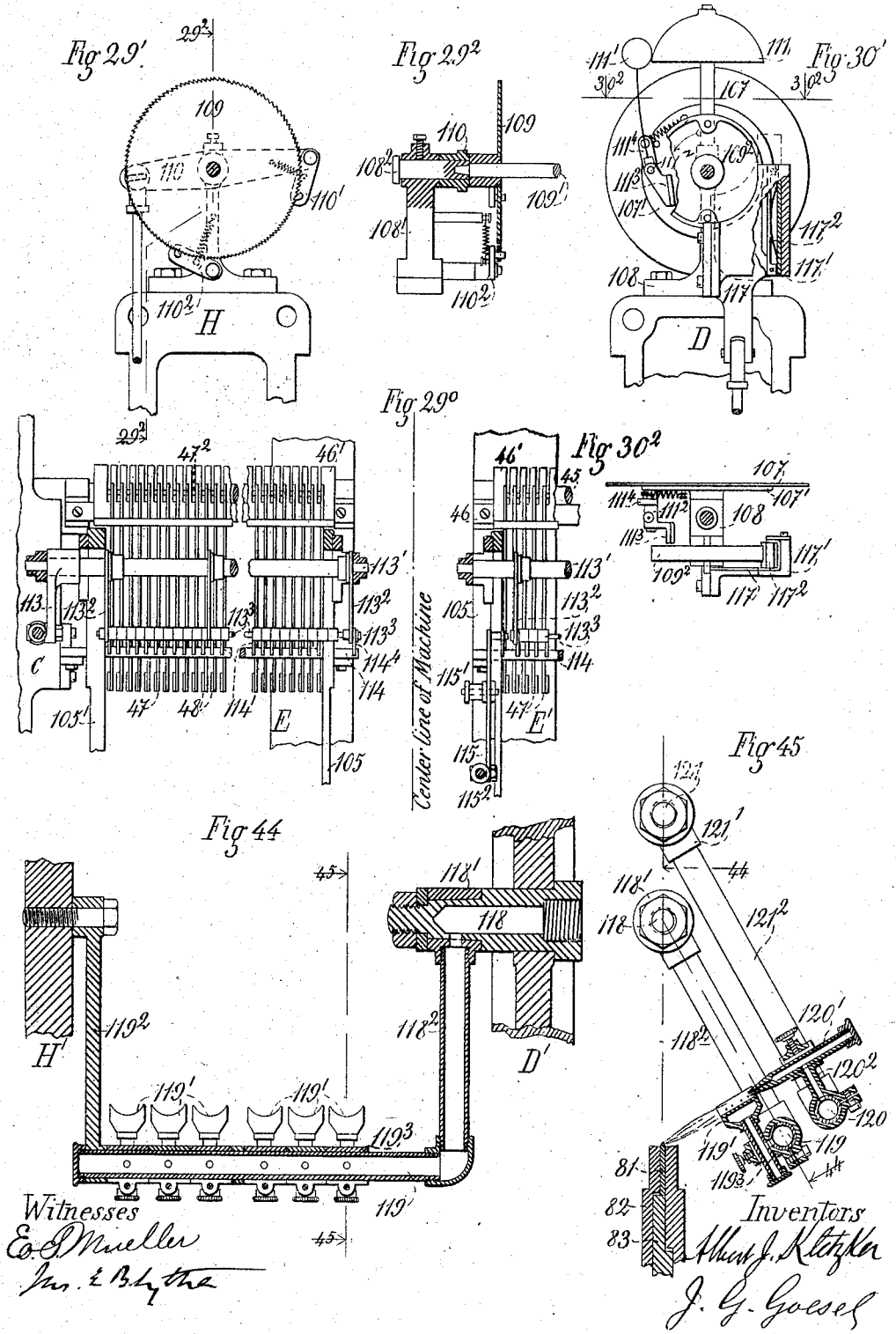

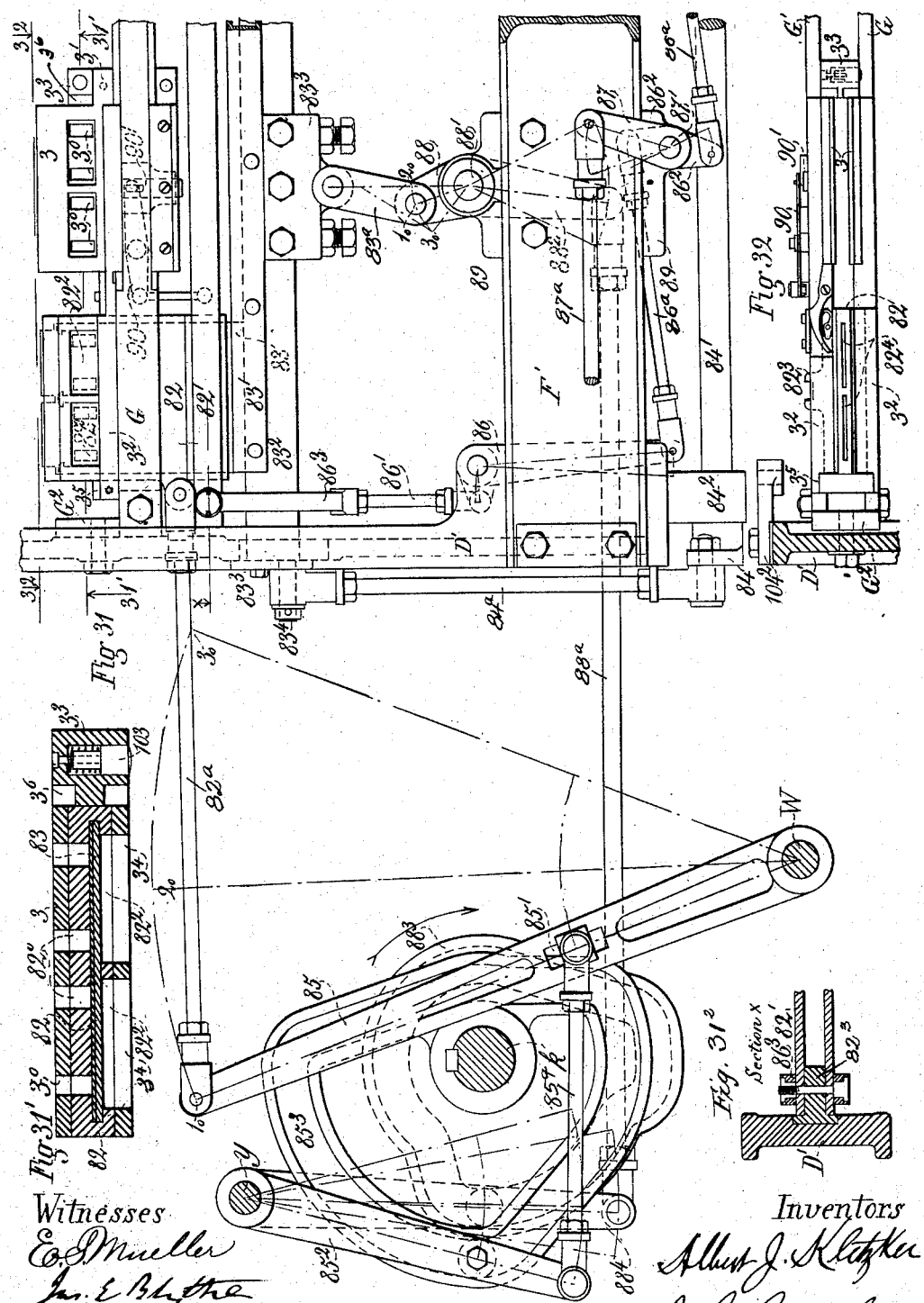

No. 840,346. PATENTED JAN. 1, 1907.
A. J. KLETZKER & J. G. GOESEL.
TYPE BAR MACHINE.
APPLICATION FILED JUNE 21, 1897.

22 SHEETS—SHEET 19.

Witnesses
E. S. Mueller
Jno. E. Blythe

Inventors
Albert J. Kletzker
J. G. Goesel

THE NORRIS PETERS CO., WASHINGTON, D. C.

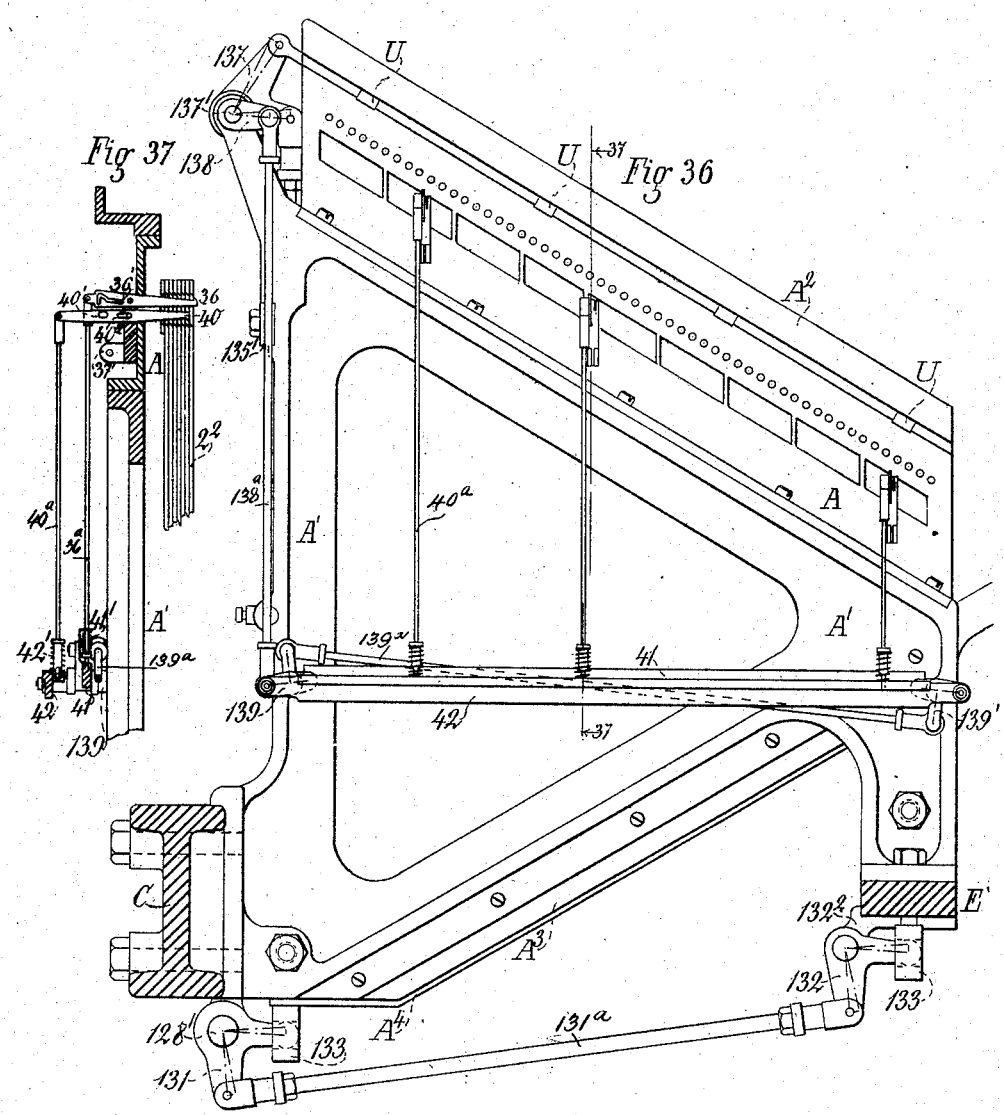

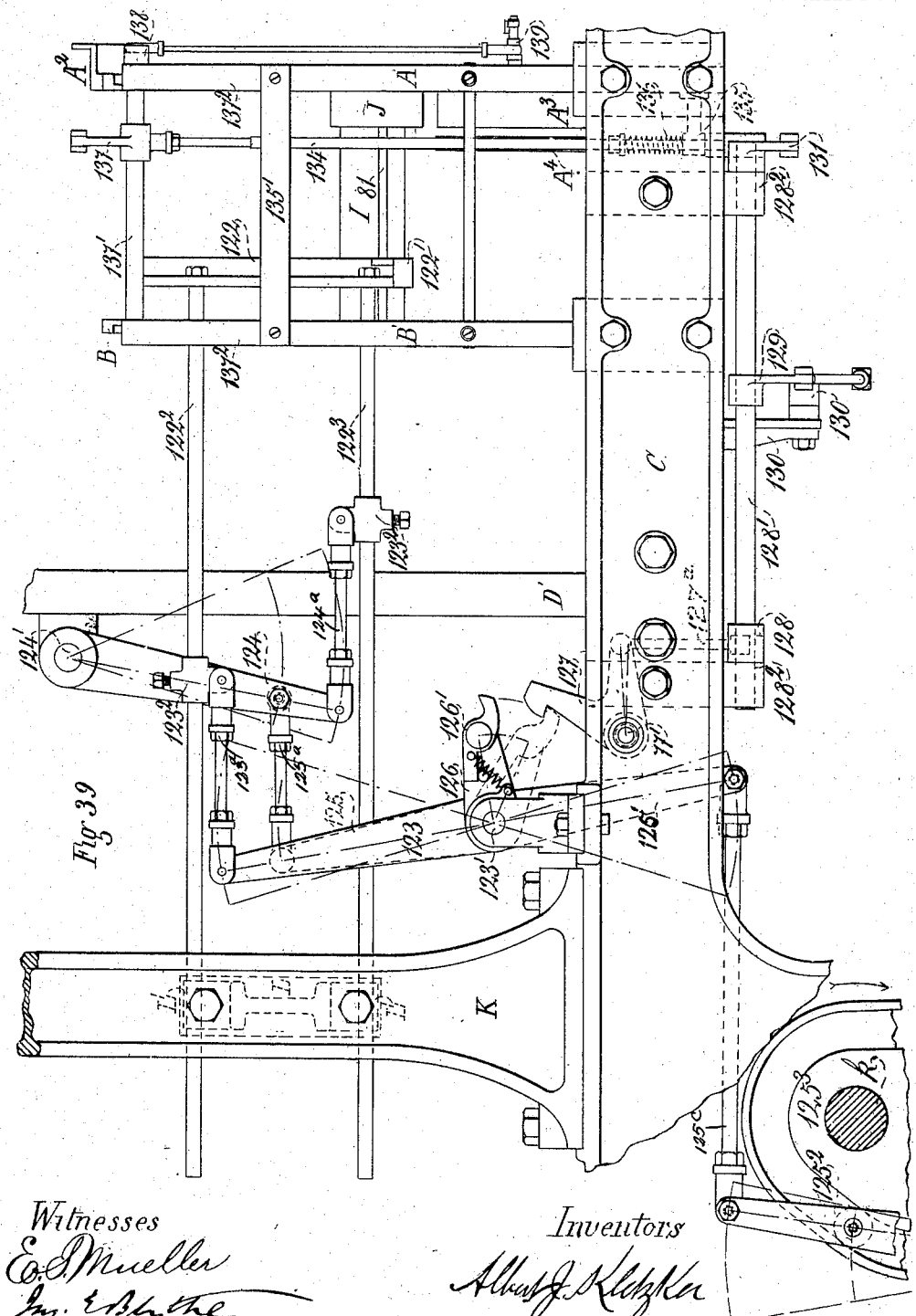

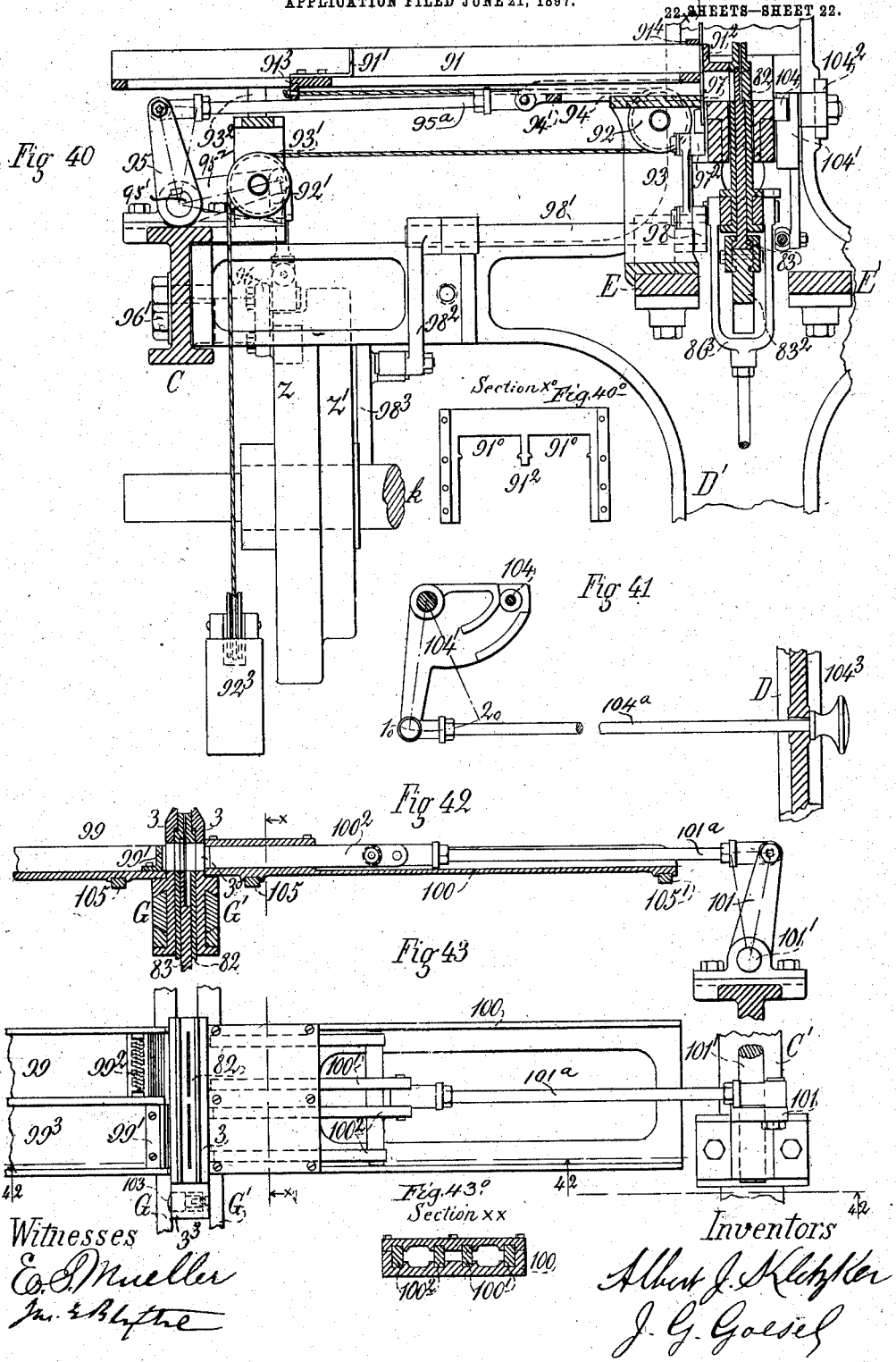

UNITED STATES PATENT OFFICE.

ALBERT J. KLETZKER AND JOHN G. GOESEL, OF ST. LOUIS, MISSOURI, ASSIGNORS TO THE DUPLEX TYPELINE COMPANY, A CORPORATION.

TYPE-BAR MACHINE.

No. 840,346.   Specification of Letters Patent.   Patented Jan. 1, 1907.

Application filed June 21, 1897. Serial No. 641,722.

*To all whom it may concern:*

Be it known that we, ALBERT J. KLETZKER and JOHN G. GOESEL, citizens of the United States, residing in the city of St. Louis, State of Missouri, have invented a new and Improved Type-Bar Machine, of which the following is a specification.

The invention relates to improvements in machines for the production of printing or type characters in lines of any convenient length, the characters being formed in relief on softened edges of metallic type-bar blanks of homogeneous composition from an assembled line of matrices sunk in plates, making part of matrix-bars dependent from a series of stationary rods parallel to each other, the matrix-plates being assembled in line by mechanical arrangements brought into action by manipulating finger-keys.

The invention consists, first, in the construction and arrangement of matrix-plates connected to suitable bars, so that they may be suspended from a series of horizontal, parallel, stationary, straight rods of circular section, all of equal length and supported at their ends in two parallel fixed frames; second, in the mechanism assembling the matrix-plates in line; third, in the spacing and justification mechanism; fourth, in the construction of the keyboard and its connection with the mechanism operating matrix-bars; fifth, in the mechanical arrangement for feeding type-bar blanks into a holder inclosing all but the upper projecting edges thereof;
sixth, in softening, by the application of heat, said upper horizontal edge of a type-bar blank projecting from the upper surface of the inclosing holder; seventh, in the mechanism for conveying type-bar blanks in an inclosing holder under an assembled line of matrix-plates; eighth, in the mechanism for embossing printing characters from an assembled line of matrix-plates on the softened edge of a type-bar blank in an inclosing holder; ninth, in the mechanism for discharging the embossed type-bars onto a galley; tenth, in the distributing mechanism of the matrix-bars and spacing-plates; eleventh, in the means employed for making corrections;
twelfth, in the mechanism indicating the progressive formation of the matrix-line In the accompanying drawings, Figure 1 is a front elevation, Fig. 2 a side elevation, Fig. 3 a plan, of the general arrangement of the machine. In all three views the matrix-bars, the mechanism immediately operating them, and other parts have been omitted, Fig. 3 being a sectional view below line 3 of Figs. 1 and 2. Fig. 1' is a detail of the arrangement for operating the justification mechanism. Fig. 4 and Fig. 5 are side and front elevations of the matrix - operating mechanism; Fig. 4' and Fig. 4², details in section relating to suspension-rods of matrix-bars; Fig. 6, detail of matrix-plate, bar, and eye. Fig. 7 is an elevation showing the arrangement of the suspension-rods, the matrix-bars, the supporting-slides, the mandrel, and the operating-rack in relation to each other. Fig. 8 and Fig. 9 are a side elevation and a plan of the mechanism transmitting motion from the revolving pulley to the main cam-shaft and automatically stopping it; Fig. 10 and Fig. 11, details relating to Figs. 8 and 9; Fig. 12 and Fig. 13, elevation and plan of keyboard. Fig. 12⁰ is an elevation of journal-bar $106^2$ and a section on line $x^0$, Fig. 13, of bars 106 and 106'. Fig. 13⁰ is a section on line $x$ $x$ of Fig. 13, showing the step-like arrangement of the keyboard. Fig. 13' is a detailed longitudinal elevation of bar 49; Fig. 14, side elevation of connections between key-levers, cam-shaft, and matrix-bar - operating mechanism. Fig. 14⁰ is a front elevation of the supporting-rods 45 and of the guide-bars 46 and connected parts in section on line $x$ $x$, Fig. 14². Fig. 14' is a plan of the same parts, and Fig. 14² a side elevation of the same parts in section on line $w$ of Figs. 14⁰ and 14'; Fig. 15, same as Fig. 14, showing position of parts when one key-lever is depressed. Fig. 15⁰ is a front elevation of shafts 44' and 52', with supporting-frame and levers and rods connected with the shafts in section on line $z$ of Fig. 15². Fig. 15' is a plan of the same parts. Fig. 15² is a side elevation of these parts in section on line $y$ of Figs. 15⁰ and 15'. Fig. 16 shows action of cam on connected levers; Fig. 17, front elevation of normally revolving cone, of levers operating clutch, and of part of cam-shaft; Fig. 18, plan of stationary rack, of matrix-bar-operating rack, and of guiding-rack; Fig. 19, section on line 19, Figs. 2 and 3, showing relations between triangular frames, guide-plates, racks, matrix-bars, and other parts. Fig. 19⁰ is a plan view, seen from the under side, of the two parallel frames A' and B', the two guide-plates A³ and A⁴ being omitted, of the rods 1 and matrix-plates 2 and bars 2', suspended therefrom, and of two assembled lines of matrix-plates 2 and justifying spacing-plates 4, the two lines being separated by the spacer 2⁴ and locked up between the locking-bolt 78² and the distributing-collar 122'. In the same view is shown the position of these parts in relation to the cross-frames D and D', shown in horizontal section on a line passing over the upper edge of supporting-slide 3 and also in relation to the blowpipe apparatus 119' for heating the top edge of the line-blanks. Fig. 19' represents the same horizontal section of the two cross-frames D and D', seen from above, and showing in plan the two slide-bars G and G' and their connection with the cross-frames, the supporting-slide 3, and the blank-holder 82, both in the normal position of rest, the different positions of the blank-holder when in operation being indicated by the dotted lines, and the numerals $1_0$, $2_0$, and $3_0$, corresponding with the same numerals in Fig. 31, representing an elevation of the operating mechanism. Fig. 19² is a cross-section on line $x\,x$ of Fig. 19 of the lower side of triangular frame A' and of the guide-plates A³ and A⁴; Fig. 20 and Fig. 21, side and front elevation of spacer-operating mechanism. Fig. 20⁰ represents two views in detail of bar 65, with bracket 65' and spring 65², of which $a$ is the front and $b$ the side elevation. Fig. 20' is a detailed front view of the lower joint part of connecting-rod 67³, showing its construction and its connection with slide-plate 69; Fig. 22, plan of supporting-bracket 70; Fig. 23, elevation, partly in section, on line 23 of Figs. 24 and 25, of justification arrangement and connected operating parts; Fig. 24, section on line 24 of Fig. 23. Fig. 24⁰ is a plan in section on line $x\,x$ of Fig. 24, of the cross-head 73 and guide-strips 73²; Fig. 25, section on line 25 of Fig. 23. Fig. 26 represents the plates for variable spacing or for justification, $a$ being an elevation, and $b$ a plan, of the plates when overlapping at the beveled parts. $c$ shows in plan the position of the two plates, one in relation to the other, for an expanded space; Fig. 27, detail in plan of pushing-rods; Fig. 28, perspective view of locking-bolt; Fig. 29, front elevation and part section on line 29 of Fig. 30. Fig. 29⁰ is a plan in section, on line 29⁰ of Figs. 29 and 30, of the shafts, levers, links, rods, and other parts connected with the slides 47. Fig. 29' is a front elevation of the indicating ratchet-wheel, of the supporting-bracket, the operating-lever, and of the pawls connected with the ratchet-wheel. Fig. 29² is a side elevation of the same parts in central section on line 29² of Fig. 29'; Fig. 30, side elevation of the mechanism indicating the progress of the assembling in line of the matrices, the beam F in front being omitted; Fig. 30', section on line 30' of Fig. 30, with parts broken away; Fig. 30², top view from line 30² of Fig. 30'; Fig. 31, elevation of the matrix-supporting and blank-holding slides and mechanism for operating them. Fig. 31⁰ is a plan view in central section, on line $x$ of Fig. 31, of bars 82' and connecting slide-block 82³ and the latter's connection with frame D' or D; Fig. 31', plan section on line 31' of Fig. 31; Fig. 32, plan from line 32 of Fig. 31 of supporting and blank-holding slides; Fig. 33 and Fig. 34, elevation and plan of the blank-feeding mechanism; Fig. 33', central section of blank-holder, on line 33' of Fig. 34; Fig. 33², detail of blank-pushing slide at line 33² of Fig. 34; Fig. 34', plan of matrix-supporting and blank-holding slides; Fig. 35, front and side elevation of line-blank; Fig. 36, mechanism acting during distribution of the matrices; Fig. 37, section on line 37 of Fig. 36; Fig. 38, detail of distributing-bars and sleeve; Fig. 39, distributing mechanism of matrices and spacing-plates; Fig. 40, sectional elevation of blank-feeding mechanism, on line 40 of Fig. 34. Fig. 40⁰ is a front elevation of the guide-box for the introduction in the blank-holder of the type-bar blanks; Fig. 41, disengaging lever and rod for corrections; Fig. 42, section on line 42 of Fig. 43; Fig. 43, plan of line-discharging mechanism. Fig. 43⁰ is a cross-section on line $x\,x$ of Fig. 43; Fig. 44, section on line 44 of Fig. 45 of blank-heating arrangement; Fig. 45, section of blank-heating arrangement of Fig. 44 on line 45.

Two series of rods 1, Fig. 19 and Fig. 19⁰, are supported near their ends by the parallel frame-plates A and B in the manner shown in Fig. 4'. (See also Figs. 2 and 3 for the position in the machine of A and B, where the rods 1 are, however, not shown, as they would only be represented by a series of parallel cross-lines between A and B, obliterating the view of other important parts.) All the rods are solid, of circular section, and of equal length. The centers of the rods 1 of one series are in a straight line (see Figs. 1, 5, 7, 19, and 36) equidistant from each other. The rods are supported near their ends in a horizontal position in the two parallel frame-plates A and B, the latter being fastened to the triangular frames A' and B'. The two series of rods 1 are in this manner held in an inclined position to each other, while each individual rod is placed horizontally between its two frame-plates A and B. The frame-plates A and B are rigidly held at proper distance apart parallel to each other by the cross-ties U. The two pairs of matrix-frames A' A' and B' B' are rigidly connected at their outer ends to the two standards C and C' and at their inner ends to two plates E and E', which are fastened at a short distance from the center line of the machine to the two cross-pieces D and D', the latter by means of flanges at their horizontal ends being bolted to the two standards C and C'. The two cross-pieces D and D' are solidly connected by strong beams F F at their upper ends and F' F' at their lower ends. Intermediate between these two pairs of beams F and F' the two slide-bars G and G' are fastened to the cross-pieces D and D', so as to be adjustable vertically. They carry the movable slides 3 for the support of the matrix-plates 2 when the latter are assembled to form lines. Between the two upper beams F F are fastened the two hangers H and H', the lower extremities of which are rigidly connected by the mandrel I. The latter is provided at one end with a sleeve J, partially cut out at the top and bottom for the reception and support of two equal rows of spacing-plates 4. (See Figs. 20, 24, and 26.) To rear ends of standards C and C' are fastened the upright supports K, with the cross-connecting bar L and the air-pump $a$, compressed-air reservoir $b$, receiving and delivery chambers $b'$ and $b^2$, Figs. 1, 2, 3, and 39.

*Driving arrangement*, (see Figs. 1, 2, 3.)— From a line-shafting driven by any kind of a motor the motion is transferred by means of a belt to cone-pulley $d$ and counter-shaft $c$, the latter running in journal-boxes $e$ on supporting-uprights K. To the primary counter-shaft $c$ are fastened besides the cone-pulley $d$ pulleys $i$ and $f$ and eccentric $a^2$. From pulley $f$ the motion is transmitted by a belt to pulley $g$, fastened to counter-shaft $h$, and from pulley $i$ also by belt to pulley $j$, the latter running idle on the main cam-shaft $k$ of the machine, Fig. 9. The secondary counter-shaft $h$, by means of the cone-pulleys $l$, fastened at its ends, drives the two cone-pulleys $m$ by belting, and thereby imparts motion to the two short shafts $n\ n'$, Figs. 14 and 17, and to the sliding clutches $o$, fitted to them. The two shafts $n\ n'$ and the two cam-shafts $p\ p'$ are laid in line in the journal-boxes P, Figs. 14, 15, and 17. The latter are fastened to the supporting-plates N, which are bolted at the central part of the machine to casting M, Fig. 25, inserted and fastened between the lower beams F' and near their outside ends to the standards C and C'. The circularly-arched brackets Q, to which are fulcrumed various levers transmitting motion from cams fastened to shafts $p\ p'$, are also fastened to plates N, so are the brackets R and S, in which are bearings for fulcrum-shafts of levers provided for starting and stopping the motion of the cam-shafts $p$ or $p'$.

At the outer extremities of each of the two cam-shafts $p$ and $p'$ are fastened the disks $q$ with the lugs $q^0$ and $q'$, placed on the face of each disk diametrically opposite at some distance from the center. On the same face of each disk is formed a projecting ring 5, having teeth matching in the teeth of the sliding clutch $o$, which is operated by levers 6 through a collar in which the clutch $o$ revolves. The levers 6 are fastened to the fulcrum-shaft 7, which turns in bearings in brackets R, Figs. 14, 15, and 17. To one end of shaft 7 is fastened lever 8, to which a tension-spring 9 is connected, the regulation of the tension of the spring being performed by turning nut $9^2$ on stationary bracket $9'$, through which the threaded stem connected to one end of the spring passes. To shaft 7 is also fastened lever 10, having at its upper end a beveled projection which is curved to the radius from the center of disk $q$. In the normal position of lever 10 the under part of the projection is clear of the upper edge of lug $q'$, and the end of the projection abuts against the side of spring-cap 11 on top of stop-lever 12, which with lever-arm 13 is fastened to the short fulcrum-shaft, turning in bearings in brackets S. The movable spring-cap 11 of the stop-lever 12 is hinged at its upper end to an extension $11'$, Fig. 15, and is held in position against a stop-pin by a spring. Levers 14 and 16 are fastened to the fulcrum-shaft, turning in bearings in the brackets S'. Levers 13 and 14 are connected by link 15. The stop-lever 12 has a shoulder normally engaged under the lug $q'$ on disk $q$, as shown in Figs. 14 and 15. In this position the upper edge of lever 16 is just below the under edge of lug $q^0$. When lever 13 is moved in the position shown in Fig. 15, (in which parts of levers 13 and 14 are represented as broken away,) then the stop-shoulder of lever 12 will be clear of lug $q'$, while the inner top edge of lever 16 will be inside of the outer circumferential face of the lug $q^0$. The spring-cap 11 will at the same time have released lever 10, and the sliding clutch O by the action of spring 9 on levers 8 and 6 will move in gear with the teeth 5 on disk $q$. Through the sliding clutch connected to shaft $n$ so as to rotate with it the rotary motion of pulley $m$ and of shaft $n$ is transmitted to disk $q$ and to shaft $p$ in the direction indicated by an arrow in Fig. 15. After a little less than half a revolution of disk $q$ the front face of lug $q^0$ will come in contact with the beveled top part of lever 10 and by the momentum of the rotating parts fastened to shaft $p$ will drive lever 10 sufficiently back to disengage the sliding clutch. Simultaneously the outer face of lug $q'$ will have come in contact with the inner edge of lever 16 and by its motion move this lever, as also levers 14, 13, and 12, connected with it in the position shown in Fig. 14. The lug $q^0$ in moving toward the shoulder of lever 12 will push the spring-cap 11 out of its way, which will spring back in its normal position as soon as the lug has reached the stop, whereby it will occupy a position between the disk $q$ and the extreme end of the beveled projection of lever 10, thus holding this lever in its normal position, as shown in Fig. 17. The spring-cap 11 by springing forward over the upper face of lug $q^0$, which now occupies the position $q'$, when the latter reaches the stop-shoulder of lever 12, will prevent a rebounding motion of the disk $q$.

The parts transmitting motion from the cone-pulleys $m$ to the two cam-shafts $p$ $p'$ are duplicated right and left. One of the shafts $p$ and $p'$ can be operated independently of the other and each of them operates one series of matrix-bars.

The pulley $j$, which runs idle on the main cam-shaft $k$, is driven by belt from pulley $i$ on counter-shaft $c$, Fig. 1. The web of pulley $j$ has a projecting ring with teeth at its face, Fig. 9. To the shaft $k$ is securely fastened by means of set-screw or key the collar $r$, having two arms $s$. The ends of the arms $s$ are engaged in lugs on the inside circumference of the sliding clutch $t$, Figs. 9 and 10, so that the latter can slide longitudinally on shaft $k$. The face of the rim of clutch $t$ is provided with teeth matching in the teeth of pulley $j$. To the projecting hub of $t$ is fitted a collar $t'$, which is connected by easy-working screws to the ends of levers 17, Figs. 8 and 9, the latter being fastened to the upright shaft 18, which turns in bearings in the brackets $u$, fastened to the standard C'. To the same shaft are fastened the levers 19 on top and 20 near the lower end. The end of lever 20 is connected by a link to lever 21, which is fastened to the upright fulcrum-shaft 22, supported in bearings in the lugs $v$, cast or fastened to the standard C'. To the top of shaft 22 is fitted the hub of angle-lever 24, so as to turn freely on the shaft. This lever is held in place by the set-collar 22'. The arm 24' is connected by a link to lever 25, which is fastened to a fulcrum-pin turning in lug $v'$, fastened or cast to C'. To the same pin on top of $v'$ is fastened the catch-lever 26, serving as an abutment for the end of lever 19. The end of this lever is held against lever 26 by spring 21', acting in tension on lever 21, to which it is directly connected and through it on levers 20, 19, and also 17, the latter holding in this manner the clutch $t$ normally in a fixed position out of gear of the toothed ring or pulley $j$. The abutting end of lever 26 is held against a shoulder near the end of lever 19 by a spring 25', acting in tension on lever 25, to which it is connected. This spring also holds the angle-lever 24 in a fixed position.

To the cross-frame D are fastened two bearings T for the horizontal fulcrum-shaft 30', to which are fastened the hand-lever 29, the angle-lever 31 31', and lever 30. The end of lever 30 is connected to lever 27 with fulcrum on rod $y$ by a connecting-rod 30ᵃ. A friction-roller 27', turning freely on a suitable bolt fastened to the end of lever 27, is engaged in a cam $x$, keyed to main cam-shaft $k$. The end of lever 23, which is fastened to the lower part of fulcrum-shaft 22, is connected to the arm 28' of angle-lever 28 by a connecting-rod 23ᵃ. The second arm of the angle-lever has a projecting nose $28^2$ in a position that a similar projecting nose $w'$ on the disk $w$, keyed to shaft $k$, can act upon it.

While the pulley $j$, driven by a belt, is revolving in the direction of the arrow, Fig. 8, no motion will be communicated to cam-shaft $k$ as long as the levers just described are in the position shown in Figs. 8, 9, and 11. When the hand-lever 29 is depressed, as indicated by center lines, levers 30 and 27 and angle-lever 24, pushed at a downward projecting boss at its end by collar $24^2$, as also levers 25 and 26, will be moved in new positions, (shown by center lines,) the abutting end of lever 19 will be released, and by the action of spring 21' on connected levers 21, 20, and 17 the clutch $t$ will be pushed in gear with the dented ring of pulley $j$ and impart motion to cam-shaft $k$ and all the cams fastened to it. By the action of spring 21' the lever 23 and connected angle-lever 28 will be moved in positions, so that the projecting nose $28^2$ will come close to the periphery of the circular part of disk $w$. At a certain part of the revolution of shaft $k$ cam $x$, by its action on lever 27, will move this lever as also levers 30 29 31, and all parts connected with them in the normal position of rest, thereby releasing angle-lever 24 and connected levers 25 and 26. For a short time shaft $k$ will continue its motion until the projecting nose $w'$ of disk $w$ will come in contact with projection $28^2$ and move angle-lever 28 and connected levers 23, 21, 20, and 17 back in their original position, thereby disconnecting clutch $t$ from pulley $j$ and stopping the motion of shaft $k$ in the exact position from which it started. Lever 19 will have moved back sufficiently to let lever 26, by the action of spring 25', snap in its original position.

*Mechanism collecting the matrices in line.*—From each rod 1, Fig. 7, are suspended a number of matrices of the same printing character. Each rod represents a small or capital letter of the alphabet, or a spacer, figure, fraction, punctuation-sign, or any other character in common use. The rods 1 are divided in two independent series, Figs. 1, 19, and 19°. The axes of all the rods are parallel to the axis of mandrel I. The axes of all the rods in one series are equidistant from each other in a plane inclined to a vertical imaginary plane passing through the axis of mandrel I. The angle of inclination is the same for both series, but may be considerably varied in different machines. The rods 1 are supported in holes in the frame-plates A and B in the manner shown in Fig. 4', which is a section of plates A and B at the center of the rods 1, a small number only being represented. The middle part of each rod 1 is of a smaller diameter than the ends. The end 1' in plate B, Figs. 4' and 4², is provided with a stop-pin 32, which engages under a strip screwed to plate B a little above the rods. This will prevent any of the rods 1 moving laterally, while any one of them may be withdrawn by turning it so as to disengage the pin from the strip 33.

A number or a row of matrix-bars are suspended from the end 1, engaged in plate A, Figs. 4 and 14. One matrix-bar at a time is fed forward to a point on the rod where the gradual contraction of its diameter begins. The object of the contraction of the middle part of rod 1 is to prevent binding of the eye 2' of the matrix-bar while it is moving along in the line being formed. The unequal length of the matrix-bars, Fig. 7, suspended from rods 1 at different distances from the lines to be formed, makes it desirable for uniformity in manufacture, Fig. 6, to form an eyepiece 2' and a matrix-plate 2 of the same shape for all matrix-bars of the machine and a bar 2² of variable length connecting the eyepiece 2' and the matrix-plate 2, on the convex edge of which the matrix in intaglio of the printing character is formed, Figs. 6 and 6⁰. The three parts are united by dovetail joints 2⁵ and 2⁶ and rivets to prevent lateral displacement. This assemblage shall hereinafter be designated by the name of "matrix-bars." The thickness of one matrix-bar is uniform throughout its length, therefore the same for all its parts. The thicknesses for the different characters and spacers used are multiples of a common unit, so that an assembled line will have a certain definite length of units, which are recorded by a special arrangement provided for the purpose.

The eyepiece 2' of all the matrix-bars has a rectangular cut-out or recess 2³, all at the same distance from the center of suspension-rods 1 and of the same length and width, Figs. 4, 6, 7, and 14. The top and bottom edges are beveled, the eye has at its upper part a single tooth 2⁰, placed so as to gear in a rack operating it. The spring 34', Fig. 4, acts on each row of matrix-bars through the lever 34, the short link, and the guide-rod 35 and guide-plate 35'. Rod 35 is guided in a hole in frame-plate A, and plate 35', fastened to the end of rod 35 and of similar shape as eyepieces 2'; except the dovetailed part, is guided on a rod 1. The plate 35' presses against the inner face of the row of matrix-bars suspended from one of the rods 1, while its outer face is held at a fixed position by the projecting hook of a lever 36, Figs. 4, 14, and 37. The fulcrum of lever 36 is in the base-plate of bracket 37, screwed to frame-plate A. The fulcrum of the secondary retaining-lever 39 is on the same pin as that of lever 36. In line vertically below 36 is the fulcrum of pawl-lever 40, and on the horizontally-projecting part 37' of bracket 37 is the fulcrum of angle-lever 38. The upright arm of lever 38 engages between the two levers 36 and 39. A pin projecting laterally from both sides of the upright arm of lever 38 near its upper end engages in the slot 36' on one side and 39' on the other side. A second pin nearer the fulcrum of angle-lever 38, projecting only from one side of 38, engages in the rectangular hole 40' of pawl-lever 40. The fulcrum-pin of this lever passes through an elongated slot 40², so that the pawl-lever 40 can rotate and move longitudinally on the pin. A row of matrix-bars suspended from any one of the rods 1 is held in place with its front face at the proper distance from frame-plate A by the upward projecting hook of lever 36. To the opposite end of the same lever is connected (resting loosely in a countersunk hole in bar 41) a vertical rod which is normally held down by a spring 41', acting in compression against a collar fastened to the rod, and an angle-strip 41², fastened to the bar 41. The end 40³ of the pawl-lever 40 is connected to the bar 42 by a rod, the lower joint of which is made by a slotted eye held in place by a wire laid in a groove of the dented rib of bar 42 and secured by a strip screwed to the upper part of the bar. The rod is normally held up by a spring 42', acting in compression between the jam-nut of the joint and the bar 42. One rod, connecting 40 and 42, can make a short motion vertically against the action of the spring independent of any other rod. None of the rods can move laterally, each of their lower joints being engaged in a separate indentation on the rib of bar 42. For the present the two rods 41 and 42 are supposed to be stationary, although they are movable at a certain stage of the operation of the machine. To the end of the horizontal arm of the angle-lever 38, Fig. 4, is joined a vertical rod 38ᵃ, to the lower end of which is fastened the flat joint-plate 43 with the recessed bearing or bearing-notch 43', the slot 43², and the horizontally-projecting heel 43³ at its lower end. In the vertical slot 43² is engaged a pin 47², Fig. 29⁰, fastened near one end of the sliding plate 47, Figs. 14, 15, and projecting from the face of 47. Each of the sliding plates 47 is guided in the indentations of strip 46², Figs. 1⁰, 14, and 15, fastened to the stationary rectangular rod 46, while the joint-plates 43 are guided by the indentations of the combed strip 46', also fastened to the rod 46. The end thus guided of the plate 47 is supported by the rod 46, on which it can freely slide. Its opposite end is joined to a link 48, suspended from a wire laid in a groove of the dented part of bar 49, Fig. 12. Each of the two bars 49 is fastened to a keyboard-frame. The key-levers 50 and the lever-arms 50' are rigidly connected under various angles by shafts or hubs. A few are made of one piece. The lever-arms 50' are connected to the suspension-links 48 by connecting-rods 50ª, joined to them, as shown in Figs. 12, 14, and 15. It must here be remarked that the parts enumerated, with the exception of bars 41, 42, and 49, constitute a set for each of the rods 1, from which rows of matrix-bars are suspended. These sets of operating parts are disposed in the machine in two series. All parts of each set (designated by the numbers from 34 to 43, inclusive) occupy the front part of the triangular frames A'. To avoid confusion, they are omitted in the Figs. 1, 2, 3, representing the general arrangement.

The two shafts 44', Figs. 14, 15, 2⁰, and the two shafts 51' are movable in bearings fastened to the side standards C and C' and to the central plates E and E', Figs. 15⁰ and 15'. To each of the shafts 44' are fastened a number of similar levers 44. The ends of the two lever-arms of these levers hold the cylindrical rods 44² on one side and 44³ on the opposite side, Figs. 14, 15, 15⁰, 15', 15², 16, and 20'. These rods are parallel to shafts 44'. At the outer end of each of the two shafts 44' are fastened the downward-projecting levers 53. The lower end of each of these levers is connected by a link to the end of the vertical arm of angle-lever 54, having its fulcrum on a stationary pin fastened to the bracket A. To the end of the second arm of angle-lever 54 is fastened a pin carrying a friction-roller 54', Fig. 16, which is engaged in the groove of cam $p^2$, fastened to shaft $p$ or $p'$. To each of the two shafts 51' are fastened a number of lever-arms 51, carrying at their upper forked ends the rods 51², rigidly secured in a position parallel to the shaft by pins. The levers intermediate between the extremes in this case, as in the case of those for shafts 44', are provided for the purpose of stiffening the weak rods held by them. To each of the two shafts 51' at the end outside of standard C or C' is fastened the downward-projecting lever-arm 52. The laterally-projecting pin at the lower end of this lever engages in a hole of the upper end of lever 13.

The two cylindrical rods 45 and the two rectangular rods 46 are fastened to the standards C and C' and to the central plates E E', Figs. 14, 14⁰, 14', 14², and 15. To the top of each rod 46 is fastened the guide-plate 46', provided with a number of indentations, in which the joint-plates 43 are guided in their motion. In the indentations of guide-plate 46², which is fastened in a vertical position to rod 46, are guided the sliding plates 47. The indentations of this plate being closed on top by an overlapping strip secured to 46² by pins, the motion can only take place longitudinally to the sliding plate 47. In the normal position of rest the lower end of the joint-plate 43 is supported by rod 45, and the heel 43³ is engaged under the rectangular rod 46. The bearing-notch 43' is opposite the rod 44². The connection between the plates 47 and rod 51² is made in such a manner that the forward motion of one of the sliding plates is communicated to the rod 51² and levers 51 and 52, while the backward motion is transmitted from the rod to the plate without disturbing the other plates from their normal position of rest. This may be performed in a variety of ways by projecting parts on plate 47, acting on rod 51², and vice versa. We have provided for this purpose the notch 47' on the upper edge of the sliding plate 47, the rod in its normal position being placed against the back edge and the notch being long enough for the rod to make its full motion without affecting the plate in its position of rest. When any one of the keys 50 is depressed, Fig. 15, the corresponding sliding plate 47 will move forward, carrying along with it the joint-plate 43, thereby engaging notch 43' into rod 44², and at the same time disengaging heel 43³ from the under side of rod 46. The same motion of plate 47 will carry forward the rod 51² and move all the levers fastened to shaft 51'. The pin at the end of lever 52 being engaged in a hole at the end of lever 13, the motion of lever 52 will be transmitted to 13 and to levers 14, 16, and 12, connected with it. The stop-shoulder of lever 12 will be disengaged from the under side of stop-pin 9' on disk 9, and the spring-cap 11 will be disengaged from the projecting nose of lever 10. The motion of shaft $n$ will be transmitted to shaft $p$ in the manner already described.

The rotary motion of cam $p^2$, fastened to shaft $p$, through its action on friction-roller 54', Fig. 16, will be transformed into a reciprocating motion of the connected levers 54, 53, 44, and 38. During the upward motion of rod 44² the vertical arm of angle-lever 38 will make the motion indicated by central chain-lines in Fig. 4. For the first part of this motion the pin engaged in the rectangular hole 40' of pawl-lever 40 will move from contact on one side to contact on the opposite side of 40', transmitting no motion to pawl-lever 40, while the pin engaged in the slots 36' and 39', Figs. 4, 14, 37, will move the lever-arms containing these slots in opposite direction—the arm of lever 36 upward against the action of spring 41' and the arm of lever 39 downward. On the other side of the fulcrum-pin the effect of this motion will be to disengage the hook of lever 36 from the first matrix-bar and simultaneously to engage the second matrix-bar by the hook of lever 39, so that the row of matrix-bars, with the exception of the first bar, will be held in place by the hook of lever 39 against the action of spring 34'. For the second part of the motion of angle-lever 38 the levers 36 and 39 will remain stationary, the slots in them being in this position concentric with the fulcrum of 38. The pawl-lever 40 will be pushed forward, pushing the released matrix-bar in the position shown in dotted lines, Fig. 14. In this position the tooth $2^0$ at the eye of the matrix-bar is engaged in the movable rack 55', Fig. 7, by the motion of which the matrix-plate 2 is brought in contact with mandrel I, as shown in dotted lines. To prevent any deviation of the matrix-plate in this motion, the angular guide-bar $A^3$, Fig. 19 and Fig. $19^2$, is fastened to the planed face of the triangular frame A' under the suspended magazines of matrix-bars a little below the lower end of the matrix-plates, Fig. 19.

At a little distance from the inner face of angle-bar $A^3$ and parallel with it is the movable guide-plate $A^4$. The space between the faces of $A^3$ and $A^4$ is sufficient to permit the free movement of the thickest matrix-bars used. The upper edge of $A^4$ projects slightly beyond the lower ends of the suspended matrix-bars in their normal position. When a matrix-bar is pushed out, the point of application of the acting force being below the point of suspension, the bar by assuming an oblique position is liable to bind on the suspension-rod 1. As the lower end of the matrix-plate is arrested by the projecting edge of $A^4$, the obliquity of the matrix-bar is limited to such an extent that no binding will take place, with a moderate play of the eye of the matrix-bar on the suspension-rod 1.

The two opposite and parallel frame-plates A and B are connected by a number of stays U, rabbeted and screwed to their upper edges, Figs. 1, 2, 3, 7, 18, 19, 36. In addition to stiffening and solidifying the framework the stays U are employed to support the three racks 55, 55', and $55^2$, Figs. 7, 18, 19. The teeth of all three are cut to the same shape and are of the same pitch, which is the distance between the centers of two subsequent rods 1. The rack 55' extends in width between the inner face of frame A to a trifle beyond the hooked end of lever 36, and being immovable and serving as a guide for the matrix-bars it is securely fastened under the rectangular part of the stays U. When in proper position, the teeth of all the matrix-bars being engaged in the spaces between the teeth of the rack, the matrix-bars will hang in a vertical position from the suspension-rods 1. The rack 55' is movable. In its normal position of rest when not in operation its teeth are exactly in line with those of rack 55, so that the tooth of any one of the matrix-bars can be moved from rack 55 into rack 55' without meeting the least resistance. Rack $55^2$ is also movable. In its position of rest its teeth coincide with the teeth of rack 55' after the latter has performed its full motion, so that the tooth of a matrix-bar engaged in a space of this rack can be moved easily in the corresponding space of rack $55^2$. The two movable racks 55' and $55^2$ are suspended from the rectangular parts of stays U by similar staples $55^3$, fastened to the racks by screws. Rack 55' and lever-arm 56 are connected by a link $56^a$, joined to a suitable projection of the rack and to the end of lever-arm 56, the latter being fastened to the fulcrum-shaft 56', turning in bearings in the two hangers H and H', Figs. 7, 23, 24, 25. To the front end, extending from hanger H, is fastened lever $56^2$, which is connected to the horizontal arm of lever 57 by a connecting-rod $57^a$, joined to the ends of the lever-arms, Fig. $25^0$. To the end of the second arm of angle-lever 57 is fastened a pin carrying a friction-roller $57^2$, engaging in the groove of cam 58, fastened to shaft $p$. The angle-lever 57 is fastened to a fulcrum-shaft 57', with bearings in the circular brackets Q' and $Q^2$. All the parts from the stationary racks 55 to the fulcrum-shaft 57' are duplicated as right and left parts, the two sets of parts being entirely distinct and independent from each other, as shown in Fig. 25, where one of the connecting-rods $57^a$ is shown as partially broken out, and the other is for the greatest part of its length covered by other rods in front of it. By depressing a key one of the two shafts $p$ or $p'$ is set in motion. The tooth of one matrix-bar is pushed in gear with rack 55'. Immediately angle-lever 57, and through connections rack 55', is moved in the position shown in Fig. 7 by dotted lines, the matrix-plate 2 of the matrix-bar acted on is swung up, moving between the faces of $A^3$ and $A^4$ in contact with mandrel I, and is held for an instant there, while other parts push the matrix-plate between supporting-slides 3 and mandrel I, pushing in this manner the tooth out of gear of rack 55' through rack $55^2$ along the reduced part of rod 1. Then the return motion of these parts will take place.

The two cylindrical rods $59^2$ are fastened in the front cross-frame D by set-screws and in the hanger H by nuts in a horizontal position parallel to each other, Figs. 1, 2, 23, and 25. The socket-bearings $59^3$ are fastened to these rods and support the fulcrum-shaft 59', to which are fastened the angle-lever 59 and the lever-arm 60. The horizontal arm of 59 and lever 61 are connected by a connecting-rod $59^a$, joined to their ends. Lever 61 is fastened to the fulcrum-shaft 61', which turns in bearings in the circular brackets Q', $Q^2$, and $Q^3$, (the latter not being shown in Fig. 25 for want of space, but appearing by a short broken part of its base.) To shaft 61' are also fastened the two similar levers $61^2$ and $61^3$, to the ends of which are fastened pins bearing friction-rollers engaged in the grooves of the two similar cams 62 and 62', cam 62 being fastened to shaft $p$ and cam 62' to shaft $p'$.

Projecting recesses $62^3$ are connected to the grooves of the two cams 62 and 62', so that when, for instance, shaft $p'$ turns, imparting an oscillatory motion through cam $62'$ to all the levers fastened to shaft $61'$, the friction-roller at the end of lever-arm $61^2$ will engage in the recess $62^3$ of cam 62 opposite to it. In this manner while the shaft $p'$ is in motion the shaft $p$ cannot move until the friction-roller is disengaged from the recess $62^3$ of cam 62, which will only take place after $p'$ has completed half of a revolution and has come to rest again. The same will take place in relation to $p'$ when shaft $p$ is in motion.

The vertical arm of angle-lever 59 and the lever-arm 60 are connected to the holder 63 by a short link on each side joined to the ends of the lever-arms and to bosses at the sides of the holder 63. The latter has the shape of about two-thirds of a flat ring with four sockets having cylindrical holes, a flat central lower part, and the above-mentioned bosses projecting sidewise, Figs. 23, 25, 27. To the upper two sockets are fastened two parallel cylindrical rods $63'$, which are made to slide easily in holes in cross-frame D and hanger H and sleeve J, the holes in the latter being concentric with the heads of spacing-plates 4 when in position to be fed in the line. The parts of rods $63'$ engaged in the holes of H and J are reduced in diameter and flattened where they pass over the row of spacing-plates contained in sleeve J. In two lower holes in H and J, in line with the matrix-bars when they are swung up against mandrel I, are fitted the two rods $63^2$, fastened to the two lower sockets of holder 63. To the flat under side of the latter is fastened the fork $63^3$, which engages in the space between mandrel I and slide 3. Immediately after a matrix-plate comes in contact with mandrel I the cam in motion, 62 or $62'$, will be in the position to start the motion of lever-arms $61^2$ or $61^3$. This motion will be transferred through lever 61 59 60 and connections to 63 and its supporting-rods $63'$, as also to the pusher-rods $63^2$ and to the fork $63^3$. The matrix-bar, which has been swung up in the space between the inner face of sleeve J and the outer end face of supporting-slides 3, will be pushed in the space between mandrel I and slides 3 by the ends of fork $63^3$ and of the pusher-rods $63^2$, these ends standing even with the inner face of J in their normal state of rest. In this operation the eye of the matrix-bar will be pushed from the thicker part of rod 1 to the part of reduced section, and its tooth will move out of gear of rack $55'$ through rack $55^2$ in the space provided for the matrix-bars collected in line.

*Mechanism operating justifying-spacers.*—In the space between the sleeve J and mandrel I are on each side an equal number of spacing-plates 4, which are supported by the projecting part of their circular heads $4'$ on top of the upper edge of J, Figs. 20, $20^0$, 21, 24, 26, $26^0$. When in this position, the lower beveled edges of the spacing-plates 4 are sufficiently apart to let fork $63^3$ move freely between them. All the spacing-plates 4 are of the same shape and of the same thickness. They are held even with the back face of sleeve J by the cross-bar 65, which is vertically movable on the angle-bracket $65'$, the latter being fastened to the top of mandrel I. The bar 65 is held down by a spring $65^2$, acting in compression between a washer on a pin fastened to bar 65 and the lower face of a flange of $65'$, through a hole of which the pin passes freely. The cross-bar 65 is guided in its vertical motion on the vertical projecting part of $65'$ and by the washer in the countersunk hole in mandrel I. The spacing-plates 4 are pressed together and against the cross-bar 65 by the spring $64^0$ acting in compression between the cross-frame D and the socket 64. To the latter is rigidly secured the cylindrical rod $64'$, holding the spring, and in two opposite horizontal extensions of 64 are fastened the two smaller cylindrical rods $64^2$, parallel with $64'$. The two rods $64^2$ are guided in holes in the hanger H, and the rod $64'$, in a hole in the cross-frame D, all the rods being fitted in the holes in such a manner that they will easily move. To the ends of the two rods $64^2$, extending toward the row of spacing-plates 4, is fastened the saddle-plate $64^3$, Fig. $26^0$, fitting easily over mandrel I and in the inside of J. The heads $4'$ of the first pair of spacing-plates pressed against the cross-bar 65 are normally engaged in the properly-shaped ends $66^4$ of plates having the same thickness as the spacing-plates fastened to the two links $66^2$. Each of these links is joined to two superposed lever-arms 66, turning on the two spindles $61'$, which are supported in holes in the two hangers H and $H'$, Figs. 20, 21, 23, and 24. The two upper lever-arms 66 are connected to the lever-arm 67, fastened to the shaft $67'$ by the links $66^3$, joined to their ends. The length of each of the lever-arms 66 from the center of the spindle $66'$ to the center of its joint with links $66^2$ and $66^3$ is equal to the distance between the center of mandrel I and the center of the head $4'$ of the spacing-plate 4, so that when the links are depressed the centers of the heads $4'$ will move in a circle concentric with the circumference of mandrel I. The shaft $67'$ turns in bearings on top of cross-frame D and of hanger H. To the end of lever $67^2$, also fastened to shaft $67'$, is joined by a universal joint the connecting-rod $67^3$, the lower end of which is composed of the screw-socket screwed to the rod, the rectangular notched joint-piece $68^3$, and the two side plates $69^3$, rigidly connecting the socket and joint $68^3$. Inside of the plates $69^3$ are fitted to a sliding fit the two side cheeks $69'$, and to the latter is joined by a pin the sliding plate 69. Fig. $20'$ is a back elevation of this lower part of connecting-rod $67^3$. The slide-plate 69, Fig. 20, is fitted in ways in the bearing-bracket of shaft 44' and in the bracket 69², both brackets being fastened to the frame-plate E. The upper edge of 69 is in line with the upper edges of slide-plates 47, and in the similar notch is engaged the rod 51² and operated in the same manner as by notch 47'. The lower end of the notched joint 68³ is normally supported by a lower projection of the hanging bracket 70, which is fastened to the under side of frame-plate E, Figs. 20 and 21 showing elevations in connection with other parts; Fig. 22, a detached plan of the bracket 70 and operating parts. When the connecting-rod 67³ is thus supported, the notch in joint 68³ is disconnected from the pin of lever-arm 68. (In Fig. 23 the rod 67³ is shown in this position; the bracket 70 is, however, omitted.) The sliding piece 70' is fastened to a circular rod 71³, guided in a hole in the extension 70² of the upper flange of bracket 70. The end of rod 71³ is joined to the under end of lever 71', which is fastened to the shaft 71², to which are also fastened the two horizontal levers 71, the latter being connected at their ends by the finger-plate 71⁴, Figs. 12, 13, 20. The shaft 71² turns in bearings fastened to the two inner side frames 105 of the keyboard. A spring acting in tension between a pin fastened to frame 105 and lever 71' holds the finger-plate 71⁴ up in its normal position. The sliding piece 70', which is shown in Fig. 13 in its normal position of rest, slides in a rabbet formed between the under side of plate E and a projecting lip of the flange of bracket 70. The rectangular open space between the sides of 70' is fitted over the joint end 68³, so that the latter can freely move vertically.

When the key 71 is depressed, as represented in Fig. 20, the joint end 68³ is pushed from its support 70³, and the notch in it is pushed in engagement with the pin at the end of lever 68, which, with lever 68², is fastened to the fulcrum-shaft 68', turning in bearings in the arched brackets Q' and Q², Figs. 20, 21, 25. The friction-roller, turning on a pin fastened to the end of lever 68², is engaged in the cam-groove of cam 62², fastened to shaft $p$. While 68³ is moved clear of its support and in gear with lever 68, the sliding plate 69 is pushed sufficiently forward to move rod 51², levers 51, and all parts fastened to shaft 51' to the position necessary for the transmission of the motion of shaft $n$ to shaft $p$ in the manner and through the means already explained. As soon as cam 62² begins to rotate lever-arms 68² and 68 will move through the angles shown in dotted center lines, Fig. 20, producing a downward motion of the connecting-rod 67³, and therefore of all the parts connected with lever 67, as indicated by chain center lines in Fig. 21. The two links 66² and the link-plates 66⁴, holding the circular heads of a pair of spacing-plates 4, will move downward in the position shown by the chain center lines and the dotted heads 4'. On the face of the sleeve J, where this motion takes place, an offset J', equivalent to the thickness of a spacing-plate and of sufficient length for this motion of the link-plates 66⁴, is made on each half of J. When the concentric part of the cam 62² reaches the friction-roller of lever 68², the motion of these parts ceases and the cam 62, Fig. 23, will be in a position to transmit motion to levers 61² and 61, and therefore, as already described, to the fork 63³ and the two rods 63'. The pair of spacing-plates 4 will then be in the position so that their lower beveled parts will overlap, as shown in Fig. 26 in elevation $a$ and plan $b$. The lower overlapping part will be pushed by the fork 63³ in the space between mandrel I and supporting-slide 3, while the heads 4' will simultaneously be pushed in the tubular ends 72² of links 72 (these tubular ends being in proper position for this operation) by the two rods 63'. When in this manner sufficient matrix-plates for words, punctuation, and other signs and the necessary plates for the spaces are fed in the space between mandrel I and the supporting-slides 3 to form two lines separated by the line-dividing spacer 2⁴, Fig. 7, to which reference will be made later on, the lines are locked up to a predetermined length, as follows:

*Locking mechanism for assembled matrix-lines.*—The stationary rod 78 of circular section is fastened at one end to the cross-frame D and supported at the other end by the hanger H in line with the axis of mandrel I. The sleeve 78' is fitted to this rod to an easy sliding fit. It has an extension downward, to which is fastened the tongue or bolt 78², Figs. 8, 9, 23, 25, 28. The bolt 78² is made to fit between the prongs of the fork 63³ and in the space between mandrel I and slides 3, so as to slide freely between these parts, its working end being even with the face of sleeve J in its normal position of rest. The downward-projecting part of 78' is connected to the two levers 79 by links 79ª. The fulcrum-shaft 79', to which levers 79 and 79² are fastened, turns in bearings of side brackets V, which are fastened in recesses at the sides of the upper vertical extension of the cross-frame D. To the ends of levers 79² and 31 a link 31ª is joined, connecting them. To the fulcrum-shaft in the two front extensions of bracket V are fastened the lever 31³, having a forked end surrounding the rod 64', and the lever 31², which is connected by a link 31ᶜ to the lever 31', extending at a right angle from 31. The lever 31 is fastened to the shaft 30', to which is also fastened, as previously described, the hand-lever 29. By depressing the latter the different levers and links connected with 31 and 31' will assume the positions indicated by center lines in Figs. 8 and 23, lever-arms 79 and the links 79ª, connecting them with the sleeve 78′, will be in a position to form a straight line, and the bolt 78² is pushed in the space between mandrel I and slides 3, confining the assembled matrix and spacing-plates in the room between the end of 78² and the distributing-ring 122′, which is the exact length of the lines to be formed, including the line-dividing spacer 2⁴. The forked end of lever 31³ moves in contact with the projecting washer at the end of guide-rod 64′ and holds the same, as well as the two rods 64², in a stationary position against the action of spring 64⁰. The row of spacing-plates will not be pushed against bar 65 by the spring 64⁰ until all these parts have returned to their normal position by the action of cam $x$, the shaft $k$ being set in motion by the depression of hand-lever 29, as already described.

*Justifying mechanism.*—The machine as illustrated being designed for the production of two type-lines, the justification is performed in two stages by the following mechanical arrangement: Two vertical bars 72 and the two similar bars 72′ are connected at their lower ends by the tubular spacer-holders 72² and 72³, Figs. 23, 24, and intermediately between their upper and lower ends by the stays 72⁴. The two bars so connected by the tubular holder and stay constitute what will be denominated hereinafter a "justification-link," of which there are four, two on each side of mandrel I. To each of the justification-links are joined levers 66 on the outside of the bars 72 and 72′ and levers 66⁰ on the inside of said bars. The levers 66 and 66³ turn on the fulcrum-spindles 66′ and are of the same length as the levers 66, joined to the two delivery-links 66². The levers 66⁰ are two levers connected by a lengthened hub and eyepiece into one solid part. The bore of the tubular ends 72² and 72³ is open lengthwise for the free passage not only of the heads 4′, but also of the necks of the spacer-plates 4, in all positions in which the justification-links may be brought. The end of 72² extends close to sleeve J and carries at an offset on top the bar 65, so that this bar will move upward with link 72, but will remain in place when 72 moves downward from its normal position of rest, in which the center of the bore of 72² and 72³ coincides with center line of rod 63′. Two similar justification-links at opposite sides of mandrel I are connected to one cross-head 73 by links joined to the upper extended ends of the link-bars and to two convenient points of 73 equidistant from the center of the cross-head, which is vertically movable on the two guides 73², the latter being fastened at opposite sides inside of the channel-beams F, Fig. 24 and Fig. 24⁰. To the two cross-heads 73 and to the ends of lever-arms 74 and 75 are joined the two similar forked links 73′. A strong spring acting in compression between the cross-head 73 and a connection between the forks of each link 73′ at its upper part, holds the lower end of the elongated holes of the lower joint ends of the forked link against the joint-pin in the central boss of the cross-head 73 when the different parts are in their normal position of rest. Levers 74 and 74² are fastened to shaft 74′, Fig. 3, and levers 75 and 75² to shaft 75′. Both shafts turn in bearings at the top end of cross-frame D′ and at the top of bracket 74³, the latter forming a stay between the two top channel-beams F, to which it is firmly bolted. The lever-arms 74² and 75² extend horizontally in opposite direction outside of the cross-frame D′, Figs. 1, 1′, and 3, and their ends are connected to the ends of lever-arms 76 and 77 by two vertical connecting-rods 76ᵃ and 77ᵃ. Lever 76 is fastened to shaft 76′, which turns in bearings in standard C′ and in bracket 76³, which is fastened to cross-frame D′. To the same shaft is also fastened lever 76². Similarly, Figs. 1′, 2, and 3, to shaft 77′, turning in bearings in standard C and bracket 77³, are fastened the two levers 77 and 77². The downward-extending ends of the two levers 76² and 77² are connected by rods 80ᵃ to two similar cam-levers 80, turning on fulcrum-pins 80′, one being fastened to standard C and the other to C′. All the parts marked 76 to 80 and 77 to 80 are right and left duplicates of each other and are operated similarly, except that the levers fastened to shafts 77′ and 75′, Figs. 1′, 3, 23, 24, moved by cam $z$, begin motion only after the levers fastened to shafts 76′ and 74′ have been moved from position 1⁰ to position 2⁰, the cam $z^2$ imparting motion to these parts immediately after shaft $k$ begins to revolve, as indicated by the dotted cam-lines in Fig. 1′, while the cam $z$, as indicated by the full lines, begins to act on the levers fastened to shafts 77′ and 75′ only after the first have performed their full motion. Lever 74 will be fully depressed, and by its action, through the spring in link 73′ on cross-head 73 and connected pair of justification-links 72, will have justified the first line between the line-spacer 2⁴ and the locking-bolt 78², when lever 75 begins its downward motion, acting in the same manner on the second line by justification-links 72′ and spreading the second line to its proper length between the line-spacer 2⁴ and the distribution-ring 122′. In order to hold the spacing-plates 4 during this depressing motion in close contact with mandrel I, the two rods 81 are supported in hanger H′ and sleeve J, parallel to I, at the proper distance for an easy motion of the spacing-plates.

In the operation of justification the spacing-plates 4, Fig. 26, are brought relatively to their beveled ends from the position 4² to 4³. By the time the two lines have been justified the line-blanks have been conveyed under the assembled matrix-lines, and while the operation of stamping the blanks is performed the justification mechanism is held stationary, the concentric part of the cams $z$ and $z^2$ passing at this moment over the friction-rollers of cam-levers 80. Simultaneously with the withdrawal of the now-stamped type-lines all the levers fastened to shafts 76', 77', 75', and 74' are brought in the position $3_0$, in which the tubular holders $72^3$ and $72^2$ are in their highest position in line with the heads 4' of the rows of spacing-plates contained in the space between mandrel I and sleeve J. The bar 65' is moved sufficiently upward from its normal position by the extended ends of tubes $72^2$ to leave a free path for the heads 4' to be pushed back in their proper place of the two rows of justifying spacing-plates, or, to use the technical term for this operation, "to be distributed."

While the distribution is taking place the justifying mechanism is at rest; but as soon as the parts performing it have returned to their normal positions all the levers fastened to the shafts 74', 75', 76', and 77' and all parts connected with them return together in the normal position of rest, by which time the shaft $k$ will have performed its revolution and will have stopped.

*Blank-holding arrangement and blank-operating mechanism.*—The type-bar blank 81, (Fig. 35 is an approximately full-size front and side elevation,) a metal plate of homogeneous composition, is of the length of the required line, a trifle over type-high and of the thickness of the type used. The edge intended to receive the impression is beveled from both sides, and at the ends are notches 81' for the purpose of moving the type-bar blank vertically downward in its holder. Two type-bar blanks are simultaneously fed into the holder 82. The upper beveled projecting edges of these type-bar blanks in the inclosing holder are softened by the application of heat preferably produced by blow-pipe flames, while two lines of matrice and necessary spacer plates are set up. After lever 29 has been depressed and shaft $k$ set in motion the blank-holder, with the blanks heated at their upper edges, is moved between the supporting-slides 3 under the assembled lines of matrices, into which the softened edges are pressed. They are immediately withdrawn, and the blank-holder and supporting-slides 3 are moved together in the discharging position, where the imprinted blanks, now forming embossed type-lines, are discharged. After the return of the discharging apparatus the blank-holder is moved back, carrying the supporting-slides along with it, in the normal position of rest, and two type-bar blanks are fed and pushed in place in the blank-holder for a repetition of the operations here summarily described.

The two supporting-slides 3, Figs. 31 and 32, are connected at their front extension 3' by the intermediate piece $3^3$ and at the back end of the long back extension $3^2$ by the distance-piece $3^5$, the three parts at both ends being solidly screwed or bolted together, Figs. 23, 25, 31, 31', 32, 33'. The slides 3 are fitted to the two bars G and G', the latter being firmly bolted at each end to projecting parts of the plates $G^2$, which are fastened to the cross-frames D and D', so as to be adjustable vertically, as shown in Figs. 31 and 32, with the object of regulating the distance between the supporting-slides 3 and the mandrel or platen I exactly to the width of the matrix-plates 2. The blank-holder 82 is made to move freely without any friction between the inside faces of the two slides 3, Figs. 19, 24, 25, 31. At its lower end the blank-holder 82 is made to slide on the two rectangular and parallel bars 82', fitted in grooves between projecting ribs at both sides of 82. The two bars 82' are rigidly connected at each end. They are held at the proper distance apart by distance-pieces $82^3$, fitted in recesses in cross-frames D and D', so as to slide vertically, Fig. $31^2$ showing one end of connection of bars 82' with each other and with cross-frame D', the other end being exactly similar. In the hollow interior of blank-holder 82 (see Figs. 19 and 40, showing cross-section of these parts) is fitted the stamping-plate 83, so as to slide vertically in it. The lower end of 83 slides longitudinally along the upper edge of the strong bar $83^2$, to which it is connected by the two channel-bars 83', bolted to $83^2$, and by the groove formed by the upper lips of 83' and $83^2$, in which the two side ribs of 83 are engaged. The bar $83^2$ passes through rectangular openings in the cross-frames D and D', in which it is exactly fitted so as to move only vertically. It is prevented from moving longitudinally by plates $83^3$, (Fig. 31 shows one end; the other end is similar,) fastened to each end and bearing against finished plane surfaces on the outside of D and D'. Near the lower edge of bar $83^2$ and extending longitudinally outward from the two ends are formed the pins $83^4$ of circular section. To these pins are joined the upper ends of connecting-rods $84^a$, while their lower ends are joined to pins fastened at the ends of levers 84. The two lever-arms 84 are fastened parallel to each other at the extremities of shaft 84', turning in bearings in brackets $84^2$ at the lower end of D and D'. By this arrangement the different positions of bar $83^2$ in its vertical motion will always remain parallel to each other. The two connecting-rods $84^a$ are made adjustable in length, so that the position of each end of the bar $83^2$ in relation to other parts can independently be regulated. The stamping-plate 83, Figs. 19, 33, and 40, is a flat plate with the slide-ribs at the bottom edge and an offset on top, into which is fastened a plate of the thickness of the required type-line having the upward-projecting hooks 81², which fit in the notches 81' of the line-blank 81, Fig. 35. The stamping-plate 83 moves vertically in the blank-holder 82, pushing the type-bar blanks from a lower position in which they have been delivered by other parts into the two mortises 82⁴, Fig. 34, at the upper part of 82 or withdrawing them after they have been stamped into a lower position, from which they are discharged. In the sides of blank-holder 82, Figs. 31 and 31', facing the bar G at a distance downward from the top equivalent to a little more than the height of the line-blank, are two rectangular openings 82⁰ large enough for the passage of the type-bar blank flatwise. In the opposite side facing bar G' are four rectangular openings 82⁰ for the passage of the discharging-plungers. Corresponding openings are in the supporting-slides 3, and when the blank-holder has been moved between the two slides 3 in the stamping position, the bars 82' remaining in their normal position of rest, the sides of the openings are all even and flush with each other. Fig. 31' is an enlarged plan in section at line 31' of Fig. 31 of these parts after blank-holder 82 has moved in this position. To an ear projecting from the lower back end of 82 is joined one end of a connecting-rod 82ᵃ, the other end being joined to the top of lever 85 with fulcrum on the stationary rod W, the latter being fastened, by means of brackets W', to the hind legs of standards C and C', Figs. 1, 2, 3, 31. To a pin fitted in the long rectangular hole 85' and fastened at the proper leverage is joined a second connecting-rod 85ᵃ, which is also joined to the lower end of lever 85² with fulcrum on the rod $y$. A friction-roller on a pin fastened to lever-arm 85² is engaged in the groove of cam 85³, keyed to the shaft $k$.

The bars 82' and the angle-levers 86 are connected by the two connecting-rods 86', the forked joint ends 88³ being joined to the bars 82' near their ends and the lower ends of 86' being joined to the ends of the horizontal arms of levers 86, the fulcrums of which are on pins supported in the lower flanged extensions of the two cross-frames D and D', to which are also fastened the two beams F', Figs. 2, 23, 24, 31. The lengths of the connecting-rods 86' are adjustable, so that the bars 82' at their ends can be independently adjusted in height in relation to other coöperative parts. The lower ends of the vertical arms of angle-levers 86 are connected to the lever-arms 86², extending in opposite directions from their fulcrum-shaft 87' by connecting-rods 86ᵃ, joined to their ends. Fig. 31⁰ shows this whole arrangement in diagrammatic outline. Shaft 87' turns in bearings in the lower projecting parts of the two similar bearing-plates 89, fastened to the inside faces of beams F'. The lever-arm 87 is fastened to an outside extension of the fulcrum-shaft 87' and is connected to the lower end of levers 87², Figs. 2 and 3, by a connecting-rod 87ᵃ. A friction-roller on a pin fastened to 87², which has its fulcrum on rod $y$, engages in the groove of the cam 87³, Fig. 3.

To the bar 83², Fig. 31, is fastened a joint-piece 83³ in such a manner that it will be adjustable in relation to 83² by set-screws. The eye of this joint-piece is connected by double links 83³ to the top of lever 88, which is fastened to the fulcrum-shaft 88' in the middle between the bearings of the latter in the bearing-plates 89. To the part of 88' extending from one side of the bearings is fastened the lever 88², which is connected to lever 88⁴ with fulcrum on rod $y$ by a connecting-rod joined to their ends. A friction-roller on a pin fastened to lever 88⁴ engages in the cam-groove of the cam 88³, fastened to cam-shaft $k$, Figs. 1, 2, 3, 31.

When operated by depressing the hand-lever 29 immediately after cam-shaft $k$ has started its motion, the lever 85 will move from its normal position of rest to Fig. 31 in the position $2_0$, where it will make a short rest. This motion will be communicated to the blank-holder 82, which will be supposed to contain two type-bar blanks, now thoroughly heated at their upper edges. The holder 82, with the stamping-plate 83, will be moved between the slides 3 in position for stamping, the two type-bar blanks being in this position exactly under the two assembled matrix-lines, which are justified while this motion takes place.

While the blank-holder 82 is moving under the convex surface formed by the matrix-plates assembled in lines there must be a certain amount of clearance between the upper edges of the type-bar blanks projecting above the upper concave surface of holder 82 and the lower convex surface of the matrices. The very appreciable distance between the upper surface of 82 and the lower surface of the matrix-plates, Fig. 7, is closed before the stamping takes place by the action of cam 87³ on lever 87² and through the connections described on bars 82' and holder 82. The two surfaces will be held closely pressed together, while by the action of cam 88³ on lever 88⁴ and connections described the lever 88 will be moved from $1_0$ to $2_0$, Fig. 31, moving the bar 83² and the stamping-plate 83 in the highest position, and therefore pressing the upper edges of the type-bar blanks in the characters of the assembled matrix-lines, and so forming the blanks into type-lines. Now the relative action of the three cams 85³, 87³, and 88³ is such that the bars 82' return quickly to their normal position, and while lever 88 moves from the position $2_0$ into the position $3_0$, moving the stamped type-lines downward opposite the openings $82^2$, lever 85 also moves from $2_0$ to $3_0$, moving the holder 82 and the slides 3 together in the discharging position, where a short rest is made, during which the two type-lines are pushed out, and the parts performing this operation return to their original position. Then lever 85 performs its return motion from position $3_0$ to $1_0$, carrying the blank-holder 82 and the slides 3 in their normal position. During this motion of lever 85 lever $88^4$, and therefore lever 88, will remain stationary in the position $3_0$, keeping the stamping-plate 83 in its lowest position. A fresh pair of type-bar blanks is now pushed into the holder, and then lever 88 returns from position $3_0$ into its normal position of rest $1_0$, thereby pushing the two new blanks up through the mortises in the holder 82, and so exposing their upper edges to the heating action of the arrangement provided for this purpose. By this time the shaft $k$ will have made one revolution and will have come to a stop, holding all parts connected with the cams on this shaft in their normal position of rest.

To prevent any irregularity in the stamping position of the blank-holder 82 as a consequence of wear and tear of the different moving parts, an extension $82^3$, Fig. 32, with a rectangular countersink in it, is formed on the rib just above the bar $82'$ on the side of slide-bar $G'$. Fig. 32 shows a top view, Figs. 23 and 31 a front elevation in dotted lines, and Fig. 24 a side elevation, of the arrangement to be described. The lever 90 has its fulcrum on a stud fastened to the side of bar $G'$. One end of this lever and a stud $90^2$, fastened to the side of bar $82'$, are connected by a link. The opposite end of lever 90 engages a pin fastened to the bolt $90'$ and passing through a lengthened opening in the casing, also fastened to bar $G'$, in which the bolt $90'$ is guided. The lower end of the bolt is made to fit exactly in the rectangular countersink in the extension $82^3$ and is slightly beveled at the edges.

When the blank-holder 82 has been moved in position for stamping and the bars $82'$ are moved up to bring the holder in close contact with the matrices in line, the lower end of the bolt $90'$ will be pressed in the countersink of $82^3$, and thereby correct any slight irregularity in the position of the holder 82.

*Line-blank-feeding mechanism.*—The trays 91 extend from the normal position of rest of the blank-holder 82 out over the standard C to any convenient length, Figs. 2, 3, 33, 34, and 40. They are supported by the bracket 93, fastened to plate E, and by the bracket $93'$, fastened to an inside extension of the upper flange of standard C. In the center of each tray is a rectilinear opening extending nearly the whole length of the trays. The blocks $91^3$, to which the angular pushers $91'$ are fastened at the top, move easily and evenly in these openings. To a projecting ear downward on each block $91^3$ is fastened a cord, which, starting at one block, is carried over a pulley 92, Fig. 40, to a pulley $92'$ and around a pulley on weight $92^3$ back over similar pulleys $92'$ and 92 to the second block $91^3$. The two pulleys 92 turn on pins fastened to two sides of bracket 93, and the two pulleys $92'$ turn on similar pins fastened to the sides of bracket $93'$. The guide-box $91^2$ is fitted between the face of blank-holder 82 and the end of trays 91 and is fastened to flanges extending from each side of bracket 93. In a recess of $91^2$, Figs. $33^2$, 34, and 40, is fitted the feed-slide 97 with the two rectangular holes $97'$ of the size of the type-bar blanks. To the plate 97, which is of the thickness of a type-bar blank, is fastened the joint-piece $97^2$, Fig. $33^2$, which is connected by a link to the end of lever 98, Figs. 33 and 34, fastened to the shaft $98'$, the latter turning at one end in a bearing fastened to the plate E and at the other end in a bearing of a bracket fastened to the horizontal branch of cross-frame $D'$, extending toward standard C. At this end of shaft $98'$ is fastened the lever $98^2$, connected to lever $98^3$ with fulcrum on rod $y$ by a connecting-rod $98^a$, joined to the levers, as shown in Fig. 33. The four rectangular plungers 94, Figs. 33, 34, and 40, firmly connected together by the cross-bar $94'$, are fitted partly in grooves in the top plate of bracket 93, partly in similar grooves at the under side of the bottom of trays 91. The two middle plungers, by means of eyes formed at one end, are connected to the vertically-extending lever-arm 95 by a connecting-rod $95^a$. This lever is fastened at one end of the fulcrum-shaft $95'$, which turns in bearings fastened to the top flange of standard C. The horizontal lever-arm $95^2$, also fastened to $95'$, is connected to one end of lever 96, having its fulcrum on a pin $96'$, fastened to the webbed part of standard C. On a pin fastened to the opposite end of lever 96 is a friction-roller engaged in the outside cam-groove of cam Z. The blank passage-ways $91^0$ of the guide-box $91^2$ are in line with the rectangular openings $82^2$, when the blank-holder 82 is in the normal state of rest. The upward-extending flange of $91^2$ closes the ends of the trays 91. The feed-slide 97, made to move vertically between 91 and $91^2$, is at its highest position with the openings $97'$ in line with the trays 91 when normally at rest. If a supply of type-bar blanks is placed in the two trays 91 between the pushers $91'$ and the flange of $91^2$, the blanks will be pushed against $91^2$ by the action of the weight $92^3$, and two type-bar blanks will always be engaged in the openings $97'$ of the feed-slide 97.

When the shaft $k$ is set in motion, nearly two-thirds of its revolution will be consumed to produce the motions in parts already described. As soon as the blank-holder 82, and with it the slides 3, has returned in the normal position, while the bar $83^2$ and the stamping-plate 83 are still held at their lowest position, the feed-slide 97, with the two type-bar blanks in the openings 97', will be moved downward, putting the type-bar blanks before the passage-ways $91^0$. This motion will be produced by the cam Z' acting on lever $98^3$ and already-described connections. Immediately after the feed-slide 97 has reached its lowest position the plungers 94, by the action of cam Z on lever 96 and connections, will quickly push the two blanks through the passage-ways $91^0$ and the openings $82^2$ in the now vacant space above the stamping-plate 83 in the holder 82. At this moment and while the plungers 94 are on the return motion the bar $83^2$ returns to its normal position, moving the pusher 83 upward and the two blanks above it in the mortises of the holder 82. After the plungers 94 have completed the return motion the feed-slide 97, which has been at rest during the motion of the plungers, returns to its normal position of rest, while shaft $k$ completes its revolution. While the feed-slide 97 was at its lowest position the solid part of the plate above the openings 97' was in the position previously occupied by these openings. In this manner the forward motion of the type-bar blanks contained in the trays was prevented; but as soon as the feed-slide has returned in its normal position the whole supply of type-bar blanks will be pushed forward and two new blanks will move in the openings $97^0$, ready for a repetition of the operation here described.

*Type-bar-discharging mechanism.*—The four rectangular plungers 100' and $100^2$, Figs. 1, 2, 3, 42, and 43, are fitted in grooves in a light frame 100 and in corresponding grooves in its cover. (See Fig. $43^0$, which is a cross-section on line $x$ of Figs. 42 and 43.) The four plungers are solidly connected together, being held at the proper distance apart by distance-pieces of suitable length. The two middle ones are connected to lever 101 by a connecting-rod $101^a$. To the shaft 101', to which 101 is fastened, is also fastened lever $101^2$, which is connected by a link to one end of lever 102, fulcrumed on a pin fastened to the web of standard C'. The opposite end of 102 is provided with a friction-roller engaged in the cam-groove of cam $Z^2$. The parts $101^2$ 102, the link connecting them, and the cam-groove in $Z^2$ are exact duplicates of the levers $95^2$ 96, the link connecting them, and the outer cam-groove of Z, (shown in Figs. 33 and 34,) with the only difference that the cam $Z^2$ is placed on the shaft $k$ in such a manner that its action will precede that of Z. If these parts (represented in Figs. 33 and 34) are considered as right-handed, the same parts are left-handed when connected with $Z^2$. Shaft 101' turns in bearings fastened to the top flange of standard C'. The frame 100 is fastened on top of the keyboard-brackets 105 and 105' between G and C', so that the ends of the four plungers are exactly opposite the rectangular openings $82^0$ when the holder 82 and the slides 3 are in the discharging position. On top of the keyboard-brackets 105 and 105' between C and G is fastened the discharge-tray or the galley 99, Figs. 12 and 13, so that its bottom and sides coincide with the corresponding sides of the openings $82^2$ and $3^4$ of the blank-holder 82 and slides 3 in the discharging position. The part $99^3$ of the tray is closed by an angle-piece 99' at a distance from the face of slide 3 of a little more than the thickness of a type-bar blank, and the middle partition is made even with the face of 99'. In part 99 of the tray or galley is fitted a spring-block $99^2$, Fig. 43, which through the frictional resistance at the sides keeps the type-bars in an upright position while they are discharged. The discharging ends of the plungers 100' are so adjusted that the free face of the discharged type-line will be even with or a little inside of the face of 99', while the ends of $100^2$ are shorter than 100', so as to discharge the type-line against the face of 99'. In a hole of the extension $3^3$ of the supporting-slides 3 is fitted the spring-plug 103, Fig. 31', tipped with rubber, leather, or any other material of considerable frictional resistance. A screw regulates its projection from the face of $3^3$. As soon as the blank-holder 82 and the slides 3 have arrived in the discharging position the parts 3, 82, and 83 being then in the position represented in Fig. 42, the plungers 100' and $100^2$ are rapidly discharging the two type-bars, pushing the column of type-bars in the galley 99 the thickness of one line forward and placing one type-bar along the face of 99'. Immediately on the return of the plungers the blank-holder 82 is moved backward, carrying the slides 3 with it, the three parts 3, 82, and 83 remaining vertically in the same relative position. In this motion the rubber or leather tip of the spring-plug 103 comes in contact with the free surface of the type-bar discharged against 99' and carries it along the smooth polished surface of 99' in tray or galley 99, where it is stopped by the projecting part of the side border of the latter.

*Arrangement for correcting mistakes.*—The friction-roller 104, Figs. 34, 34', 40, and 41, is fitted to a pin fastened to the extension $3^2$ of supporting-slides 3 on the side of slide-bar G'. A cam-lever 104' turns on a fulcrum-pin fastened to the bracket $104^2$, which is itself fastened to the vertical extension of cross-frame D'. A rod $104^a$ is joined to the end of lever 104'. This rod passes through a guide-hole in cross-frame D and has at its end a knob $104^3$ or any other convenient device for the purpose of being operated by hand. On one face of lever 104' is formed an eccentric camgroove, which in operation engages the friction-roller 104. Between the rectangular head of the distance-piece 3³ and the supporting parts of slides 3 beveled ways 3⁶, Figs. 23, 25, and 31', of a width equivalent to the distance between the guide-faces of A³ and A⁴, Fig. 19, are made for the free motion of the matrix-plates, with which the angular corners of 3³ would interfere. In Fig. 25 the double bevel of 3⁶ is shown in dotted lines. In the normal position the friction-roller 104 abuts against the back rib above the eccentric camgroove of lever 104', Fig. 41, and the beveled ways 3⁶ are in line with the guide-faces of A³ and A⁴. When it is desirable to drop out a wrong matrix-bar, the lever 104' is brought from the position $1_0$ to the position $2_0$. (Shown by center lines, Fig. 41.) In this motion the friction-roller 104 will engage in the cam-groove and will be drawn by its action toward the fulcrum of lever 104', carrying the supporting-slides in the position shown in Fig. 34', where the beveled way 3⁶ is shown outside of the guide-plate A⁴, giving the operator in this manner an opportunity to drop the wrong matrix-plate through the way 3⁶ into the open space between A⁴ and B, where it will remain hanging on its rod 1 until distribution takes place.

*Keyboard.*—The matrix-bars being suspended from two series of parallel rods arranged symmetrically on each side of the machine, it has been found convenient to dispose the keys also in two symmetrical series. The number of keys so arranged is equivalent to the number of characters and invariable spacers necessary for the work required to be done by the machine. The centrally-located spacing-key and connected parts will not be referred to here, having already been described. The keyboard being divided into two independent arrangements similar in all its parts, with the reservation that when the parts in one arrangement are considered right-handed the parts in the other will be left-handed, only one series of parts will be described. Brackets 105 are solidly fastened to the vertical extension of cross-frame D, Figs. 1, 2, 3, for general arrangement, Figs. 12, 13 for detailed parts. At a distance from 105 a little greater than the distance between the extreme rods 1 in one series measured horizontally is fastened to the horizontally-extending part of D the bracket 105'. These two brackets extend not only outward from D, but also inward, where they support, besides other parts, the tray or galley 99 and the guide-frame 100, as already described. Intermediate between the two brackets 105 and 105' the bracket 105², extending only outward, is also fastened to the horizontal part of D. The key-levers 50 are arranged between 105 and 105² in a number of superposed horizontal rows. All the finger-levers 50, with the exception of the first one from the center of the machine in each horizontal row, are fastened to shafts 50², to which are also fastened levers 50', Figs. 14 and 15, one to each shaft. The necessity for sufficient room for the motion of levers 50' in each horizontal row of the shafts 50² is the cause of the greater projection of the brackets 105' and 105² compared with 105. The resulting oblique arrangement of the keyboards forming in this manner an obtuse angle has, however, the advantage of being the most convenient disposition for the operators. To inside projecting lugs of brackets 105 and 105' are fastened the bars 106 at an upper and 106' at a lower position. To these two bars are fastened at regular intervals the oblique bearing-bars 106². (See Figs. 12° and 13.) The slanting ends of 105 and 105² are formed into steps, to which are fastened plates 105³, connecting the two brackets, Figs. 13 and 13°. Holes in lugs 105⁴ on the under side of plates 105³ and corresponding holes in the oblique bearing-bars 106² form the bearings in which the fulcrum-shafts 50² turn and in which they are supported. The bar 106⁴ is fastened to the three brackets 105, 105', and 105², so that its upper surface is even with the upper edges of the brackets. The bar 49, fastened to the two brackets 105 and 105', supports the hanging links 48, which are suspended from a wire laid in a groove in a projecting part on the under side of 49, Fig. 12. The number of links in each series is equal to the number of rods 1, and the distance between two subsequent links is equal to the horizontal projection of the distance between the centers of two subsequent rods 1. The links 48 are held in position by being placed in indentations formed in the projecting part of 49 for this purpose. (See bar 49 at the bottom of Fig. 13.) Each link is connected to the end of one of the downward-projecting lever-arms 50' by a connecting-rod 50ᵃ. The first key-lever 50 and its corresponding lever-arm 50' of each horizontal row being close together are fastened to a common hub, which turns on a fulcrum-pin fastened to the corresponding lugs 105⁴ or to the inside face of bracket 105.

*Mechanism indicating the progressive formation of the matrix-lines.*—The thickness of a matrix-plate representing any printing character or spacer is made an exact multiple of a unit space of length. The length of one line is therefore a fixed number of such unit length of measurement, which is represented by the number of divisions of half of a circle of the dial 107, Figs. 29, 30, the number of divisions of the whole circle representing the number of unit length contained in the two lines. The dial, consisting of a plain circular disk, is fastened to a flanged hub 107', an extension of which is tightly fitted in the head of standard 108, the latter being fastened on top of cross-frame D. A second standard 108' is fastened to the top of hanger H. In the head of 108', Fig. 29², is fitted the pin 108², which is fastened by a set-screw. The extended part of 108² serves as a fulcrum-pin for the lever 110 and as a bearing for the shaft 109', one end of which is fitted in the conical hole at the end of 108². The other end passes through a bearing-hole in the center of the hub of 107' and carries at its end the hand or pointer 107². On top of the head of standard 108 is screwed a stem extending upward and holding at its top the bell 111. The stem of the bell-hammer 111' is fastened to a hub extending from a sleeve 111², which is fitted to a pin fastened to the inside face of flange 107', Figs. 30' and 30². From the sleeve 111² an arm 111⁴ extends upward and is normally held against a stop-pin fastened to flange 107 by a spring in tension between the end of this arm and a pin in said flange. A second arm extends downward from 111². This arm has at its lower part a flap 111³ of some length, extending at right angles from the face of the arm. To the disk 109², which is fastened to shaft 109' near the head of standard 108, are fastened pins, projecting from both faces, at points diametrically opposite and equidistant from the center. When the pins are in the position shown in Fig. 30', the pointer stands at zero-point on the dial. In operating the machine the disk gradually turns in the direction of the arrow. The upper projecting pin comes in contact with 111³, moving the hammer 111' from the bell against the force of the spring acting on 111⁴. As soon as the pin in its motion releases the lower edge of 111³ the hammer, impelled by the force of the spring, will strike the bell, and so give notice to the operator that a line is nearly filled.

The hub of the ratchet-disk 109 is fastened to shaft 109' close to lever 110. The number of teeth on the circumference of ratchet 109 is equivalent to the number of units of length in the two lines of matrices to be assembled added together. To one end of lever 110 is joined a pawl 110', held in close contact with the teeth of 109 by a spring in tension between the pawl and a pin on the lever. A second similar pawl 110² is fitted on a pin fastened to the base of standard 108' and is held in close contact with the teeth of 109 by a spring in tension, thus preventing any possible backward motion of 109, Figs. 29' and 30. The second end of lever 110 is connected by rod 112ª to the end of lever 112, Figs. 1, 2, 29, 30, which is fastened to shaft 112'. To this shaft, which turns in bearings in brackets 112⁴, fastened at the two outside top parts of triangular frames A', are fastened the lever-arm 112², extending upward and connected to a threaded regulating-stem passing through hanger H by a spring in tension and the two levers 112³ at each extreme end of the shafts. (Only one end of shaft 112' is shown in Fig. 29, the other end and connections to be described being exact similar reversed parts.) The ends of levers 112³ and 113 are connected by a connecting-rod 113ª. To the shaft 113', turning in bearings in brackets fastened to the outside faces of brackets 105 and 105', are fastened, besides levers 113, levers 113², Fig. 29⁰, extending horizontally and carrying at their ends the rod 113³, parallel to shaft 113'. The indicator-links 114', Fig. 30, are hung on rod 113³ by the slotted or hooked top. They are supported on the stationary rod 114 by means of projecting heels and are connected at the lower end to a pin projecting laterally from one face of sliding plate 47 and engaging in a slotted opening. In each link 114' is a notch 114², so placed in relation to the rod 44³ that its upper edge will just pass over the top of 44³. The lower edge of 114² will have more or less clearance from the under part of 44³, the clearance depending on the number of divisions each particular indicator-link has to transmit when in operation. When a finger-key is depressed, the lower part of the corresponding indicator-link is carried forward, disengaging the supporting-heel from rod 114, and engaging the notch 114² over rod 44³. At this moment shaft 44' is set in motion. The rod 44³ in moving downward will depress the indicator-link engaged in it, and thereby depress the end of lever 113, and by connections described the pawl end of lever 110 moving the ratchet-disk 109 a number of teeth and the pointer 107² through a corresponding number of divisions on the dial-disk 107. While the rod 113³ is moved downward by one indicator-link, it moves freely in slots of all the remaining links of the series, which remain immovably supported on 114.

Referring to Fig. 29⁰, it will be seen that on the left from the center line of machine one indicator-link 114⁴ is suspended from a part of the rod 113³ overhanging the lever 113². This link 114⁴, Figs. 20, 29, and 29⁰, which is normally also supported by a projecting heel resting on bar 114, is extended downward, so that the notch 114³ at its lower end will engage a pin extending from the face of lever 68. A pin extending laterally from slide-plate 69 engages in a hole in 114⁴, which therefore is only operated when the spacing-key lever 71 is depressed, the parts being shown in this position in Fig. 20. In moving downward the lever 68, through the pin engaged in the notch 114³, will move link 114⁴ and the end of lever 113² a quantity necessary to indicate on the dial the divisions corresponding to the thickness of the variable-justification spacing-plates 4.

The first indicator-link on the right-hand side of center line of machine, Fig. 29⁰, is suspended from a pin fastened to one end of lever 115, Figs. 29, 30, and is absolutely independent from the series of indicator-links suspended from the rod 113³ on the same side of the machine. The fulcrum of lever 115 is on a pin in the bracket 115', fastened to the keyboard-bracket 105. To the end of the arm of lever 115 extending toward D is joined the forked end 115² of a connecting-rod 115ᵃ, the upper end of which is joined to lever 116, which is fastened to shaft 116' parallel with the lever-arm 116³, also fastened to the same fulcrum-shaft turning in bearings of brackets 116², bolted to the vertical extension of the cross-frame D. An intermediate joint-piece 115³ in the above-mentioned connecting-rod connects with the lever-arm 79³ by means of a laterally-projecting pin engaging in an elongated rectangular opening in 115³. The end of lever-arm 116³ of the same length as 116 is connected by a rod 116ᵃ to the lower extension of a sheet-metal slide 117, Figs. 30', 30², 30, being an end elevation, a plan, and a side elevation, respectively, of the parts to be described. The sheet-metal slide 117 is fitted in a guide-piece 117', (shown partly broken out in Fig. 30',) fastened to an extension from the lower part of standard 108. The edge of 117 sliding along the extension of 108 is straight and when moved up, as indicated by dotted lines, will constitute a stop for the disk 109², one of the latter's laterally-projecting pins butting against it. The outside part of 117 near the periphery of 109² is bent so as to form a rectangular groove or channel, Fig. 30², into which is fitted the friction-plate 117². This plate is prevented from moving vertically in the channel, but can move to a slight extent laterally and is pressed out by a flat spring. In Fig. 30' parts of 117 and 117' are represented as broken away in order to show this part of the arrangement. To the face of 117² turned toward the disk 109² is fastened a pad of leather or rubber or any other material producing friction enough to move the disk against the resistance of the ratchet-wheel 109. The object of this arrangement is to restore the hand or pointer of the indicator to the zero-mark whenever a line is set up.

When the finger-key which operates the line-separating spacer 2⁴, Fig. 7, is depressed, the indicator-link dependent from lever 115, Fig. 20, will be moved in engagement with rod 44³ and by the downward motion of the latter will move the forked joint 115², and by the connections described the sheet-metal slide 117 upward, as indicated in dotted lines, Fig. 30'. The friction-pad of 117², which in its normal position stands just clear of the disk 109², will come in contact with the latter and rotate it until one of the projecting pins at the side of 109² will abut against the straight edge of 117. This will bring the pointer 107² to one of the two diametrically opposite zero-points on the dial 107, this operation having been performed when the first line of matrix-plates has been set up and the line-spacer separating the lines has been introduced. The same will occur when after the second line of matrix-plates has been assembled the hand-lever 29 is depressed, whereby the end of lever 79³, engaged in the joint-piece 115³, is raised, which through the connections described moves 117 upward and rotates the disk 109² until the second sidewise-projecting pin abuts against the straight inner edge of 117, the pointer 107² having arrived at the second zero-point of the dial. Any excess of motion of 117 after the disk has been stopped will take place against frictional resistance. So will the return motion, the disk being prevented from moving backward by the pawls 110' and 110², engaged in the ratchet 109. The line-spacer 2⁴ is connected to the keyboard and is operated by depressing its correspondent key in exactly the same manner as any other matrix-bar. It is only differently connected to the recording arrangement, as described.

When the line-spacer 2⁴ is put in line, its projecting nose will engage in the groove I', Fig. 7, and move along in it until it is stopped in the exact position necessary for the separation of the two lines, the groove I' being made of the exact length necessary for this purpose.

*Heating arrangement.*—The beveled top edges of a pair of type-bar blanks projecting from the upper concave surface of the blank-holder 82 when the latter is in its normal position of rest, near the back cross-frame D', Fig. 2, are subjected to heat produced by a number of blowpipe gas-flames, Figs. 44, 45. The gas is conducted by means of any convenient pipe arrangement to the pipe-socket 118, which is fastened to the upper vertical extension of cross-frame D'. To a slightly-conical part of 118 is fitted the faucet-joint socket 118', held in place by a washer and nut. A pipe 118² conducts the gas flowing through a hole in 118 and 118' in the horizontal pipe 119 and through a series of holes in the latter and in the clamp-sockets 119³ to the gas-burners 119', from which it escapes in the open air through a series of small holes in the upper concave surfaces, where it is ignited. The small pipe to which the burner 119' is fastened is fitted in the clamp-socket 119³, so that by turning and shifting its position can be exactly regulated and then held tight by a set-screw. Its lower end is tightly closed by a cap. The free end of pipe 119 is also closed by a cap and is held in the eye at one end of link 119², the eye at the other end being held by a screw fastened to hanger H'.

The blowpipe 120' is held by a set-screw in the holder 120², which is clamped to the pipe 120, the interior of these parts being in open connection. The air-pipe 120, which is similar to 119 and to which are fitted a number of blowpipes equivalent to the number of gas-burners, is connected by pipe $121^2$ to the faucet-joint socket $121'$ and to pipe-socket 121 and is held at its closed end by a link fastened to H', similar to $119^2$. The section shown in Fig. 44 of pipe-socket 118, pipe $118^2$, socket $118'$, and pipe 119, with link $119^2$, is an exact representation of a similar section of mandrel 121, socket $121'$, pipe $121^2$, pipe 120, and its end connection by a link with H'. The air-blowpipe connections and the gas-conducting connections being superposed duplicates of each other, the gas connections supplying the concave gas-burners $119'$ with gas from any convenient gas-supply pipe of a building and the air-blowpipe being supplied with air from the air-reservoir $b$, by turning the gas-pipe around mandrel 118 and the air-pipe around 121 the distance from the top edge of the line-blank 35 can be regulated to the length of the blowpipe-flames. By turning and shifting each individual gas-burner and by turning and shifting each individual blowpipe each flame can be regulated independently of the others in direction and to some extent in length of flame. In addition the supply of gas can be regulated by the cock, faucet, or valve in the supply-pipes necessary for opening and closing the supply of gas.

A pipe connection between socket 121 and the air-delivery chamber $b^2$, Figs. 1, 2, conducts the air, which is normally under pressure in the air-reservoir $b$, to the pipe 120. To one end of the air-reservoir $b$, which is made of a pipe of large size, is connected the delivery-chamber $b^2$, and to the other end the receiving-chamber $b'$, the whole being fastened to the uprights K at laterally-extending flanges of $b'$ and $b^2$. To the top of $b'$ is fastened the air-cylinder pump $a$, the piston of which is driven by the eccentric $a^2$ and the eccentric-strap $a'$. The chamber $b^2$ is divided in two parts, one in open and unrestricted communication with the reservoir $b$ of compressed air. This part is provided with a safety-valve $b^3$ for the purpose of relieving it of any surplus pressure which under certain circumstances may accumulate. The second part, to which the conducting-pipe is connected, is in communication with $b$ by a pressure-reducing valve, so that the air will be delivered to the blowpipes under a smaller pressure than the one in $b$. The air-compressing and air-delivery arrangements are not shown in detail in the drawings, as they are not considered essentially different from known air compressing and delivery arrangements made for other purposes. When in operation, the flame from the gas-burners will be deflected by the current of air issuing from the blowpipe, and the end of the blowpipe-flame so produced will impinge on the beveled top of the line-blanks, as shown in Fig. 45. The supply of gas and air being properly regulated, the top of the line-blanks will assume a pasty condition during the time two lines of matrices are assembled.

*Distribution mechanism.*—In depressing lever 29 the two assembled lines of matrix-plates and the line-separator $2^4$ are confined between the end of locking-bolt $78^2$, Fig. 8, and the distributing-collar $122'$ partly surrounding mandrel I. The two distributing-bars 122, Figs. 2, 3, 38, 39, are a little below and are parallel to the two series of rods 1. To each of the two bars 122 are fastened two guide-rods $122^2$ and $122^3$. They move in holes in the guide-brackets L', fastened to the cross-bar L, and in holes in bosses of the frame-plates B. The collars $123^2$ are fastened by set-screws to the guide-rods. The collars on the lower guide-rods $122^3$ are connected to the ends of levers 124 by links $124^a$, and similar links $123^a$, joined to projecting ears of the collars of the upper guide-rods $122^2$, connect the latter to levers 123. The two levers 124 are fastened to the short fulcrum-shaft $124'$, turning in a bracket fastened to the upper part of cross-frame D'. The levers 123 are fastened parallel to each other to the fulcrum-shaft $123'$, which turns in bearings of two brackets fastened to standards C and C'. The levers 123 and the two parallel levers 124 are of the same length, but extend in opposite directions from their fulcrums. Lever 125, fastened to shaft $123'$, and one of the levers 124 are connected by a link joined to a pin in 124, fastened at a point of the same leverage as 125. The end of lever $125'$, fastened to $123'$ and extending downward, and the end of lever $125^2$, having its fulcrum on rod $y'$, are connected by a rod $125^c$, joined to them. A friction-roller on a pin fastened to lever $125^2$ engages in the cam-groove of cam $125^3$, fastened to shaft $k$.

We have seen that immediately after the stamping operation, while the two type-lines are withdrawn, the bolt $78^2$ is withdrawn only enough to loosen the two matrix-lines, the variable spacers 4 are lifted up in the highest position, and the supporting-slides 3 are moved in the discharging position. When the back edges of the slides 3 have moved clear of the distributing-collar $122'$, the matrix-bars will fall from their supports and swing around their suspension-rods 1 in the space between the frames A' and B'. After about one-third or one-half of a line has thus dropped out the cam $125^3$ begins its action on lever $125^2$, moving this lever and all the parts connected with it, as indicated by center lines in Fig. 39, in which for the sake of clearness the parts are represented as having performed part of this motion. The bars 122 and with them the distributing-collar $122'$, all three parts being fitted over the rods 81, will move forward, the bars 122 pushing the matrix-bars on their suspension-rods in their normal positions if their path is free of obstructions, which for the present we will assume to be the case, the collar 122' at the same time pushing the spacers 4 in the space occupied by the rows of spacers, the spring 64° being during this operation prevented from acting, as already described. The round heads of 122' engage and move in the tubular link ends 72³ and 72² while the distribution takes place. While the path of 122' for the distribution of the spacer-plates is unobstructed, the two bars 122 in distributing the matrix-bars would meet with obstructions which will be removed by the following arrangement:

The horizontally-extending lever-arm 126 is fastened to the fulcrum-shaft 123', Figs. 2, 3, 39. To a pin fastened to the end of 126 is movably fitted the pawl-lever 126', the inside extension of which is normally held against a steady-pin by a spring. An angle-lever 127 is movably fitted to the shaft 77' and is held between the hub of lever 77² and a collar fastened to the shaft. At the upper end of the upward-extending arm of angle-lever 127 is a beveled projecting nose. The relative positions of levers 126 and 127 are so that in moving the outward-extending end of pawl 126' comes in contact with the bevel of the projecting nose of 127, and thereby moves the lever 127 around the fulcrum-shaft 77', depressing the end of the horizontally-extending arm of 127, which is connected by a link 127ª to the horizontal lever-arm 128, fastened to shaft 128'. This shaft is laid in bearings 128² under the upper part of standard C, Fig. 39. To the same shaft is fastened the downward-extending lever-arm 129. (See also Fig. 19.) A shaft 129', similar to 128', is laid in bearings fastened to the upper part of standard C', and the downward-extending lever-arm 129², a duplicate of 129, is fastened to it. The ends of levers 129 and 129² are connected to the two opposite ends of lever 130, Fig. 19, which is movably fitted on a pin fastened to the lower end of bracket 130', the latter being fastened to the under sides of the two plates E and E'. In this manner the motion of shaft 128' will be transmitted through the levers 129, 130, and 129² and connecting-rods 130ª to shaft 129' in the opposite direction.

To the ends of shafts 128' and 129' are fastened the angle-levers 131 and 131', Figs. 19, 36, 39. The ends of the vertical arms of these levers are connected by rods 131ª to the ends of the vertical arms of the similar angle-levers 132 and 132', the fulcrums of the latter being on pins fastened to the brackets 132², which are fastened to the under sides of E and E'. As the parts relating to the distribution of the matrix-bars on the two sides of the center line of the machine are exact duplicates of each other from the angle-levers 131 and 131', inclusive, those contained between C' and E' being left-handed, when the parts between C and E are considered as right-handed only the latter need be described.

The ends of the horizontal arms of the angle-levers 131 and 132 are engaged in mortises in the enlarged ends 133 and 133' of rods 134 and 134'. The upper part of rod 134' is fastened in a socket 135³, making part of the guide-plate A⁴. This rod is guided in bracket 135², fastened to A', and in a hole in E. A spring 136', acting in compression between E and a collar fastened to the rod 134', holds these parts normally up. The guide-plate A⁴, by means of an eye formed at its lower end, is fastened to the rod 134 below the guide-bracket 135. The upper part of the same rod 134 is guided in a boss of the bar 135', connecting frames A' and B'. A spring 136, acting in compression between bracket 135 and a collar fastened to rod 134, holds these connected parts normally in a fixed position. The upper extension of the rod 134 is joined to the end of the horizontal arm of an angle-lever 137. The end of its upward-extending arm is connected by a link to an ear at the end of rack 55². The fulcrum-shaft 137', to which angle-lever 137 is fastened, turns in brackets 137², extending from the top of A' and B'. To the part of this shaft extending outward from A' is fastened the lever 138, Figs. 36, 37, 39, which is connected with one horizontal arm of angle-lever 139 by a connecting-rod 138ª. This angle-lever has its fulcrum on a pin fastened to frame A' at the outer vertical side of it. An angle-lever 139' of the same pattern is fitted to a fulcrum-pin near the apex of the triangle formed by A' over the plate E. The angle-lever 139 or 139' is composed of two diametrically opposite arms on the same hub, but in different planes, and a lever-arm perpendicular to them. The latter extending in opposite directions from their fulcrum-pins in the two positions 139 and 139' and the ends of these perpendicular lever-arms being connected by a connecting-rod 139ª, the levers will move in opposite directions. To the ends of the longer horizontal lever-arms of the two angle-levers 139 and 139' are joined the two ends of the bar 42, and to the two inward-extending shorter lever-arms are joined the ends of bar 41. The detailed parts of the two bars 41 and 42 and their connections with levers 36 and 40 have already been described. When by the motion of pawl-lever 126' over the beveled projecting nose of 127 the lever 128 is depressed, the motion of shaft 128' will be transmitted to shaft 129'. The rods 134 and 134' will be depressed against the action of the springs 136 and 136'. Fig. 36 shows these parts in the depressed position. The upper edge of the guide-plate A⁴ will be carried sufficiently down for the free and unobstructed passage of the lower ends of matrix-plates, when the matrix-bars hang in a vertical position from their suspension-rods. The downward motion of the rods 134 by their connection with levers 137 will move the racks 55² from their normal position, in which the tooth of a matrix-bar swung up against mandrel I will freely pass through the space between teeth of the rack 55² in the position when the teeth of the matrix-bars, hanging vertically from their suspension-rods, will pass through the spaces in the rack. In this position the teeth of the three racks 55, 55′, and 55² are in line. The teeth of the rack 55², being beveled from the outside, Fig. 18, the tooth of a matrix-bar at a considerable angular deviation from the vertical will be guided in the space between two teeth of 55², and the position of the matrix-bar will be rectified. The motion of the shafts 137′ will be transferred, through levers 138 and connecting-rods 138ª, to levers 139 and 139′, depressing bar 42 and raising bar 41, which will bring the pawl-lever 40 and the retaining-lever 36 in the position shown in Fig. 37, both being momentarily disengaged from the row of matrix-bars. While these parts are in this position the matrix-bars to be distributed will be pushed completely home by the bars 122. At the moment they reach this extreme position the pawl-lever 126′ will have arrived in the position shown in dotted lines, Fig. 39. All the parts connected with angle-lever 127, through the action of the four springs 136 and 136′, will instantly spring back in their normal positions. Now all the matrix-bars and all the variable spacers have been pushed back in their original positions and will be held there, the parts performing the distribution will immediately start on their return motion, the pawl-lever 126′ will move on its fulcrum-pin while the lever 126 is on its return motion, the bar 122 will carry along the collar 122′, and as soon as the two rounded heads of the latter are disengaged from the tubular ends 72³ of the links 72′ the links 72, the cross-bar 65, and the links 72′ return in their normal positions. By this time all the parts which by the revolution of shaft $k$ have been set in motion will have returned in their original positions and the shaft $k$ will be automatically stopped.

*Recapitulation.*—A row consisting of a number of matrix-bars 2′, Fig. 7, bearing on their lower ends matrix-plates 2, each with the same printing character in intaglio or being blank, when used as a spacer is suspended from a rod 1 of solid circular section near one of its ends, the rod 1 being supported in a horizontal position at its two ends by two parallel fixed frames A and B in a manner that each rod is removable. There are two series of such rods in the machine. (See Figs. 19 and 19°.) The axis of the rods in one series are equidistant from each other and are in one plane, the planes formed by the axis of the two series of rods being inclined to each other.

The rows of matrix-bars suspended from each rod are held in place against the action of a spring by a projection or a nose at the end of lever 36, Fig. 4. In the aggregate the matrix-plates contain all the characters usually needed in printing. A number of such plates, however, are left blank and are used for spacing—as, for instance, at the beginning and at the end of paragraphs, or wherever such spacing should be found desirable. The line-spacer 2⁴, Fig. 7, is exclusively used for the separation of the two successive lines of matrix-plates assembled in operating this machine. Distinct from these fixed spacers are the justification-spacers. They are independent and are normally contained in two equal rows in the space between mandrel or platen I and sleeve J, Figs. 20, 21, and 24. A pair of these justification-spacers is normally engaged in the eyes 66⁴ of the links 66², and this pair is fed in the line after the characters of each word have been assembled.

For every printing character, for every fixed spacer, and for the justification-spacers there is a finger-key in the keyboard. Each key is connected to operating mechanism, so that when any one of the keys is depressed connection is made between a revolving shaft and the mechanism operating one matrix-bar in such a manner that the operations of releasing one matrix-bar from its row to shift it longitudinally on the rod, to rotate it, bringing its matrix-plate in contact with the platen I, and to push the plate in the space between a mandrel or platen I and supporting-slide 3 are all performed by the mechanism set in motion in the manner indicated. The same mechanism being set in motion by depressing the justification-key operates the justification-spacers by depressing the pair engaged in the eyes 66⁴ of links 66² and pushing them so that the heads 4′ engage in the tubular ends 72² of the justification-links 72, and the overlapping beveled ends engage in the space between mandrel I and slide 3. When sufficient characters and spacers have been assembled to fill a line, which is indicated by the bell and shown by the indicator, the line-spacer 2⁴ is fed in the line and forms the separation between the first and the following line. When the number of lines for which the machine is constructed are assembled, the lever 29 is depressed, thus simultaneously locking the matrix-plates into a predetermined space and starting the cam-shaft $k$ into motion. While the lines are set up the blank-holder 82 is in its normal position, in which the upper edges of the blank type-bars contained in it are heated.

By the revolving motion of the cam-shaft $k$ the following operations are performed: The lines of matrix-plates are successively justified by the successive downward motion of the links 72 and 72' and their tubular ends $72^2$ and $72^3$, Fig. 23, in which the heads 4' of the justification-spacers are engaged. The blank-holder, with the blank type-bars, moves simultaneously under the assembled matrix-plates in proper position for stamping. The upper concave surface of the blank-holder 82 is brought into close contact with the under convex surface of the assembled matrix-plates, after which the upper heated edges of the blank type-bars are pressed into the lines of printing characters by the upward motion of bar $83^2$ and connected pusher 83, which at the same time insures the accurate adjustment of the blank-holder in relation to the matrix-lines by the engagement of bolt 90' in the recess $82^3$, Figs. 23, 24, and 32. The now perfected type-bar and the blank-holder are withdrawn from contact with the matrix-plates, and at the same time the assembled lines of the latter are loosened by a small return motion of the locking-bolt $78^2$, Fig. 8. The blank-holder, with its stamped type-bars, is now moved simultaneously vertically downward and horizontally forward in the discharging position, carrying the supporting-slides 3 along with it. Simultaneously also the justifying-spacers are drawn up and the assembled matrix-plates drop out, each matrix-bar tending to swing around its suspension-rod into a vertical position in the space between the two parallel frames A' and B'. Following closely upon this motion, the distribution-bars 122 move forward, pushing the now freely-hanging matrix-bars each in its proper row, the guide-plates $A^4$, Fig. 19, the racks $55^2$, and the levers 36 and 40, Fig. 4, having meanwhile been sufficiently moved to give to the lower edges of the matrix-plates 2 and the upper and lower beveled edges of the recess $2^3$ free passage and to guide the teeth on top of the matrix-bars through the racks 55, 55', and $55^2$. At the same time the justification-spacers are pushed out of the tubular ends $72^3$ and $72^2$ by the collar 122' into the space between I and J. By this time the type-bars have been discharged into the galley 99 and along the angle-plate 91', Figs. 42 and 43, and the blank-holder 82 starts on its return motion with the supporting-slide 3, the bar $82^2$ remaining in its lowest position until, after the arrival of the blank-holder in its normal position of rest, new line-blank bars have been fed in, when the stamping-bar $83^2$ and the stamping-plate 83 will move the new blank-bars sufficiently upward to expose their upper edges to the action of the heating apparatus. At this moment the cam-shaft $k$ will have made one revolution, will automatically be disconnected from the driving-pulley, and will therefore be stopped. A repetition of the cycle of operations just described may then take place.

We claim as our invention in machines for converting metallic type-blanks into type-bars from which intelligible reading matter can be printed the following combination of parts, substantially as described and for the purpose specified:

1. The matrix-bar, having a matrix-plate 2, a stem $2^2$ an eye 2', a recess $2^3$ with upper and lower beveled edges, and a tooth $2^0$ projecting from the eye.

2. A separate eyepiece, uniform for all matrix-bars, having an eye 2', a tooth $2^0$ projecting from the eye, a recess $2^3$ with upper and lower beveled edges, and a joint $2^5$ for connection with the stem of a matrix-bar.

3. A separate matrix-plate 2, uniform for all matrix-bars, having a circular convex edge, two guide projections, one at each end of the convex edge, the circular concave edge, concentric with the convex edge, the recess for the type-matrix at the middle of the convex edge, and a joint $2^6$ for connection with the stem of the matrix-bar.

4. Means for holding a row of matrix-bars in compact form and in a fixed position on a suspension-rod, consisting of a horizontal rod of solid circular section supported at both ends in stationary frames, a series of similar matrix-bars suspended from the rod near one of its ends, a retaining-lever having a projecting retaining-hook at one end, a compressing-plate 35 and the means to press the series of matrix-bars toward the projecting hook of the retaining-lever.

5. Means for releasing one matrix-bar and for simultaneously retaining the remaining row of matrix-bars, consisting of the horizontal rod of solid circular section, the frames supporting both ends thereof, the row of similar matrix-bars mounted and suspended near one end of the rod, the means for compressing the row of matrix-bars, a retaining-lever 36 having a projecting hook normally engaged for retaining the whole row of matrix-bars in a fixed position, a retaining-lever 39 having a projecting hook normally disengaged and means for simultaneously moving the retaining-hook of the two levers in opposite directions.

6. Means for operating the retaining-levers, consisting of the retaining-lever 36, the retaining-lever 39, the fulcrum-bracket 37, the angle-lever 38, the pin extending from both sides at the end of the upward-extending lever-arm of angle-lever 38 engaged in cam-slots in each retaining-lever, the cam-slots in said retaining-levers so formed that the first part of the motion of angle-lever 38 produces simultaneous motions in opposite directions of the two retaining-levers, while the second part of the motion of said angle-lever 38 holds the two retaining-levers in a stationary position.

7. Means for removing a released matrix-bar longitudinally on the supporting-rod, consisting of the pawl-lever 40, the opening 40' and the slot 40² therein, the fulcrum-bracket 37, the angle-lever 38, the pin extending from one side of the upright arm of angle-lever 38 engaged in the opening 40', the guide-slot in bracket 37 for the motion of pawl-lever 40 and the pin in bracket 37 passing through slot 40², and means to communicate motion to the horizontal arm of angle-lever 38.

8. Means for holding a retaining-lever in a stationary position and the projecting hook at one end thereof engaged with the first of a row of matrix-bars suspended from a rod and pressed against the projecting hook, thereby holding the row of matrix-bars in a fixed and immovable position, consisting of the fulcrum-bracket 37, the retaining-lever 36 having a projecting hook at one end and being connected at the opposite end to the rod 36ᵃ, the bar 41 connected to the lower end of rod 36ᵃ, the strip 41² and the spring 41' pressing downwardly on a collar fastened to the connecting-rod 36ᵃ.

9. Means for holding a pawl-lever normally in engagement for operating the first of a row of matrix-bars suspended from a rod, and held in a fixed position by the retaining-hook of a lever, consisting of the fulcrum-bracket 37, the pawl-lever 40 having the beveled projecting pawl at one end the opposite end being joined to the upper end of connecting-rod 40ᵃ, the bar 42 joined to the lower end of connecting-rod 40ᵃ, and the spring 42' pressing the connecting-rod upwardly.

10. Means for holding normally, the angle-lever 38, the retaining and pawl levers and the row of matrix-bars connected therewith, in a stationary and fixed position, consisting of the fulcrum-bracket 37, the angle-lever 38, the connecting-rod 38ᵃ being at its upper end joined to the end of the horizontal arm of angle-lever 38, the flat joint-plate 43 fastened to the lower end of connecting-rod 38ᵃ and the supporting-rod 45.

11. The joint-plate 43 having at its upper end a socket for connection with rod 38ᵃ, and consisting of the rectangular flat part 43, the heel 43³ at its lower end, the slot 43² in the body of the plate for connection with operative parts of the keyboard and the notch 43' on one edge for connection with moving parts of the machine.

12. Means for guiding in its vertical motion a connecting-rod 38ᵃ, consisting of a fulcrum-bracket 37, an angle-lever 38, the bar 46, the horizontal slotted guide-strip 46', a joint-plate 43 engaged therein, having a slot 43², a slide-plate 47 having a lateral pin engaged in slot 43².

13. Means for guiding a slide-plate 47 in its horizontal motion, consisting of the bar 46, the slotted vertical guide-strip 46², the link 48 and the fulcrum-bar 49.

14. Means for moving joint-plate 43 horizontally by depressing a finger-key, consisting of the slide-plate 47, its laterally-extending pin engaged in slot 43², the link 48, the fulcrum-bar 49, the connecting-rod 50ᵃ, the lever-arm 50', and the key-lever 50.

15. Means for guiding in its combined vertical and horizontal motion a joint-plate 43, consisting of the bracket 37, the angle-lever 38, the connecting-rod 38ᵃ, the guide-bar 46, the guide-strip 46', and the supporting-rod 45.

16. Means for connecting with moving parts a normally stationary connecting-rod 38ᵃ, consisting of a joint-plate 43 provided with a notch 43' and a slot 43², a slide-plate 47, having a laterally-extending pin engaged with slot 43², a link 48, the fulcrum-bar 49, a connecting-rod 50ᵃ, a lever-arm 50' and a finger-key 50.

17. Means for disconnecting automatically from moving parts a connecting-rod 38ᵃ, consisting of a joint-plate 43 provided with a notch 43' and a slot 43², a slide-plate 47, the laterally-extending pin therein engaged with slot 43², the elongated notch 47' at its top edge, the rod 51², the upward-extending series of lever-arms 51, the fulcrum-shaft 51' thereof, the downward-extending lever-arm 52, and means to impart oscillating motion to lever-arm 52 by a revolving shaft.

18. Means for communicating motion to angle-lever 38 and thereby to the matrix-bar-operating mechanism, consisting of the fulcrum-shaft 44', the series of levers 44 secured thereon, the rod 44², the connecting-rod 38ᵃ, the joint-plate 43 having the notch 43' and slot 43², the mechanism for engaging the slot 43' with the rod 44², the lever-arm 53 in operative connection through link 53ᵃ with the cam-lever 54 the latter having a roller 54' engaged in the cam-groove of cam $p^2$ fastened to cam-shaft $p$, and means to communicate motion to cam-shaft $p$.

19. Means for holding a number of rows of matrix-bars suspended from an equal number of rods in compact form and in a fixed position, consisting of a series of horizontal straight rods of circular section and of equal length, the two parallel frames A and B supporting the rods, a row of a number of similar matrix-bars suspended from each rod, a series of fulcrum-brackets 37, a series of retaining-levers 36, a series of springs 34', pressing all the rows of matrix-bars, through lever-arms 34, guide-rods 35 and plates 35', against the hooks of levers 36.

20. Means for releasing one matrix-bar from any one of a number of rows of matrix-bars suspended from an equal number of horizontal rods and for retaining the remaining row of matrix-bars, consisting of a series of horizontal straight rods of solid circular section and of equal length, the two parallel frames supporting the rods, a row of a number of similar matrix-bars suspended from each rod, a series of springs compacting the rows of matrix-bars, a series of retaining-levers 36, a series of retaining-levers 39, a series of fulcrum-brackets 37 and a series of angle-levers 38.

21. Means for moving longitudinally on the rod a released matrix-bar from any one of a number of rows of matrix-bars suspended from an equal number of horizontal rods, consisting of a series of horizontal straight rods of equal length and solid circular section, the two parallel frames supporting the rods, a row of similar matrix-bars suspended from each rod, a series of retaining-levers 39, a series of pawl-levers 40, a series of fulcrum-brackets 37 and a series of angle-levers 38.

22. Means for holding the matrix-bar-operating mechanisms normally in a state of rest, consisting of a series of angle-levers 38, a series of fulcrum-brackets 37, a series of connecting-rods $38^a$, a series of joint-plates 43 and the supporting-rod 45.

23. Means for guiding the motion of any one of a series of connecting-rods $38^a$, consisting of a series of fulcrum-brackets 37, a series of angle-levers 38, a series of joint-plates 43 each being provided with a slot $43^2$, a series of slide-plates 47, having each a laterally-projecting pin engaged with the slots $43^2$, the guide-bar 46, the horizontal guide-strip $46'$ having a series of guide-slots and the supporting-rod 45.

24. Means for guiding the motion of each of a series of slide-plates 47, consisting of the fulcrum-bar 49, the series of guide-grooves therein, a fulcrum-rod, a series of links suspended therefrom, the guide-bar 46 and the vertical guide-strip $46^2$ having a series of guide-slots.

25. Means to hold each of a series of retaining-levers normally in a fixed position, consisting of a series of fulcrum-brackets 37, a series of retaining-levers 36, a series of connecting-rods $36^a$ each having an abutment-collar secured to its lower part, the bar 41 having a series of round countersunk holes at its upper edge, the abutment-strip $41^2$, the series of springs $41'$ and means to hold the movable bar 41 normally in a fixed position.

26. Means to hold each of a series of pawl-levers normally in a fixed position, consisting of a series of fulcrum-brackets 37, a series of pawl-levers 40, the corresponding series of connecting-rods $40^a$, the bar 42 having a horizontally-projecting rib with a series of slots for connection with the lower joint-sockets of rods $40^a$, the plate $42^2$, the series of springs $42'$ and means to hold the movable bar 42 normally in a fixed position.

27. A support for the rods and the matrix-bars suspended therefrom, consisting of the two triangular parallel frames $A'$ and $B'$, the frame-plates A and B superposed thereon, said plates A and B having a series of equidistant circular holes therein for the support of rods 1, and the cross-ties U connecting the top part of said plates.

28. Means for holding the rows of matrix-bars in a vertical position on their suspension-rods, consisting of the two parallel triangular frames $A'$ and $B'$, the frame-plates A and B, the cross-ties U and the stationary rack 55.

29. The frame-plate A, consisting of the parallel lower and upper flanges, the web having a series of openings for the passage of pawl and retaining levers, and having a series of equidistant holes disposed in a straight line for supporting one end of each of a series of rods 1.

30. Means for supporting the mechanism compressing the rows of matrix-bars suspended from the rods 1, consisting of the frame-plate A with the parallel upper and lower flanges, the connecting-web having a series of circular guide-holes for the rods 35, the angle-plate $A^2$, secured to the upper flange of plate A, having its upward-projecting rib supplied with a series of circular holes for the support of brackets $34^2$.

31. Means for holding the removable rods, 1, in a fixed position in the supporting-frames, consisting of the two parallel frame-plates A and B, the retaining-strip 33 fastened to plate B and the projecting pin 32 secured near one end of each of the rods 1.

32. The construction of the framework and fundamental support for all other parts of the machine, consisting of the two standards C and $C'$, the two cross connecting-frames D and $D'$, the upper and lower beams F and $F'$, the inside supporting-plates E and $E'$, all immovably and rigidly connected together.

33. Means to resist the stress of stamping the type-blanks, consisting of the beams F secured to the upper ends of cross-frames D and $D'$, the hangers H and $H'$ and the mandrel or platen I, all rigidly connected together.

34. Means for the support of the rows of justifying spacing-plates in position for operation, consisting of the beams F, the hangers H and $H'$, the mandrel I and the sleeve J as described.

35. Means for guiding the justifying spacing-plates in their progressive motion in the line of matrix-plates, consisting of the beams F, the hangers H and $H'$, the mandrel I, the sleeve J and the guide-rods 81.

36. Means for holding the rows of justifying spacing-plates normally in a fixed position, consisting of the mandrel I the sleeve J, the bracket $65'$, the movable retaining-bar 65 and the spring holding the retaining-bar in its normal position.

37. Means for compressing two rows of justifying spacing-plates, consisting of the mandrel I, the sleeve J, the ring-plate $64^3$, the rods $64^2$, the socket 64, the guide-rod $64'$ and the spring $64^0$.

38. Means for the support of spacing-plates, consisting of the mandrel I, the sleeve J and two rows of an equal number of justifying-plates 4 having circular projecting-heads supported by sleeve J.

39. Means for moving the heads of justification-plates in arcs concentric with the circumference of mandrel I, consisting of the hangers H and H', the two fulcrum-spindles $66'$, the guide-levers 66, the links $66^2$ and link-plates $66^4$.

40. Means for holding the two link-plates $66^4$ normally in a fixed position for the introduction of two heads of spacing-plates 4, consisting of, the links $66^2$, the lever-arms 66, the links $66^3$, the lever-arm 67, the fulcrum-shaft $67'$, the lever-arm $67^2$, the connecting-rod $67^3$, having at its lower end a socket connected to the joint end $68^3$ by plates $69^3$, and the supporting-bracket 70.

41. Means for moving the heads of a number of pairs of justification spacing-plates in arcs concentric with the circumference of mandrel I, consisting of the hangers H and H', the fulcrum-spindles $66'$, the guide-levers 66 and $66^0$, the links 72 and the tubular ends $72^2$ thereof.

42. Means for holding the tubular ends $72^2$ normally in a fixed position for the introduction therein of the heads of spacing-plates 4, consisting of the links 72, the guide-levers 66 and $66^0$, the links $73^a$, one cross-head 73, all connected with links 72, the lever-arm 74, the link $73'$ joining lever 74 to one cross-head 73, the spring $73^2$ in compression between 74 and 73, and means for holding lever 74 normally in a fixed position.

43. Means for converting reciprocating motion of fixed amplitude of lever-arm 74, into motion of variable amplitude of the wedge ends of justification-plates 4, consisting of the cross-head 73, the forked link $73'$, joined to lever-arm 74, and connected by means of slots with cross-head 73, the spring $73^2$, the links $73^a$, the links 72, the tubular ends $72^2$ and the justification-plates 4.

44. Means for moving two series of justifying spacing-plates in circular arcs, one series independent of the other series, consisting of the two stationary hangers H and H', the two fulcrum-spindles $66'$, the guide-levers 66 and $66^0$, the pair of justifying-links 72, the tubular ends $72^2$ thereof, the pair of justifying-links $72'$, and the tubular ends $72^3$.

45. Means for justifying two lines of assembled matrix-plates independently of each other, consisting of, the mechanism for imparting reciprocating motion of fixed amplitude to lever-arm 74, the similar mechanism imparting reciprocating motion of fixed amplitude to lever-arm 75, the mechanism converting the motions of fixed amplitude into motions of variable amplitude and the mechanism moving the tubular ends $72^2$ and $72^3$ through arcs concentric with the circumference of mandrel I.

46. Means for supporting matrix-plates during formation of lines and during subsequent operations of justifying and of stamping of type-lines, consisting of the cross-frames D and D', the vertically-adjustable brackets $G^2$, the slide-bars G and G' and the movable slide 3.

47. Means for supporting the movable type-blank holder and for adjusting the vertical position thereof, consisting of the type-blank holder 82, the slide-bars $82'$, the adjustable connecting-rods $86'$, the joint-forks $86^3$, the horizontally-extending arms of angle-levers 86 and means to hold angle-lever 86 normally stationary and in a fixed position.

48. Means for equalizing the vertical motion of both ends of bar $83^2$, consisting of the bar $83^2$, the adjustable connecting-rods $84^a$, the fulcrum-shaft $84'$, the lever-arms 84 secured thereto, and the bearing-brackets $84^2$ rigidly connected to cross-frames D and D'.

49. Means for communicating reciprocating motion to operating-rods $44^2$ and $44^3$ from a revolving cam-shaft, consisting of the fulcrum-shaft $44'$, the series of parallel levers 44 secured thereto, the rods $44^2$ and $44^3$, the downwardly-extending lever-arm 53, the link connection $53^a$, the angle-lever 54 with friction-roller $54'$, at its downwardly-extending arm, engaged in the groove of cam $p^2$ secured to cam-shaft $p$ and the fulcrum-pin of angle-lever 54 secured to bracket Q.

50. Means for rotating an isolated matrix-bar on its suspension-rod, so as to bring its matrix-plate in contact with mandrel I consisting of the rack $55'$, the link $56^a$, the lever-arm 56, the fulcrum-shaft $56'$ supported in bearings rigidly connected to hangers H and H', the horizontally-extending lever-arm $56^2$, the connecting-rod $57^a$, the angle-lever 57, the fulcrum-shaft $57'$, the cam 58 secured to cam-shaft $p$.

51. Means for assembling in the spaces between the supporting-slide and the mandrel I the matrix-plates and the justifying spacing-plates to form lines, consisting of the guide-rods $63'$, the pushing-rods $63^2$, the fork $63^3$, the annular socket 63, the downwardly-extending lever-arm 59 connected by links to socket 63, the fulcrum-shaft $59'$ supported in stationary bearings, the horizontally-extending lever-arm 59, the connecting-rod $59^a$, the fulcrum-shaft $61'$ supported in bearings in brackets Q' and $Q^2$, the two oppositely-extending lever-arms 61 and 61², the friction-roller at the end of lever-arm 61² and the cam 62 secured to cam-shaft $p$.

52. Means for transferring motion to the mechanism for moving two justifying spacing-plates in position to be fed in line, consisting of the cam-shaft $p$, the cam 62² secured thereto, the fulcrum-shaft 68' supported in brackets Q' and Q², the downwardly-extending lever-arm 68² with friction-roller engaged in the groove of cam 68², the horizontally-extending lever-arm 68 with laterally-extending pin from the end thereof and the means to engage this pin in the notch of joint end 68³ by depressing a finger-key.

53. Means for feeding a pair of justifying spacing-plates in the space for collecting matrices in line, consisting of the two guide-rods 63', the semi-annular socket 63, the fork 63³, the downwardly-extending lever-arm 59 connected by links to socket 63, the fulcrum-shaft 59' supported in stationary bearings, the horizontally-extending lever-arm 59, the connecting-rod 59ª, the lever-arms 61, 61² and 61³ secured to fulcrum-shaft 61' and the supporting-brackets Q', Q², and Q³.

54. Means for supporting finger-key levers or the construction of the keyboard, consisting of, the brackets 105, 105' and 105² all fastened to cross-frame D, the oblique supporting-bars 106 and 106', the inclined bearing-bars 106² secured thereto and the keyboard-plates 105³ with the downwardly-projecting lugs 105⁴.

55. Means for transferring motion from rod 44² to the mechanism for separating one matrix-bar from a selected row of matrix-bars, consisting of a finger-key lever 50, the downwardly-extending lever-arm 50' rigidly connected with lever 50, the connecting-rod 50ª, the link 48, the fulcrum-bar 49, the slide-plate 47 with the laterally-extending pin engaged in slot 43² of the joint-plate 43.

56. Means for restoring to its normal position a depressed finger-key, consisting of the slide-plate 47, the notch 47' therein, the rod 51² engaged in the notch 47', the upwardly-extending series of lever-arms 51 secured to fulcrum-shaft 51', the downwardly-extending lever-arm 52, the upwardly-extending lever-arm 13 directly connected with lever-arm 52 by a laterally-extending pin, the connecting-link 15, the upwardly-extending lever-arm 14, the upwardly-extending cam-lever 16, both secured to the same fulcrum-shaft movable in bearings of brackets S', the disk 9 fastened to cam-shaft $p$ and, laterally extending from the face of disk 9, the lugs 9⁰ and 9'.

57. Means for connecting the end of lever-arm 68 with the joint end 68³ of connecting-rod 67³, consisting of the two horizontally-extending key-levers 71 rigidly secured to the fulcrum-shaft 71², the finger-plate 71⁴, the downwardly-extending lever-arm 71', the rod 71³ joined at one end to lever-arm 71' and guided at the other end in a hole of the projection 70² of the bracket 70 and the guide and slide piece 70'.

58. Means for disconnecting automatically the joint end 68³ from lever 68, consisting of the slide-plate 69, the notch at its upper edge, the rod 51² engaged in the notch, the swiveling and sliding connection 69' with joint-plates 69³, the fulcrum-shaft 51', a number of upwardly-extending similar lever-arms 51 holding rod 51², the lever-arm 52, the lever-arm 13 connected therewith, the link 15, the lever-arm 14, the cam-lever 16 and the lugs 9⁰ and 9' projecting from the face of disk 9 secured to cam-shaft $p$.

59. Means to transmit motion from the normally revolving shaft $n$ to the cam-shaft $p$, by depressing a finger-key, consisting of the shaft $n$, the bearings P, the cone-pulley $m$, the clutch $o$, the disk 9 secured to shaft $p$, the circular clutch projection 5, the lugs 9⁰ and 9', the cam-shaft $p$ supported in bearings P, the clutch-levers 6, the spring-lever 8, the disengaging lever 10, all three levers being rigidly secured to fulcrum-shaft 7, the spring-cap 11, the abutment-lever 12 and, secured to the same fulcrum-shaft, the lever-arm 13.

60. Means to communicate motion to the upwardly-extending lever-arm 13, thereby disengaging abutment-lever 12 and spring-cap 11, by depressing a finger-key, consisting of the fulcrum-shaft 51' and, rigidly connected thereto, the lever-arm 52 and the series of lever-arms 51, the rod 51², the slide-plate 47, the notch 47' at the top edge thereof, the suspended link 48, the fulcrum-bar 49, the connecting-rod 50ª, the lever-arm 50' and the finger-key lever 50.

61. Means for disengaging the clutch $o$ automatically, consisting of the disk 9 secured to shaft $p$, the lugs 9⁰ and 9', the cam-lever 16, the lever-arm 14 both rigidly secured to a common fulcrum-shaft, the link 15, the lever-arm 13, the abutment-lever 12, both secured to the same fulcrum-shaft, the spring-cap 11, the fulcrum-shaft 7 and, rigidly secured thereon, the clutch-levers 6, the spring-lever 8, the disengaging lever 10 and the beveled upper projecting nose thereof.

62. Means to transmit the motion of depression of finger-keys 71 to fulcrum-shaft 51' and to the lever-arms secured thereon, consisting of the lever-arms 71 and 71' secured to fulcrum-shaft 71², the connecting-rod 71³, the sliding guide-piece 70', the joint end 68³, the plates 69³, the socket and the connecting-rod 67³, the swivel and slide connection 69', the slide-plate 69, the notch at its upper edge engaging rod 51², the series of levers 51, the fulcrum-shaft 51' and the lever-arm 52.

63. Means for indicating the progressive additions in assembling a line of matrix-plates, consisting of the shaft 109', the supporting and bearing brackets 108 and 108', the pointer 107², the dial 107, the dial-disk 107', the ratchet-wheel 109, the lever 110, the pawl 110' and the pawl 110².

64. The construction of the indicator-link 114', consisting of the hook at one end for suspension from a rod, the slot 114³ at the opposite end for connection with slide-plate 47, the notch 114² at one edge and the supporting-heel projecting from the opposite edge.

65. Means to hold an indicator-link normally in a fixed position unaffected by moving parts, consisting of the rod 113³ normally held up in engagement with the hook of indicator-link 114', the slot at the lower end, the slide-plate 47 with the laterally-extending pin engaged in the lower slot of link 114', the guide-strip 46², the suspension-link 48, the fulcrum-bar 49 and the supporting-bar 114 for the projecting heel of link 114'.

66. Means to hold a series of indicator-links in a fixed position unaffected by the motion of one of the indicator-links and of the rod 113³ or of any other part, consisting of a series of indicator-links 114', a series of slide-plates 47 each connected by a laterally-extending pin engaged in the slot 114³ at the lower end of each indicator-link, a series of suspension-links 48, the fulcrum-bar 49, the guide-strip 46² with a series of guide-slots and the bar 114.

67. Means to hold the rod 113³ normally in a fixed position against the upper end of the fork of the indicator-link 114', consisting of the fulcrum-shaft 113', a number of parallel lever-arms 113² supporting rod 113³, the lever-arm 113, the connecting-rod 113ª, the lever-arm 112³, the fulcrum-shaft 112', the lever-arm 112² and the adjustable spring 112⁵.

68. Means for simultaneously connecting a joint-plate 43 and an indicator-link with the rods held by levers 44, consisting of the fulcrum-shaft 44', a number of parallel levers 44, the rods 44² and 44³, the connecting-rod 38ª, the joint-plate 43, the notch 43', the slot 43², the indicator-link 114', the notch 114², the slot 114³, the slide-plate 47, the laterally-extending pins thereof engaged in slots 43² and 114³, the link 48, the fulcrum-bar 49 and the guide-bar 46 with guide-strips 46' and 46².

69. Means for giving audible warning of the approaching completion of a line of matrix and spacing plates, consisting of the bell 111, the bell-hammer 111', the sleeve 111² fitted to a stationary fulcrum-pin, the arm 111⁴ held in a fixed position against a stop-pin by a spring, the downwardly-extending arm with the projecting flap 111³, the disk 109² secured to shaft 109' and the pins projecting laterally from the face of disk 109².

70. Means for separating from a first line of assembled matrix-plates a second line of such plates, consisting of the line-separating spacer 2⁴, the projecting heel thereof, the supporting-slide 3, the mandrel I and the groove I' therein.

71. Means for moving the pointer 107² to a zero-point on the dial 107 by the introduction of the line-separating spacer 2⁴ after a first line of matrix-plates has been assembled, consisting of the lever 115, its fulcrum-bracket 115', an indicator-link 114' suspended from a laterally-projecting pin of one arm of lever 115, a slide-plate 47 connected to said indicator-link 114' by a pin engaged in the slot 114³ thereof, the connecting-rod 115ª, the fork 115² joined to the second arm of lever 115, intermediate lever connection between connecting-rods 115ª and 116ª, the sheet-metal slide 117, the guide-bracket 117', the friction-plate 117², the disk 109² secured to shaft 109' and the stop-pins projecting laterally from the face of disk 109².

72. Means for moving the pointer 107² to a zero-point on the dial 107 by the operation of a hand-lever, consisting of the hand-lever 29, the fulcrum-shaft 30', the lever-arm 31, the link 31ª, the lever-arm 79², the lever-arm 79³ both secured to fulcrum-shaft 79', the joint-piece 115³, the connecting-rods 115ª and 116ª, the intermediate lever connection between them, the slide 117, the guide-bracket 117', the friction-plate 117², the disk 109² secured to shaft 109' and the stop-pins projecting from the face of the disk.

73. Means for holding a supply of type-blanks ready for the operation of the machine, consisting of a tray 91, a movable compressing-plate 91' secured to the guide-block 91³, the guide-box 91², the slide-plate 97, the rectangular opening 97' for the reception of a type-blank and the weight 92³ connected by cords to block 91³.

74. Means for transferring a type-blank from the tray in position to be fed in the holder, consisting of the slide-plate 97, having a rectangular opening 97' normally holding a type-blank, the joint-piece 97² the connecting-link thereof with lever-arm 98, the fulcrum-shaft 98', the lever-arm 98², the connecting-rod 98ª, the lever-arm 98³ with fulcrum on rod $y$ and a friction-roller engaged in the cam-groove of cam $z'$ secured to cam-shaft $k$.

75. Means for introducing a type-blank into the holder, consisting of the type-blank holder 82, the guide-box 91², the slide-plate 97, the opening 97' containing a type-blank, the plungers 94 and 94', the connecting-rod 95ª, the lever-arms 95 and 95² both secured to fulcrum-shaft 95', the connecting-link 96ª, the lever 96 with fulcrum on pin 96' and with friction-roller engaged in the groove of cam $z$.

76. Means for pushing a type-blank in the holder in position exposing its upper edge to the action of a heating medium, consisting of the blank-holder 82, the stamping-plate 83, the bar 83², the means for equalizing the motion of the two ends of bar 83², the adjustable eyepiece 83³, the links 83ª, the levers 88 and 88² secured to fulcrum-shaft 88′, the connecting-rod 88ª, the lever-arm 88⁴ with fulcrum on rod $y$ and friction-roller engaged in the groove of cam 88³.

77. Means for softening the whole horizontal upper projecting edge of a metallic type-bar blank, consisting of an inclosing type-bar-blank holder, a metallic type-bar blank inclosed therein, a device for supplying a heat-generating medium, and means to impart the heat generated to the whole upper projecting edge of the type-bar blank in the inclosing holder.

78. Means for transferring a type-bar blank, from a supply thereof, to an inclosing holder, and means for softening the upper edge of the type-bar blank, projecting from the upper surface of the inclosing holder, consisting of a horizontal tray closed at one end, mechanism for pressing a supply of type-bar blanks in the tray toward the closed end thereof, mechanism for feeding a type-bar blank into an inclosing holder, exposing the upper edge thereof, a device for supplying a heat-generating medium, and means to impart heat generated by the medium to the whole upper projecting edge of the type-bar blank in the inclosing holder.

79. Means for softening the upper projecting horizontal edge of a type-bar blank in an inclosing holder, and means for stamping embossed printing characters on the softened edge of the type-bar blank in the inclosing holder, consisting of a type-bar-blank-inclosing holder, a type-bar blank inclosed therein, a device for supplying a heat-generating medium, means for imparting heat generated by the medium to the whole upper projecting edge of the type-bar blank in the inclosing holder, an assembled row of matrix-plates, mechanism for moving the holder horizontally with a type-bar blank inclosed therein, under the assembled row of matrix-plates, mechanism for pressing the upper surface of the holder against the under surface formed by the assembled matrix-plates, mechanism for adjusting the exact horizontal position of the type-bar blank in the inclosing holder, and mechanism for stamping embossed printing characters on the softened upper edge of the type-bar blank in the holder.

80. Means for softening a projecting edge of a type-bar blank in an inclosing holder, means for stamping embossed printing characters on the softened edge of the type-bar blank in the inclosing holder, means for discharging the finished type-bar from the inclosing holder, and means to feed a new type-bar blank in the inclosing holder, consisting of a type-bar-blank holder, a type-bar blank inclosed therein, a device for the conveyance of a heat-generating medium, means to impart heat generated by the medium to the upper projecting edge of the type-bar blank in the inclosing holder, an assembled row of matrix-plates, mechanism for moving the holder with the inclosed type-bar blank horizontally, mechanism for moving the holder independently of the type-bar blank inclosed therein vertically, mechanism for moving the type-bar blank and the embossed type-bar in the inclosing holder vertically, mechanism for discharging the embossed and finished type-bar and mechanism for feeding a new type-bar blank in the inclosing holder.

81. Means for transferring two type-blanks to a holder from a supply of type-blanks and for softening the upper edges of the same for the operation of stamping, consisting of two trays holding each a supply of metallic type-blanks, a type-blank holder for two type-blanks, the mechanism for feeding into the holder two type-blanks in position exposing the upper edges thereof, means to generate heat independent of any other function of the machine and means to transmit the so generated heat to the upper projecting blank edges of the two type-blanks.

82. Means for softening the upper edges of two type-line blanks and for stamping embossed printing characters thereon, consisting of a holder for two type-line blanks, two metallic type-line blanks therein, means to generate heat, means to transmit heat to the upper projecting edges of the two type-line blanks, the mechanism for bringing the holder with the two type-line blanks in juxtaposition with two assembled lines of matrix-dies and the mechanism for embossing at one operation two lines of printing characters on the previously-heated blank edges of the two metallic type-line blanks.

83. The blowpipe-lamp for heating the upper edge of a type-blank in a holder, and the means for supplying the burners thereof with the gaseous combustible necessary for the production of a flame, consisting of the socket 118, fastened to frame D′, the faucet-joint 118′, the pipe 118², the horizontal pipe 119 having a number of holes longitudinally disposed thereon, the clamp-sockets 119³, the burners 119′ secured on the top of the short pipes held in the sockets 119³, said pipes being closed at their lower ends and each of the short pipes being provided with an opening communicating with the holes in pipe 119.

84. Means for generating heat and for applying the generated heat to the horizontal upper edge of a metallic type-bar blank projecting from the upper surface of an inclosing holder, consisting of a type-bar-blank holder, a type-bar blank inclosed therein, a burner at one side of the holder, apparatus for supplying the burner with combustible for the production of a flame and means to deflect the flame laterally to the length of and toward the horizontal upper edge of the type-bar blank inclosed in the holder.

85. Means for generating heat and for its application to the whole length of a projecting horizontal upper edge of a metallic type-bar blank in an inclosing holder, consisting of a type-bar-blank-inclosing holder, a type-bar blank inclosed therein, a number of burners disposed in a row at one side of the holder, apparatus for supplying the burners with combustible for the production of flames, and means to deflect each flame laterally to the length of and toward the horizontal upper projecting edge of the type-bar blank in the inclosing holder.

86. Means for generating heat, for applying the heat to the upper horizontal projecting edge of a type-bar blank in an inclosing holder and for regulating the intensity of heat so applied, consisting of a type-bar-blank-inclosing holder, a type-bar blank inclosed therein, a burner at one side of the holder, apparatus for supplying the burner with combustible for the production of a flame, means to deflect the flame laterally to the length of and toward the projecting edge of the type-bar blank in the inclosing holder and means to change the position of the burner in relation to the projecting edge of the type-bar blank in the inclosing holder.

87. Means for generating heat, for applying the generated heat to the whole length of a horizontal upper projecting edge of a type-bar blank in an inclosing holder, and for regulating the intensity of heat so applied, consisting of a type-bar-blank-inclosing holder, a type-bar blank inclosed therein, a number of burners in a row parallel with and at one side of the type-bar-blank-inclosing holder, apparatus for supplying the burners with combustible for the production of flames, means to deflect the flame of each burner laterally to the length of and toward the projecting edge of the type-bar blank in the inclosing holder, and means to change the positions of the burners in relation to said horizontal upper projecting edge of the type-bar blank inclosed in the holder.

88. Means for deflecting the flame of a burner toward the horizontal upper projecting edge of a type-bar blank in an inclosing holder, consisting of a type-bar-blank-inclosing holder, a type-bar blank inclosed therein, a burner at one side of the holder, supplied with combustible producing a flame, apparatus for supplying compressed air and a blowpipe supplied with compressed air deflecting the flame of the burner toward the projecting edge of the type-bar blank in the inclosing holder.

89. Means for deflecting the flames of a row of burners toward the horizontal upper projecting edge of a type-bar blank in an inclosing holder, consisting of a type-bar-blank-inclosing holder, a type-bar blank inclosed therein, a row of a number of burners at one side of the holder and parallel to the length of the projecting edge of the type-bar blank inclosed therein, apparatus for supplying to the burners combustible producing flames, for each burner a blowpipe supplied with compressed air deflecting each flame toward the projecting edge of the type-bar blank in the inclosing holder, and apparatus for supplying the blowpipes with compressed air.

90. Means for deflecting the flame of a burner toward the horizontal upper projecting edge of a type-bar blank in an inclosing holder, means for regulating the direction of the flame and means for regulating the quality of the flame, consisting of a type-bar-blank-inclosing holder, a type-bar blank inclosed therein, a burner at one side of the holder, apparatus for supplying the burner with combustible producing a flame, a blowpipe adjustably located in relation to the burner, apparatus for the supply of compressed air for the blowpipe, means for changing the direction of the blowpipe and means for changing the distance of the blowpipe from the burner.

91. Means for deflecting the flames of a row of burners toward the horizontal upper projecting edge of a type-bar blank inclosed in a holder, means for regulating the direction of each of the flames, and means for regulating the quality of all the flames, consisting of a type-bar-blank-inclosing holder, a type-bar blank inclosed therein, a row of a number of burners at one side of the holder and parallel to the length of the projecting edge of the type-bar blank inclosed therein, apparatus for supplying to the burners combustible producing flames, blowpipes adjustably located in relation to each of the burners, apparatus supplying the blowpipes with compressed air, means for changing the direction of the blowpipes and means for changing the distance of the blowpipes in relation to the row of burners.

92. Means for locking an assembled line of matrix-plates within a predetermined length of space, consisting of the hand-lever 29, the lever-arm 31 both secured to fulcrum-shaft 30', the connecting-link 31$^a$, the lever-arms 79$^2$ and 79 secured to fulcrum-shaft 79', the stationary guide-rod 78, the sleeve 78' with its downward extension, the link connection 79$^a$ and the bolt 78$^2$.

93. Means for relieving the pressure on the rows of justifying spacing-plates, consisting of the hand-lever 29, the horizontally-extending lever-arm 31' both secured to fulcrum-shaft 30', the connecting-link 31$^c$, the lever-arms 31$^2$ and 31$^3$ secured to a common fulcrum-shaft supported in bearings of brackets V, the spring-rod 64', the abutment projection at one end, the socket 64 at the other end of rod 64' and the guide-rods $64^2$.

94. Means for releasing the cam-shaft $k$ from the stop holding it normally in a fixed position while at rest, consisting of the hand-lever 29, the lever-arm 30 both secured to fulcrum-shaft 30', the connecting-rod $30^a$, the lever-arm 27 with fulcrum on rod $y$, the cam-roller 27', the cam $x$ fastened to cam-shaft $k$ and the abutting stop $x'$ in the groove of the cam.

95. Means for transmitting motion to shaft $k$ from a pulley rotating idly on the same, by releasing mechanism normally holding the shaft in a state of rest, consisting of the hand-lever 29 the lever-arm 30 both secured to fulcrum-shaft 30', the connecting-rod $30^a$, the cam-lever 27 with fulcrum on rod $y$, the collar $24^2$ on connecting-rod $30^a$, the lever-arms 24 and 24' with fulcrum on shaft 22, the connecting-rod $25^a$, the lever-arm 25, the catch-lever 26 both secured to a fulcrum-rod movable in lug $v'$, and the spring 25'.

96. Means for automatically connecting the clutches transferring motion from pulley $j$ to cam-shaft $k$, consisting of the pulley $j$ with the clutch-ring, the clutch $t$, the hub provided with the arms $s$ secured to shaft $k$, the collar $t'$, the lever-arms 17, the lever-arm 19, the lever-arm 20, the fulcrum-shaft 18, the connecting-rod $20^a$, the lever-arm 21 secured to fulcrum-shaft 22 and the spring 21'.

97. Means for the automatic disengagement of the clutch by one revolution of shaft $k$, consisting of the circular disk $w$ fastened to cam-shaft $k$, the projecting nose $w'$ thereof, the angle-lever 28 with fulcrum on rod $y'$, the projecting nose $28^2$, the connecting-rod $23^a$, lever-arm 23 secured to fulcrum-shaft 22 and the mechanism for operating the clutch $t$.

98. The mechanism for justifying an assembled line of matrix-plates by the revolving motion of cam-shaft $k$, consisting of a pair of justifying-links 72', the tubular lower ends $72^3$ thereof, the guide-levers 66 and $66^0$ with fulcrum on spindles 66', the cross-head 73, link connection thereof with links 72', the spring-link 73', the lever-arms 75 and $75^2$ secured to fulcrum-shaft 75', the lever-arms 77 and $77^2$ secured to fulcrum-shaft 77', the connecting-rods $77^a$ and $80^a$ and the lever-arm 80 with fulcrum on pin 80' and with a friction-roller engaged in a groove of cam $z$.

99. Means for justifying two assembled lines of matrix-plates in succession, consisting of the pair of justifying-links 72, the tubular ends $72^2$ thereof, the pair of justifying-links 72' the tubular ends $72^3$ thereof, the guide-levers 66 and $66^0$ with fulcrum on spindles 66', the mechanism connecting links 72' with cam Z, the similar mechanism connecting links 72 with cam $Z^2$ and the relative construction of the two grooves in the cams Z and $Z^2$ by which the cam $Z^2$ connected to justifying-links 72 will perform the operation of justifying in advance of the cam Z connected to justifying-links 72'.

100. Means for moving the type-blank holder from its normal position of rest in the various positions for the performance of its functions, consisting of the slide-bars 82', the type-blank holder 82, the connecting-rod $82^a$, the lever 85 with fulcrum on rod W, the adjusting-slot 85', the connecting-rod $85^a$, the lever-arm $85^2$ with fulcrum on rod $y$ and the cam $85^3$ secured to cam-shaft $k$.

101. Means for pressing the upper face of the type-blank holder tightly against the under face of an assembled line of matrix-plates consisting of the slide-bars 82', the supporting-forks $86^3$ and connecting-rods 86', the angle-levers 86, the connecting-rods $86^a$, the oppositely-extending lever-arms $86^2$ fastened to fulcrum-shaft 87', the lever-arm 87, the connecting-rod $87^a$, the lever-arm $87^2$ with fulcrum on rod $y$ and with friction-roller engaged in groove of cam $87^3$.

102. Means for the exact adjustment of the position of the type-blank holder for stamping, consisting of the blank-holder 82, the notched projection $82^3$, the slide-bars 82', the lever 90 with arms extending in opposite directions from a fulcrum-pin secured to bar G', the link connection of the end of one arm with a pin secured to bar 82', the bolt 90' in operative connection with the second arm of lever 90, the guide-plate for the bolt 90' secured to the bar G'.

103. The mechanism for the performance of the stamping operation, consisting of the stamping-plate 83, the bar $83^2$, the eyepiece $83^3$, the links $83^a$, the lever-arms 88 and $88^2$ secured to fulcrum-shaft 88', the connecting-rod $88^a$, the lever-arm $88^4$ with fulcrum on rod $y$ and with a friction-roller engaged in the groove of cam $88^3$ which is secured to cam-shaft $k$.

104. Means for equalizing the vertical motion of the two ends of bar $83^2$, consisting of the pins $83^4$ projecting from each end of bar $83^2$, the adjustable connecting-rods $84^a$ the lever-arms 84 rigidly secured to shaft 84' and the stationary bearing-brackets $84^2$.

105. Means for moving an embossed type-bar in the discharging position, consisting of the mechanism for moving the type-blank holder in a horizontal direction in combination with the mechanism for moving the stamping-plate 83 in a vertical direction.

106. Means for discharging an embossed type-bar from the holder consisting of the guide-frame 100, the plungers 100' and $100^2$, the connecting-rod $101^a$, the lever-arms 101 and $101^2$ both secured to fulcrum-shaft 101', the lever 102 with arms extending in opposite directions from its fulcrum-pin secured to standard C', the link conection of the end of one arm of lever 102 with lever-arm $101^2$, and the cam $z^2$ the groove of which holds in engagement the friction-roller at the end of the second arm of lever 102.

107. Means for loosening locked and justified matrix and spacing plates consisting of the mechanism for locking assembled lines in a predetermined space, in combination with the lever-arm 30 secured to fulcrum-shaft 30′, the connecting-rod 30ª, the lever-arm 27 with fulcrum on rod $y$ and with friction-roller 27′ engaged in the groove of cam $x$ and the offset $x^2$ in said cam-groove.

108. Means for automatically reëstablishing pressure on the rows of justifying-plates, consisting of the mechanism for relieving the pressure on said rows of justifying-plates in combination with the lever-arm 30, the connecting-rod 30ª, the lever-arm 27 with fulcrum on rod $y$, and having a friction-roller 27′, engaged in the cam-groove of the cam $x$, rigidly secured to cam-shaft $k$.

109. Means for dropping matrix-bars, from an assembled line of matrix-plates, in position on the suspension-rods to be returned in their respective rows, consisting of the supporting-slide 3, the type-blank holder 82, the mechanism for moving the holder 82 with the slide 3 in the type-bar-discharging position, the mechanism for the production of the return motion of bolt 78².

110. Means for providing an unobstructed passage for the return of justifying spacing-plates into their respective rows, consisting of the mechanism for operating the pair of justifying-links 72, the tubular ends 72² thereof with the recessed front extension, the retaining-bar 65 the spring holding the bar in said recessed extension, and the guide-bracket 65′ for the clearing motion of bar 65.

111. Means for returning matrix-bars into their respective rows after having been dropped from lines of assembled matrix-plates, consisting of the bars 122, the guide-rods 122² and 122³, the frame-plates B, the brackets L′ supporting the guide-rods.

112. Means for returning justifying spacing-plates into their rows from assembled lines of matrix-plates, consisting of the distributing-collar 122′, the bars 122 connected therewith, the guide-rods 122² and 122³, the guide-rod-supporting plates B, the guide-rod-supporting brackets L′.

113. Means for transmitting motion from cam-shaft $k$ to the distributers of matrix-bars and of justifying-spacers, consisting of the cam 125³, the lever-arm 125² with fulcrum on rod $y'$ and with friction-roller engaged in the cam-groove of cam 125³, the connecting-rod 125ᶜ, the lever-arms 125′, 125 and 123 all secured to the same fulcrum-shaft 123′, the connecting-rod 125ª, the lever-arms 124 secured to fulcrum-pin 124′, the connecting-rods 123ª and 124ª and the joint-sockets 123² adjustably secured to guide-rods 122² and 122³.

114. Means for providing an unobstructed passage-way for the distribution of matrix-bars by a downward motion of the guide-plate A⁴, consisting of the lever-arm 126 secured to fulcrum-shaft 123′, the spring-pawl 126′, the angle-lever 127 with fulcrum on shaft 77′, the projecting nose at the upwardly-extending arm of angle-lever 127, the connecting-link 127ª, the lever-arms 128, 129 and angle-lever 131 secured to fulcrum-shaft 128′, the lever-arm 129² and angle-lever 131′ secured to cam-shaft 129′, the connecting-rod 130ª, the lever 130 with fulcrum on a pin secured to the bracket 130′, the angle-levers 132 and 132′ with fulcrum on pins secured to brackets 132², the connecting-rods 131ª, the guide-rods 134, the guide-rods 134′, the springs 136 and 136′ and the guide-plates A⁴ secured to the guide-rods.

115. Means for providing an unobstructed passage-way for the distribution of matrix-bars by transmitting motion from guide-rods 134 to racks 55², consisting of the guide-rods 134, the angle-levers 137 secured to fulcrum-shafts 137′, the joint connections of the horizontal arms of levers 137 with guide-rods 134, the racks 55² and the link connections thereof with the upwardly-extending arms of levers 137.

116. Means for disengaging a pawl-lever and a retaining-lever simultaneously from a row of matrix-bars by transmitting motion to two bars from the fulcrum-shaft 137′, consisting of the lever-arm 138 secured to fulcrum-shaft 137′, the connecting-rod 138ª, the two similarly-constructed levers 139 and 139′ connected at their vertically-extending arms by connecting-rod 139ª and with fulcrum on pins secured to frames A′, the bar 42 connecting the oppositely-extending outside lever-arms of the two levers 139 and 139′, the bar 41 connecting the oppositely-extending inside lever-arms of levers 139 and 139′, the connecting-rod 40ª joined to pawl-lever 40 and the connecting-rod 36ª joined to retaining-lever 36.

117. Means for disengaging a series of pawl-levers from a series of rows of matrix-bars by the motion of fulcrum-shaft 137′, consisting of the lever-arm 138 secured to shaft 137′, the connecting-rod 138ª, the two similarly-constructed levers 139 and 139′ with fulcrums on pins secured to frames A′, the connecting-rod 139ª joined to the vertically-extending arms of levers 139 and 139′ the bar 42, the series of connecting-rods 40ª connected at their lower ends to a series of slots in the rib of bar 42 and joined at their upper ends to the series of pawl-levers 40.

118. Means for disengaging a series of retaining-levers from a series of rows of matrix-bars by the motion of fulcrum-shaft 137′, consisting of the lever-arm 138, the connecting-rod 138ª, the levers 139 and 139′ of similar construction with fulcrums on pins secured to frames A', the connecting-rod 139$^a$, the bar 41, the series of countersunk holes in the upper edge thereof, the series of connecting-rods 36$^a$, the series of retaining-levers 36 with fulcrum on brackets 37.

119. Means for correcting mistakes in the formation of a line of matrix-plates by removing the wrong matrix-plate from the line, consisting of the supporting-slide 3, the pin 104 thereon, the cam-plate and lever-arm 104' with fulcrum on a pin secured to bracket 104$^2$ and the operating-rod 104$^a$.

ALBERT J. KLETZKER.
J. G. GOESEL.

Witnesses:
MARIE G. BROOKE,
JAMES E. BLYTHE.